(12) United States Patent
Hirai et al.

(10) Patent No.: US 9,505,980 B2
(45) Date of Patent: *Nov. 29, 2016

(54) POLYMERIZABLE LIQUID CRYSTAL COMPOSITION AND OPTICALLY ANISOTROPIC SUBSTANCE HAVING TWIST ALIGNMENT

(71) Applicants: JNC CORPORATION, Tokyo (JP); JNC PETROCHEMICAL CORPORATION, Tokyo (JP)

(72) Inventors: Yoshiharu Hirai, Ichihara (JP); Nagahisa Miyagawa, Ichihara (JP); Daisuke Ootsuki, Ichihara (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/491,674

(22) Filed: Sep. 19, 2014

(65) Prior Publication Data

US 2015/0108401 A1 Apr. 23, 2015

(30) Foreign Application Priority Data

Oct. 31, 2013 (JP) .................................. 2013-227676
Sep. 5, 2014 (JP) .................................. 2014-181064

(51) Int. Cl.
| | |
|---|---|
| C09K 19/56 | (2006.01) |
| C09K 19/32 | (2006.01) |
| C09K 19/54 | (2006.01) |
| C09K 19/04 | (2006.01) |
| C09K 19/20 | (2006.01) |

(52) U.S. Cl.
CPC ............. *C09K 19/322* (2013.01); *C09K 19/32* (2013.01); *C09K 19/54* (2013.01); *C09K 2019/0448* (2013.01); *C09K 2019/2078* (2013.01); *C09K 2019/323* (2013.01)

(58) Field of Classification Search
CPC ....................................................... C09K 19/56
See application file for complete search history.

(56) References Cited

U.S. PATENT DOCUMENTS

| | | | |
|---|---|---|---|
| 5,780,629 A | 7/1998 | Etzbach et al. | ................ 544/296 |
| 2010/0271580 A1* | 10/2010 | Murakami | ........ G02F 1/133634 |
| | | | 349/118 |
| 2011/0123723 A1* | 5/2011 | Yang | ..................... G03F 7/0007 |
| | | | 427/514 |

FOREIGN PATENT DOCUMENTS

| | | |
|---|---|---|
| GB | 2 298 202 A | 8/1996 |
| JP | 2003-315761 A | 11/2003 |
| JP | 2005-113131 A | 4/2005 |
| JP | 2005113131 A * | 4/2005 |
| JP | 2010-185363 A | 8/2010 |
| JP | 2012-177087 A | 9/2012 |
| WO | WO 95/16007 A1 | 6/1995 |

OTHER PUBLICATIONS

English Translation JP2005-113131A.*

* cited by examiner

*Primary Examiner* — Chanceity Robinson
(74) *Attorney, Agent, or Firm* — Stein IP, LLC

(57) ABSTRACT

A subject is to provide a polymerizable liquid crystal composition from which an optically anisotropic substance having twist alignment that is excellent in chemical strength (chemical resistance) and has only a small amount of alignment defects can be obtained. A solution is a polymerizable liquid crystal composition containing an optically active compound having a binaphthol moiety, an achiral polymerizable liquid crystal compound and a photopolymerization initiator having oxime ester.

12 Claims, 1 Drawing Sheet

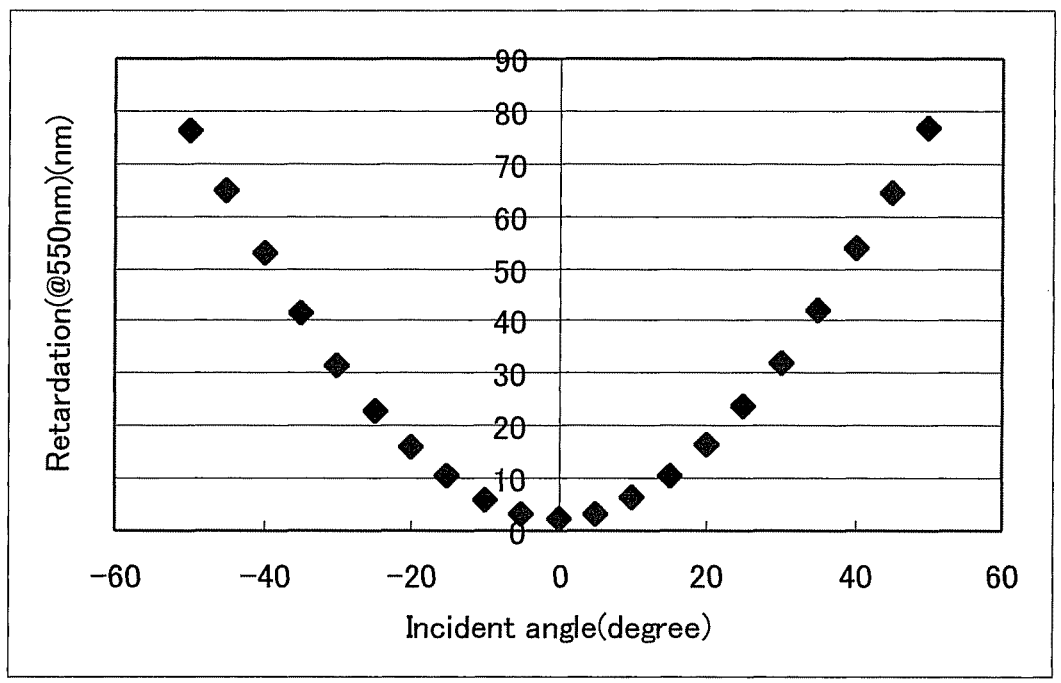

POLYMERIZABLE LIQUID CRYSTAL COMPOSITION AND OPTICALLY ANISOTROPIC SUBSTANCE HAVING TWIST ALIGNMENT

CROSS-REFERENCE TO RELATED APPLICATIONS

This application claims the benefit of Japanese Application No. 2013-227676, filed Oct. 31, 2013, and Japanese Application No. 2014-181064, filed Sep. 5, 2014, in the Japanese Patent Office. All disclosures of the document(s) named above are incorporated herein by reference.

TECHNICAL FIELD

The present invention relates to a polymerizable liquid crystal composition containing an optically active compound having a binaphthol moiety, an achiral polymerizable liquid crystal compound and a photopolymerization initiator containing oxime ester, a polymer having optical anisotropy (optically anisotropic substance) as obtained by polymerizing the polymerizable liquid crystal composition, a liquid crystal display device including the optically anisotropic substance, and a selective reflection film including the optically anisotropic substance.

BACKGROUND ART

A polymerizable liquid crystal compound has been recently utilized in an optical anisotropic substance for a polarizing plate, a reflective polarizer, a phase difference plate or the like because the compound exhibits optical anisotropy in a liquid crystal state and the anisotropy is immobilized by polymerization. Optical characteristics required for the optically anisotropic substance are different depending on a purpose, and therefore a compound having characteristics fit for the purpose is required. The compound used for the optically anisotropic substance has difficulty in controlling the anisotropy in the form of a single substance in many cases, and therefore may be occasionally utilized in the form of a composition in combination with various compounds.

The present inventors have developed a polymerizable liquid crystal composition utilizing an optically active compound having a binaphthol moiety and a polymerizable liquid crystal compound having a fluorene skeleton (Patent literature No. 1). The polymerizable liquid crystal composition containing the compounds can be applied in various uses by controlling a kind or an amount of addition of the optically active compound to change a helical pitch of an optically anisotropic substance having twist alignment. The optically anisotropic substance having twist alignment reflects light corresponding to a length of the helical pitch and a direction of rotation of a helix. Visible light is reflected when the length of the helical pitch is in the range of 380 nanometers to 780 nanometers. Near infrared light is reflected when the length of the helical pitch is longer than 780 nanometers, and ultraviolet light is reflected when the length of the helical pitch is shorter than 380 nanometers. Stacking or lamination of optically anisotropic substances having different directions of rotation allows total reflection. The optically anisotropic substance having such characteristics is referred to as a negative C plate.

In a liquid crystal display device in which a dark display (dark state) is obtained in a state in which liquid crystal molecules having positive birefringence are aligned perpendicularly to a substrate, no birefringence by alignment of the liquid crystal molecules is caused relative to a normal direction of the display device. Therefore, very high contrast is obtained in the normal direction in the above display devices. However, when the alignment is deviated from the normal direction of the display device, birefringence is caused, and transmittance of the black display (dark state) increases. More specifically, contrast decreases relative to a viewing angle in an oblique direction in the above liquid crystal display devices. The negative C plate can compensate the birefringence to be caused when the liquid crystal alignment is deviated from the normal direction in such a display device. As a result, the negative C plate serves as an optical compensation plate suitable for improving viewing angle characteristics in liquid crystal display devices including a vertically aligned (VA), twisted nematic (TN), optically compensated birefringence (OCB) or hybrid aligned nematic (HAN) liquid display device.

The optically anisotropic substance having the characteristics of the negative C plate described above is desired to cause no change in a phase difference or a reflection wavelength in various use environments. However, when the composition described in Patent literature No. 1 is used, optical characteristics have been deteriorated in several cases in an environment in which the device is exposed to a hot environment or brought into contact with a high polar solvent.

Patent literature No. 2 describes a combination of a photopolymerization initiator having oxime ester, and a polymerizable liquid crystal compound having fluorene structure. In the literature, an object is to increase birefringence ($\Delta n$) of an optically anisotropic substance in which polymerizable liquid crystal compounds are horizontally or vertically aligned by introducing a polymerizable liquid crystal compound containing a cinnamate bond. However, no attempt is described on improving durability of the optically anisotropic substance obtained therein. Moreover, Patent literature Nos. 3 to 4 on an optically active compound having a binaphthol moiety also provides no description on a combination with a photopolymerization initiator having an oxime ester group.

Patent literature No. 5 describes a combination of a photoinitiator having oxime ester, a non-polymerizable liquid crystal composition and a non-liquid crystalline polymerizable compound. However, the art relates to a material for forming a light controlling layer for a light scattering type liquid crystal device, and is essentially different from the invention. Patent literature No. 6 describes a combination of a photopolymerization initiator having a carbazole skeleton and an oxime ester moiety, an achiral polymerizable liquid crystal compound and an optically active compound having no binaphthol moiety. However, the art has had a problem of no capability of maintaining uniformity of twist alignment in the case of forming a negative C plate having length shorter than 380 nanometers in a length of a helical pitch of an optically anisotropic substance.

CITATION LIST

Patent Literature

Patent literature No. 1: JP 2005-113131 A.
Patent literature No. 2: JP 2012-177087 A.
Patent literature No. 3: WO 1995016007 A.
Patent literature No. 4: GB 2298202 A.
Patent literature No. 5: JP 2003-315761 A.
Patent literature No. 6: JP 2009-29929 A.

SUMMARY OF INVENTION

Technical Problem

A first object of the invention is to provide a polymerizable liquid crystal composition from which an optically anisotropic substance having twist alignment that is excellent in chemical strength (chemical resistance) and has only a small amount of alignment defects can be obtained. A second object is to provide a liquid crystal display device including the optically anisotropic substance and a selective reflection film including the optically anisotropic substance.

Solution to Problem

The present inventors have found that the problems are solved by using a polymerizable liquid crystal composition containing an optically active compound having a binaphthol moiety, an achiral polymerizable liquid crystal compound and a photopolymerization initiator having oxime ester, and thus have completed the invention. The invention is as described below.

Item 1. A polymerizable liquid crystal composition containing an optically active compound having a binaphthol moiety, an achiral polymerizable liquid crystal compound and a photopolymerization initiator (C) having oxime ester.

Item 2. The polymerizable liquid crystal composition according to item 1, wherein the achiral polymerizable liquid crystal compound is component (A) being at least one compound selected from the group of compounds represented by formula (1), and the optically active compound having the binaphthol moiety is component (B) being at least one compound selected from the group of compounds represented by formula (2):

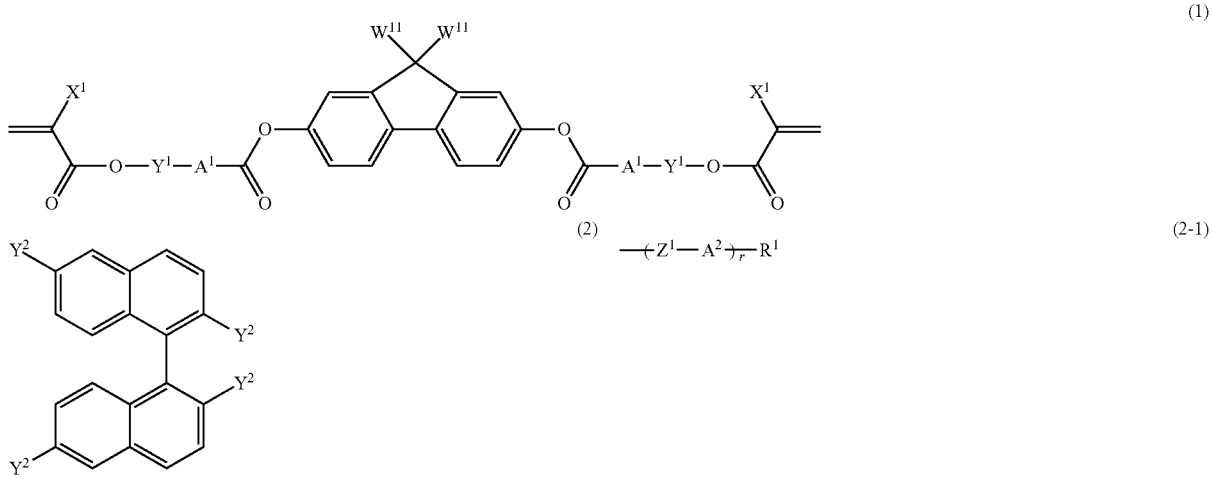

wherein, in formula (1), $X^1$ is independently hydrogen, methyl, fluorine or trifluoromethyl;

$W^{11}$ is independently hydrogen, fluorine, chlorine, methyl or ethyl, and at least one of hydrogen in the methyl and the ethyl may be replaced by halogen;

$A^1$ is independently 1,4-cyclohexylene, 1,4-phenylene, or 1,4-phenylene in which at least one of hydrogen is replaced by halogen, nitro, cyano, alkyl having 1 to 7 carbons or alkoxy having 1 to 7 carbons;

$Y^1$ is independently a single bond or alkylene having 1 to 20 carbons, and in the alkylene, at least one of hydrogen may be replaced by fluorine or chlorine, and at least one of —CH$_2$— may be replaced by —O—, —S—, —COO—, —OCO—, —OCOO—, —CH=CH— or —C≡C—, excluding a case where —O— is adjacent;

in formula (2), $Y^2$ is independently hydrogen, halogen or a group represented by formula (2-1), however, in $Y^2$, at least two are a group represented by formula (2-1);

in formula (2-1), $R^1$ is independently halogen, cyano, alkenyl having 2 to 20 carbons or alkyl having 1 to 20 carbons, at least one of —CH$_2$— in the group may be replaced by —O—, excluding a case where —O— is adjacent, at least one of hydrogen in the group may be replaced by halogen, and one of hydrogen in the group may be replaced by acryloyloxy, methacryloyloxy or trifluoromethylacryloyloxy;

$A^2$ is independently 1,4-cyclohexylene, 1,4-phenylene, 4,4'-biphenylene, naphthalene-2,6-diyl, decahydronaphthalene-2,6-diyl, 1,2,3,4-tetrahydronaphthalene-2,6-diyl, or 1,4-phenylene in which at least one of hydrogen is replaced by halogen;

$Z^1$ is independently a single bond, —O—, —COO—, —OCO—, —OCF$_2$— or —(CH$_2$)$_p$—, and one of —CH$_2$— in —(CH$_2$)$_p$— may be replaced by —O—;

p is independently an integer from 1 to 20; and r is independently an integer from 1 to 3.

Item 3. The polymerizable liquid crystal composition according to item 1 or 2, wherein an absorption maximum wavelength of a mixture including the achiral polymerizable liquid crystal compound and the optically active compound having the binaphthol moiety is in the range of 220 to 400 nanometers, and the absorption maximum wavelength is different from an absorption maximum wavelength of the photopolymerization initiator having oxime ester by 50 nanometers or more.

Item 4. The polymerizable liquid crystal composition according to item 2 or 3, wherein component (A) is at least one compound selected from the group of compounds represented by formula (1-1), and component (B) is at least one compound selected from the group of compounds having optical activity represented by formula (2-2):

Formula 2

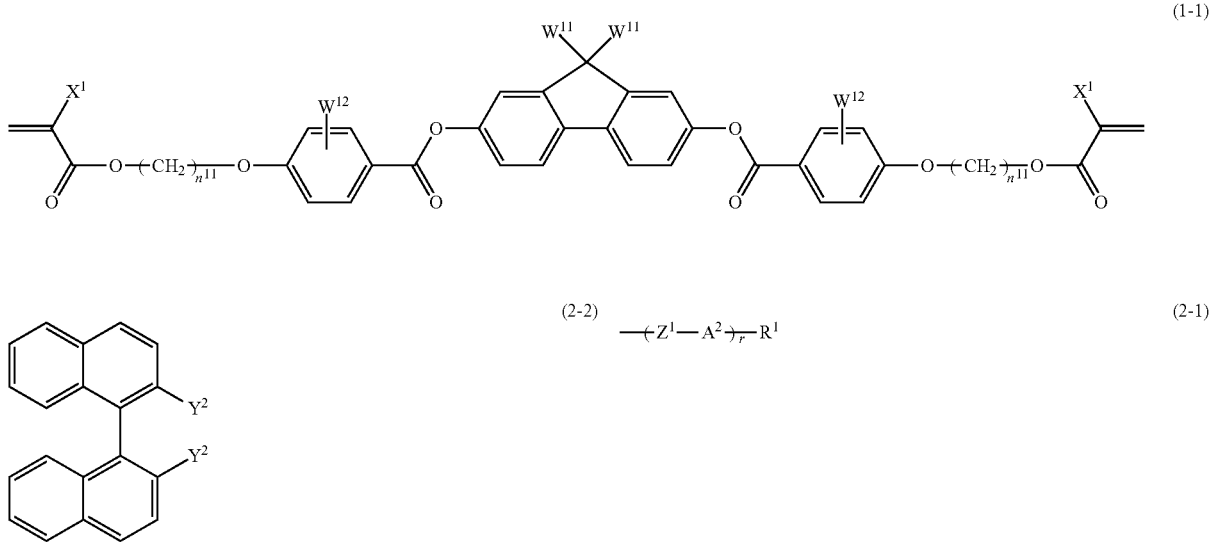

wherein, in formula (1-1), $X^1$ is independently hydrogen, methyl, fluorine or trifluoromethyl;

$W^{11}$ is independently hydrogen or methyl;

$W^{12}$ is independently hydrogen, halogen, nitro, cyano, alkyl having 1 to 7 carbons or alkoxy having 1 to 7 carbons;

$n^{11}$ is independently an integer from 2 to 10;

in formula (2-2), $Y^2$ is independently a group represented by formula (2-1);

in formula (2-1), $R^1$ is independently halogen, cyano, alkenyl having 2 to 20 carbons or alkyl having 1 to 20 carbons, at least one of —CH$_2$— in the group may be replaced by —O—, excluding a case where —O— is adjacent, at least one of hydrogen in the group may be replaced by halogen, and one of hydrogen in the group may be replaced by acryloyloxy, methacryloyloxy or trifluoromethylacryloyloxy;

$A^2$ is independently 1,4-cyclohexylene, 1,4-phenylene, 4,4'-biphenylene, naphthalene-2,6-diyl, decahydronaphthalene-2,6-diyl, 1,2,3,4-tetrahydronaphthalene-2,6-diyl, or 1,4-phenylene in which at least one of hydrogen is replaced by halogen;

$Z^1$ is independently a single bond, —O—, —COO—, —OCO—, —OCF$_2$— or —(CH$_2$)$_p$—, and one of —CH$_2$— in —(CH$_2$)$_p$— may be replaced by —O—;

p is independently an integer from 1 to 20; and r is independently an integer from 1 to 3.

Item 5. The polymerizable liquid crystal composition according to item 4, wherein, in formula (1-1), $X^1$ is independently hydrogen or methyl;

$W^{12}$ is independently hydrogen, halogen, alkyl having 1 to 7 carbons or alkoxy having 1 to 7 carbons;

in formula (2-2), $Y^2$ is independently a group represented by formula (2-1);

in formula (2-1), $R^1$ is independently alkenyl having 2 to 20 carbons or alkyl having 1 to 20 carbons, at least one of —CH$_2$— in the group may be replaced by —O—, excluding a case where —O— is adjacent, at least one of hydrogen in the group may be replaced by halogen, and one of hydrogen in the group may be replaced by acryloyloxy, methacryloyloxy or trifluoromethylacryloyloxy;

$Z^1$ is independently a single bond, —O—, —COO—, —OCO— or —(CH$_2$)$_p$—, and one of —CH$_2$— in —(CH$_2$)$_p$— may be replaced by —O—; and p is independently an integer from 1 to 10.

Item 6. The polymerizable liquid crystal composition according to item 4 or 5, wherein, in formula (1-1), $X^1$ is independently hydrogen or methyl;

$W^{12}$ is independently hydrogen, fluorine, alkyl having 1 to 7 carbons or alkoxy having 1 to 7 carbons;

in formula (2-2), $Y^2$ is independently a group represented by formula (2-1);

in formula (2-1), $R^1$ is independently alkenyl having 2 to 20 carbons or alkyl having 1 to 20 carbons, at least one of —CH$_2$— in the group may be replaced by —O—, excluding a case where —O— is adjacent, at least one of hydrogen in the group may be replaced by halogen, and one of hydrogen in the group may be replaced by acryloyloxy, methacryloyloxy or trifluoromethylacryloyloxy;

$Z^1$ is independently a single bond, —O—, —COO—, —OCO— or —(CH$_2$)$_p$—, and one of —CH$_2$— in —(CH$_2$)$_p$— may be replaced by —O—; and p is independently an integer from 1 to 3.

Item 7. The polymerizable liquid crystal composition according to any one of items 2 to 6, further containing at least one compound selected from the group of compounds represented by formula (3-1) and formula (3-2) as component (D):

Formula 3

(3-1)

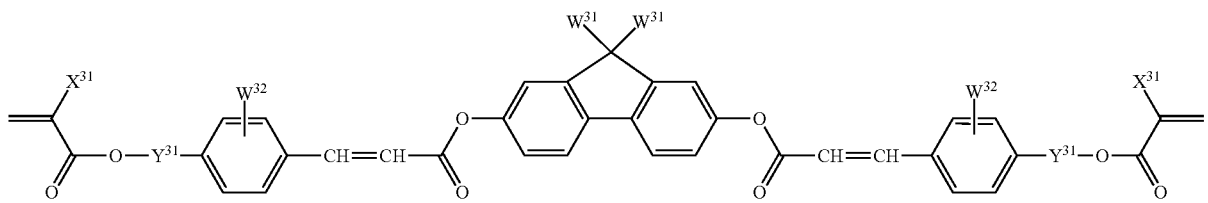

(3-2)

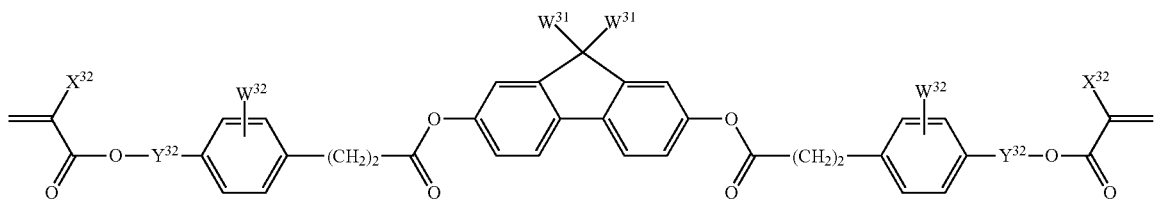

wherein in formula (3-1), $X^{31}$ is independently hydrogen, methyl or trifluoromethyl;

$Y^{31}$ is independently alkylene having 1 to 20 carbons, and in the alkylene, at least one of hydrogen may be replaced by fluorine or chlorine, and at least one of —CH$_2$— may be replaced by —O—, —S—, —COO—, —OCO—, —OCOO—, —CH=CH— or —C≡C—;

$W^{31}$ is independently hydrogen, fluorine, chlorine, methyl or ethyl, and at least one of hydrogen in the methyl and the ethyl may be replaced by halogen;

$W^{32}$ is independently hydrogen, halogen, nitro, cyano, alkyl having 1 to 7 carbons or alkoxy having 1 to 7 carbons;

in formula (3-2), $W^{31}$ is independently hydrogen, fluorine, chlorine, methyl or ethyl, and at least one of hydrogen in the methyl and the ethyl may be replaced by halogen;

$W^{32}$ is independently hydrogen, halogen, nitro, cyano, alkyl having 1 to 7 carbons or alkoxy having 1 to 7 carbons;

$X^{32}$ is independently hydrogen, methyl or trifluoromethyl;

$Y^{32}$ is independently alkylene having 1 to 20 carbons, and in the alkylene, at least one of hydrogen may be replaced by fluorine or chlorine, and at least one of —CH$_2$— may be replaced by —O—, —S—, —COO—, —OCO—, —OCOO—, —CH=CH— or —C≡C—.

Item 8. The polymerizable liquid crystal composition according to any one of items 2 to 7, further containing at least one compound selected from the group of compounds represented by formula (4) as component (E):

wherein, in formula (4), $X^4$ is independently hydrogen, methyl, fluorine or trifluoromethyl;

$W^{42}$ is independently hydrogen, halogen, nitro, cyano, alkyl having 1 to 7 carbons or alkoxy having 1 to 7 carbons, and in the alkyl and the alkoxy, at least one of hydrogen may be replaced by fluorine;

$W^{41}$ is independently halogen, nitro, cyano, phenyl, benzyl, alkyl having 1 to 7 carbons, alkoxy having 1 to 7 carbons, alkoxycarbonyl (—COOR$^a$; R$^a$ is straight-chain alkyl having 1 to 7 carbons) or alkylcarbonyl (—COR$^b$; R$^b$ is straight-chain alkyl having 1 to 16 carbons), and in the alkyl and the alkoxy, at least one of hydrogen may be replaced by fluorine;

s is an integer from 0 to 4;

$n^{41}$ is independently an integer from 2 to 10;

$n^{42}$ is an integer from 1 to 3;

$Z^{41}$ is independently a single bond, —O—, —CO—, —CH=CH—, —COO—, —OCO—, —OCO—CH=CH—COO— or —OCOO—; and $Z^{42}$ is independently a single bond, —CH$_2$CH$_2$— or —CH=CH—.

Item 9. The polymerizable liquid crystal composition according to any one of items 2 to 8, further containing at least one compound selected from the group of compounds represented by formula (5) as component (F):

Formula 4

(4)

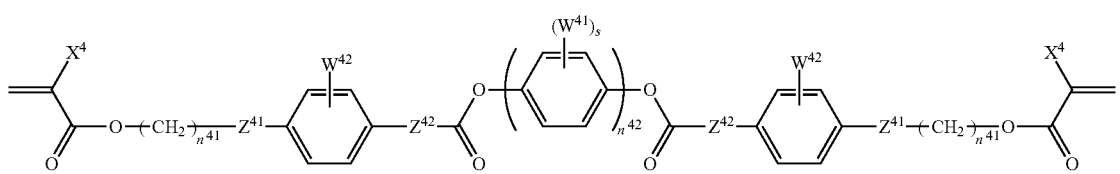

Formula 5

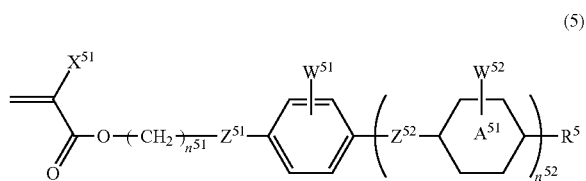

(5)

wherein in formula (5), $X^{51}$ is hydrogen, methyl or trifluoromethyl;

$R^5$ is cyano, trifluoromethoxy, alkyl having 1 to 20 carbons, alkyl ester having 1 to 20 carbons (—COOR$^c$, —OCOR$^c$ or —CH═CH—COOR$^c$; R$^c$ is straight-chain alkyl having 1 to 20 carbons) or alkoxy having 1 to 20 carbons, and in the alkyl and the alkoxy, at least one of hydrogen may be replaced by fluorine;

$W^{51}$ and $W^{52}$ are independently hydrogen, halogen, nitro, cyano, alkyl having 1 to 7 carbons or alkoxy having 1 to 7 carbons, and in the alkyl and the alkoxy, at least one of hydrogen may be replaced by fluorine;

$Z^{51}$ is a single bond, —O—, —COO—, —OCO— or —OCOO—;

$Z^{52}$ is independently a single bond, —COO—, —OCO—, —CH═CH—COO—, —OCO—CH═CH—, —CH$_2$CH$_2$—COO—, —OCO—CH$_2$CH$_2$— or —C≡C—;

$n^{51}$ is an integer from 2 to 10; and $n^{52}$ is an integer from 1 to 2.

Item 10. The polymerizable liquid crystal composition according to any one of items 1 to 9, wherein photopolymerization initiator having oxime ester (C) is at least one compound selected from the group of compounds represented by formula (6-1):

Formula 6

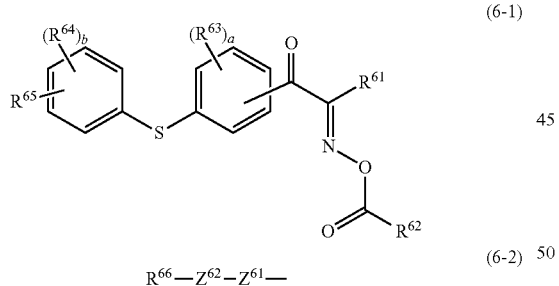

(6-1)

$R^{66}$—$Z^{62}$—$Z^{61}$—

(6-2)

wherein, in formula (6-1), $R^{61}$ represents cyano, alkyl having 1 to 20 carbons, aryl having 3 to 60 carbons or arylalkyl having 7 to 30 carbons, and hydrogen of a substituent represented by $R^{61}$ may be further replaced by OR$^{621}$, COR$^{621}$, SR$^{621}$, halogen or COOR$^{621}$, and R$^{621}$ represents hydrogen or alkyl having 1 to 20 carbons;

$R^{62}$ represents $R^{611}$, and $R^{611}$ represents alkyl having 1 to 20 carbons, aryl having 3 to 60 carbons or arylalkyl having 7 to 30 carbons, hydrogen of a substituent represented by $R^{611}$ may be further replaced by halogen, and an alkyl part of a substituent represented by $R^{61}$, $R^{611}$ and $R^{621}$ may be discontinued 1 to 5 times by —O—, —S—, —COO—, —OCO— or —NR$^{624}$—, and R$^{624}$ represents hydrogen, alkyl having 1 to 20 carbons, aryl having 3 to 60 carbons or arylalkyl having 7 to 30 carbons, and an alkyl part of a substituent represented by $R^{611}$ and $R^{621}$ may have a branched side chain, and may be cyclopentyl or cyclohexyl;

$R^{63}$ and $R^{64}$ each independently represent $R^{611}$, OR$^{611}$, cyano, a hydroxyl group or halogen; a and b each independently represent an integer from 0 to 4;

$R^{65}$ represents hydrogen, a hydroxyl group, carboxyl or a group represented by formula (6-2); in formula (6-2), $Z^{61}$ represents —O—, —S—, —OCO— or —COO—;

$Z^{62}$ represents alkylene having 1 to 20 carbons in which replacement by 1 to 3 of $R^{66}$ may be made, arylene having 6 to 30 carbons in which replacement by 1 to 3 of $R^{66}$ may be made or arylenealkylene having 1 to 20 carbons in which replacement by 1 to 3 of $R^{66}$ may be made, and an alkylene part of $Z^{62}$ may be discontinued 1 to 5 times by —O—, —S—, —COO— or —OCO—, and the alkylene part of $Z^{62}$ may have a branched side chain, and may be cyclohexylene; and $R^{66}$ represents a hydroxyl group or carboxyl.

Item 11. The polymerizable liquid crystal composition according to any one of items 1 to 10, further containing a nonionic surfactant.

Item 12. The polymerizable liquid crystal composition according to item 11, wherein the nonionic surfactant includes a vinyl-based, fluorine-based, silicone-based or hydrocarbon-based nonionic surfactant.

Item 13. An optically anisotropic substance having twist alignment, obtained by polymerizing the polymerizable liquid crystal composition according to any one of items 1 to 12.

Item 14. A liquid crystal display device, having the optically anisotropic substance according to item 13.

Item 15. A selective reflection film, having the optically anisotropic substance according to item 13.

Advantageous Effects of Invention

An optically anisotropic substance manufactured using a polymerizable liquid crystal composition containing an optically active compound having binaphthol structure, an achiral polymerizable liquid crystal compound and a photopolymerization initiator having oxime ester is excellent in chemical resistance and useful for improving reliability.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1 shows results of measurement of retardation of an optically anisotropic substance (negative C plate) obtained in Example 1.

DESCRIPTION OF THE EMBODIMENTS

Usage of terms herein is as described below. "Liquid crystal compound" is a generic term for a compound having a liquid crystal phase, and a compound having no liquid crystal phase but being useful as a component of a liquid crystal composition. The liquid crystal phase includes a nematic phase, a smectic phase and a cholesteric phase, and means the nematic phase in many cases. Polymerizability means capability by which a monomer is polymerized by means of light, heat, a catalyst or the like to give a polymer. A compound represented by formula (1) may be occasionally represented as compound (1). A compound represented by any other formula may be occasionally referred to as a specific compound by a similar simplification method. A meaning of a term "liquid crystallinity" is not limited only to having the liquid crystal phase. The crystallinity semantically includes characteristics in which a compound can be used as a component when the compound is mixed with other liquid crystal compounds, even if the compound itself has no liquid crystal phase. A term "arbitrary" used upon describing compound structure means being arbitrary not only for a position and also the number. Further, for example, an expression "arbitrary A may be replaced by B, C or D" means inclusion of a case where arbitrary A is replaced by B, a case where arbitrary A is replaced by C and a case where arbitrary A is replaced by D, and also a case where a plurality of A are replaced by at least two of B to D. However, a definition by which arbitrary —$CH_2$— may be replaced by —O— excludes replacement resulting in producing a bonding group —O—O—. When arbitrary —$CH_2$— is replaced by —CH=CH— or —C≡C—, a case where the number of carbons exceeds the range described is excluded. For example, when $Y^1$ in formula (1) is alkylene having 1 to 20 carbons, and in the alkylene, arbitrary —$CH_2$— may be replaced by —CH=CH— or —C≡C—, the number of carbons of alkylene including —$CH_2$— replaced by —CH=CH— or —C≡C— does not exceed 20 in the above case. The rule is also applied to any other definition in a similar manner.

In a substituent in which a position of connection with ring-constituting carbon is unclear, the connecting position semantically is free within the range in which the position chemically has no problems. An optically active compound having a binaphthol moiety according to the invention may be occasionally referred to as an optically active compound or only a compound. A polymerizable liquid crystal composition may be occasionally referred to as a liquid crystal composition or only a composition in a similar manner. A case where a compound has one polymerizable group may be occasionally referred to as monofunctionality. A case where a compound has a plurality of polymerizable groups may be occasionally referred to as polyfunctionality or may be occasionally referred to by the number corresponding to the number of polymerizable groups.

As a chemical formula, when a content described below is described, a straight line from A to B means a bond in which hydrogen in B is replaced by group A, and a position thereof is arbitrary. X represents the number of groups A to be replaced. A case where X is 0 represents absence of A or no replacement.

Formula 7

$$(A)_x \rightarrow \boxed{B}$$

The composition of the invention contains an achiral polymerizable liquid crystal compound. The composition preferably contains at least one compound selected from the group of achiral polymerizable liquid crystal compounds represented by formula (1) as component (A).

Formula 8

(1)

[Chemical structure showing formula (1) with $X^1$, $W^{31}$, $Y^1$, $A^1$ substituents on a fluorene-based structure]

(1-1)

[Chemical structure showing formula (1-1) with $X^1$, $W^{11}$, $W^{12}$, $(CH_2)_{n11}$ substituents on a fluorene-based structure]

In formula (1), $X^1$ is independently hydrogen, methyl, fluorine or trifluoromethyl, and preferably, hydrogen or methyl.

$W^{11}$ is independently hydrogen, fluorine, chlorine, methyl or ethyl, and at least one of hydrogen in the methyl and the ethyl may be replaced by halogen, and is preferably hydrogen or methyl. In the invention, "halogen" means a group 17 element, and specifically is fluorine, chlorine, bromine or iodine, and preferably, fluorine, chlorine or bromine.

$A^1$ is independently 1,4-cyclohexylene, 1,4-phenylene, or 1,4-phenylene in which at least one of hydrogen is replaced by halogen, nitro, cyano, alkyl having 1 to 7 carbons or alkoxy having 1 to 7 carbons, and preferably, 1,4-phenylene in which at least one of hydrogen is replaced by halogen, nitro, cyano, alkyl having 1 to 7 carbons or alkoxy having 1 to 7 carbons.

$Y^1$ is independently a single bond or alkylene having 1 to 20 carbons, and in the alkylene, at least one of hydrogen may be replaced by fluorine or chlorine, and at least one of —$CH_2$— may be replaced by —O—, —S—, —COO—, —OCO—, —OCOO—, —CH=CH— or —C≡C—, excluding a case where —O— is adjacent, and is preferably alkylene.

Formula (1) preferably includes formula (1-1), and $X^1$ and $W^{11}$ are defined in a manner identical with the definitions described above.

$W^{12}$ is independently hydrogen, halogen, nitro, cyano, alkyl having 1 to 7 carbons or alkoxy having 1 to 7 carbons, and preferably, hydrogen, fluorine, alkyl having 1 to 7 carbons or alkoxy having 1 to 7 carbons.

Moreover, $n^{11}$ is independently an integer from 2 to 10, and preferably, an integer from 3 to 6.

The composition of the invention contains the optically active compound having the binaphthol moiety. The composition preferably contains at least one compound selected from the group of optically active compounds having binaphthol moieties represented by formula (2) and formula (2-2) as component (B).

Formula 9

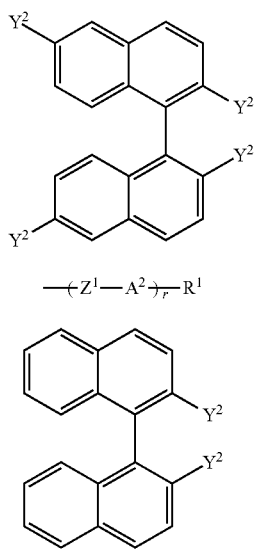

(2)

$-\!\!\!\!+\!\!Z^1\!\!-\!\!A^2\!\!\rightarrow_{\!\!r}\!\!R^1$     (2-1)

(2-2)

In formula (2),

Formula 10

$Y^2$ is independently hydrogen, halogen or a group represented by a formula (2-1), however, in $Y^2$, at least two are a group represented by formula (2-1). A compound represented by formula (2) is preferably represented by a bonding pattern in formula (2-2).

In formula (2-1), $R^1$ is independently halogen, cyano, alkenyl having 2 to 20 carbons or alkyl having 1 to 20 carbons, at least one of —$CH_2$— in the group may be replaced by —O—, excluding a case where —O— is adjacent, at least one of hydrogen in the group may be replaced by halogen, and one of hydrogen in the group may be replaced by acryloyloxy, methacryloyloxy or trifluoromethylacryloyloxy.

$R^1$ is Preferably alkyl having 1 to 20 carbons, at least one of —$CH_2$— in the group may be replaced by —O—, excluding a case where —O— is adjacent, and one of hydrogen in the group may be replaced by acryloyloxy, methacryloyloxy or trifluoromethylacryloyloxy.

$A^2$ is independently 1,4-cyclohexylene, 1,4-phenylene, 4,4'-biphenylene, naphthalene-2,6-diyl, decahydronaphthalene-2,6-diyl, 1,2,3,4-tetrahydronaphthalene-2,6-diyl, or 1,4-phenylene in which at least one of hydrogen is replaced by halogen.

$Z^1$ is independently a single bond, —O—, —COO—, —OCO—, —$OCF_2$— or —$(CH_2)P$—, and one of —$CH_2$— in —$(CH_2)_p$— may be replaced by —O—.

Then, p is independently an integer from 1 to 20, preferably, an integer from 1 to 10, and further preferably, an integer from 1 to 3.

Then, r is independently an integer from 1 to 3.

The composition of the invention may contain at least one compound selected from the group of polymerizable achiral liquid crystal compounds represented by formula (3-1) and formula (3-2) as component (D).

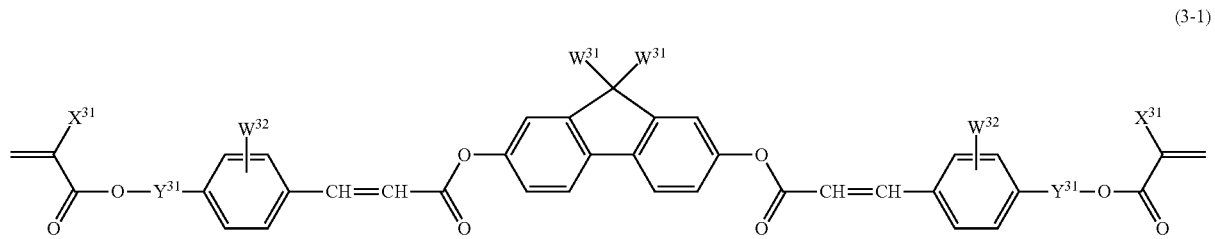

(3-1)

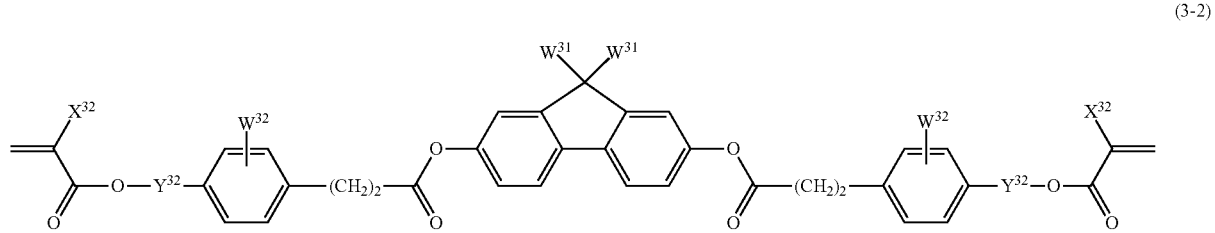

(3-2)

In formula (3-1), $X^{31}$ is independently hydrogen, methyl or trifluoromethyl.

$Y^{31}$ is independently alkylene having 1 to 20 carbons, and in the alkylene, at least one of hydrogen may be replaced by fluorine or chlorine, and at least one of —CH$_2$— may be replaced by —O—, —S—, —COO—, —OCO—, —OCOO—, —CH═CH— or —C≡C—.

$W^{31}$ is independently hydrogen, fluorine, chlorine, methyl or ethyl, and at least one of hydrogen in the methyl and the ethyl may be replaced by halogen.

$W^{32}$ is independently hydrogen, halogen, nitro, cyano, alkyl having 1 to 7 carbons or alkoxy having 1 to 7 carbons.

In formula (3-2), $W^{31}$ is independently hydrogen, fluorine, chlorine, methyl or ethyl, and at least one of hydrogen in the methyl and the ethyl may be replaced by halogen.

$W^{32}$ is independently hydrogen, halogen, nitro, cyano, alkyl having 1 to 7 carbons or alkoxy having 1 to 7 carbons.

$X^{32}$ is independently hydrogen, methyl or trifluoromethyl.

$Y^{32}$ is independently alkylene having 1 to 20 carbons, and in the alkylene, at least one of hydrogen may be replaced by fluorine or chlorine, and at least one of —CH$_2$— may be replaced by —O—, —S—, —COO—, —OCO—, —OCOO—, —CH═CH— or —C≡C—.

The composition of the invention may contain at least one compound selected from the group of achiral polymerizable liquid crystal compounds represented by formula (4) as component (E).

Formula 11

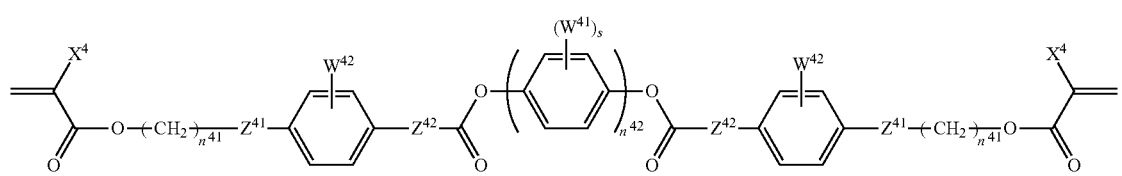

(4)

In formula (4), $X^4$ is independently hydrogen, methyl, fluorine or trifluoromethyl.

$W^{42}$ is independently hydrogen, halogen, nitro, cyano, alkyl having 1 to 7 carbons or alkoxy having 1 to 7 carbons, and in the alkyl and the alkoxy, at least one of hydrogen may be replaced by fluorine.

$W^{41}$ is independently halogen, nitro, cyano, phenyl, benzyl, alkyl having 1 to 7 carbons, alkoxy having 1 to 7 carbons, alkoxycarbonyl (—COOR$^a$; R$^a$ is straight-chain alkyl having 1 to 7 carbons) or alkylcarbonyl (—COR$^b$; R$^b$ is straight-chain alkyl having 1 to 16 carbons), and in the alkyl and the alkoxy, at least one of hydrogen may be replaced by fluorine.

Then, s is an integer from 0 to 4.

Then, $n^{41}$ is independently an integer from 2 to 10, and preferably, an integer from 3 to 6.

Then, $n^{42}$ is an integer from 1 to 3.

$Z^{41}$ is independently a single bond, —O—, —CO—, —CH═CH—, —COO—, —OCO—, —OCO—CH═CH—COO— or —OCOO—.

$Z^{42}$ is independently a single bond, —CH$_2$CH$_2$— or —CH═CH—.

The composition of the invention may contain at least one compound selected from the group of achiral polymerizable liquid crystal compounds represented by formula (5) as component (F).

Formula 12

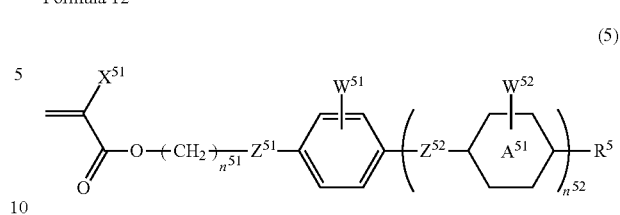

(5)

In formula (5), $X^{51}$ is hydrogen, methyl or trifluoromethyl.

$R^5$ is cyano, trifluoromethoxy, alkyl having 1 to 20 carbons (preferably, straight-chain alkyl having 1 to 10 carbons), alkyl ester having 1 to 20 carbons (—COOR$^c$, —OCOR$^c$ or —CH═CH—COOR$^c$; R$^c$ is straight-chain alkyl having 1 to 20 carbons (preferably, 1 to 10)) or alkoxy having 1 to 20 carbons (preferably, straight-chain alkoxy having 1 to 10 carbons), and in the alkyl and the alkoxy, at least one of hydrogen may be replaced by fluorine.

ring $A^{51}$ is 1,4-phenylene or 1,4-cyclohexylene.

$W^{51}$ and $W^{52}$ are independently hydrogen, halogen, nitro, cyano, alkyl having 1 to 7 carbons or alkoxy having 1 to 7 carbons, and in the alkyl and the alkoxy, at least one of hydrogen may be replaced by fluorine.

$Z^{51}$ is a single bond, —O—, —COO—, —OCO— or —OCOO—.

$Z^{52}$ is independently a single bond, —COO—, —OCO—, —CH═CH—COO—, —OCO—CH═CH—, —CH$_2$CH$_2$—COO—, —OCO—CH$_2$CH$_2$— or —C≡C—.

Then, $n^{51}$ is an integer from 2 to 10, and preferably, an integer from 3 to 6.

Then, $n^{52}$ is an integer from 1 to 2.

The composition of the invention contains a photopolymerization initiator having oxime ester. Above all, the composition preferably contains at least one compound selected from the group of photopolymerization initiators having oxime ester represented by formula (6-1) and formula (6-2) as component (C).

Formula 13

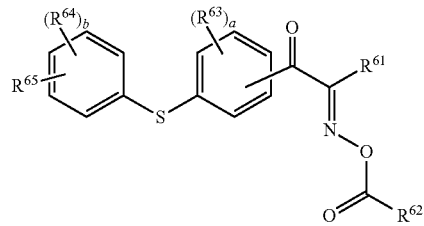

(6-1)

-continued $$R^{66}-Z^{62}-Z^{61}- \quad (6\text{-}2)$$

In formula (6-1), $R^{61}$ represents cyano, alkyl having 1 to 20 carbons, aryl having 3 to 60 carbons or arylalkyl having 7 to 30 carbons, and hydrogen in a substituent represented by $R^{61}$ may be replaced by $OR^{621}$, $COR^{621}$, $SR^{621}$, halogen or $COOR^{621}$, and $R^{621}$ represents hydrogen or alkyl having 1 to 20 carbons.

$R^{62}$ represents $R^{611}$, and $R^{611}$ represents alkyl having 1 to 20 carbons (preferably, 1 to 10 carbons, and further preferably, 1 to 4 carbons), aryl having 3 to 60 carbon or arylalkyl having 7 to 30 carbons, and hydrogen in a substituent represented by $R^{611}$ may be further replaced by halogen. The photopolymerization initiator having oxime ester is subjected to optical cleavage in a connecting part of N—O to generate a radical. Smaller structure of the radical produces higher activity and further easily reinforces a photopolymerization reaction, and therefore presumably allows enhancement of chemical strength of the optically anisotropic substance to be obtained. From such a viewpoint, $R^{611}$ is preferably alkyl having 1 to 10 carbons, aryl having 6 to 12 carbons or arylalkyl having 7 to 13 carbons, and further preferably, methyl, ethyl, propyl, butyl, phenyl, tolyl, xylyl, trifluoromethyl or the like.

An alkyl part of a substituent represented by $R^{61}$, $R^{611}$ and $R^{621}$ may be discontinued 1 to 5 times by —O—, —S—, —COO—, —OCO— or —$NR^{624}$—, and $R^{624}$ represents hydrogen, alkyl having 1 to 20 carbons, aryl having 6 to 30 carbons or arylalkyl having 7 to 30 carbons, and an alkyl part of a substituent represented by $R^{611}$ and $R^{621}$ may have a branched side chain, and may be cyclopentyl or cyclohexyl.

$R^{63}$ and $R^{64}$ each independently represent $R^{611}$, $OR^{611}$, cyano, a hydroxyl group or a halogen atom.

Then, a and b each independently represent an integer from 0 to 4.

$R^6$ represents hydrogen, a hydroxyl group, carboxyl or a group represented by formula (6-2).

In formula (6-2), $Z^{61}$ represents —O—, —S—, —OCO— or —COO—.

$Z^{62}$ represents alkylene having 1 to 20 carbons (preferably, 1 to 10 carbons, further preferably, 1 to 4 carbons, and still further preferably, 1 or 2 carbons) in which replacement by 1 to 3 of $R^{66}$ may be made, arylene having 6 to 30 carbons (preferably, 6 to 24 carbons, further preferably, 6 to 12 carbons) in which replacement by 1 to 3 of $R^{66}$ may be made or arylenealkylene having 7 to 30 carbons (preferably, 7 to 24 carbons, and further preferably, 7 to 12 carbons) in which replacement by 1 to 3 of $R^{66}$ may be made, and an alkylene part of $Z^{62}$ may be discontinued 1 to 5 times by —O—, —S—, —COO— or —OCO—, and the alkylene part of $Z^{62}$ may have a branched side chain, and may be cyclohexylene.

$R^{66}$ represents a hydroxyl group or carboxyl.

The composition of the invention may individually contain component (D), component (E) and component (F), or may concurrently contain the above components.

The composition of the invention may further contain a nonionic surfactant. Specific examples of the nonionic surfactant include a fluorine-based surfactant, a silicone-based surfactant or a hydrocarbon-based surfactant. The nonionic surfactant is effective in improving smoothness of an applied film.

The composition of the invention has the nematic phase at room temperature, and is subjected to twist alignment on a plastic substrate subjected to rubbing treatment or photo-alignment treatment or on an alignment film such as a polyimide film subjected to the photo-alignment treatment or rubbing alignment treatment. The twist alignment herein is also referred to as planer molecular arrangement, and liquid crystal molecules are aligned such that a helical axis of the liquid crystal may become perpendicular to a substrate plane. The alignment is also referred to as Grandjean arrangement. In such alignment, a tilt angle of the liquid crystal molecules on a side of an air interface is required to be horizontal to the substrate plane, and addition of the nonionic surfactant to the composition according to the invention facilitates the planer arrangement.

The compound used for the composition according to the invention will be described.

Compound (1) has a skeleton having specific structure centering on a fluorene ring, and two polymerizable groups. The compound exhibits liquid crystallinity and a polymer of the polymerizable liquid crystal compound forms three-dimensional structure, and therefore serves as a harder polymer in comparison with the compound having one polymerizable group.

Compound (2) is a preferred embodiment of the optically active compound having the binaphthol moiety as axial asymmetry. The compound has comparatively large helical twisting power, and when the compound has the polymerizable group, is crosslinked with any other achiral polymerizable liquid crystal compound to form dense three-dimensional structure, and therefore the resulting optically anisotropic substance becomes strong.

Compounds (3-1) to (3-2) include a compound having two polymerizable groups centering on a fluorene ring, and has a bonding moiety different from the bonding moiety of compound (1). A polymer of the polymerizable liquid crystal compound forms three-dimensional structure, and therefore serves as a harder polymer in comparison with the compound having one polymerizable group. The compound may or may not exhibit the liquid crystallinity. The compound has a central skeleton common with the skeleton of compound (1), and therefore is easily compatibilized to easily adjust a melting point of the polymerizable liquid crystal composition. Moreover, compound (3-1) has a cinnamate moiety, and therefore can increase Δn. Compound (3-2) has an ethyl ester moiety, and therefore can decrease the melting point of the composition. Compounds (3-1) to (3-2) and a compound derived therefrom may be occasionally referred to as compound (3) hereinafter as a generic term.

Compound (4) has a phenylene skeleton and two polymerizable groups. The compound is easily homogeneously aligned, when coating is made on a rubbing treatment substrate with an alignment film polymer having no side chain or when the nonionic surfactant is added to the liquid crystal composition, although a degree depends on conditions of a support substrate, an additive or the like. Moreover, the compound tends to exhibit the liquid crystal phase in a wide temperature range. A compound derived from compound (4) may be occasionally referred to as compound (4) hereinafter as a generic term in a manner similar to compound (3) as described above.

Compound (5) has a phenylene skeleton, a cyclohexylene skeleton and one polymerizable group. The compound has properties of increasing a tilt angle of other liquid crystal molecules or decreasing the melting point. In case of having a cyclohexylene skeleton, the compound has a property to reduce a value of birefringence. A compound derived from compound (5) may be occasionally referred to as compound (5) hereinafter as a generic term in a manner similar to compound (3) as described above.

Compound (6-1) is a preferred embodiment of a photopolymerization initiator having an oxime ester moiety. The photopolymerization initiator includes a highly sensitive photopolymerization initiator that efficiently absorbs near-ultraviolet light preferably having around 365 nanometers to be activated without causing an alignment defect even inside the optically anisotropic substance having twist alignment.

The composition of the invention may contain any other polymerizable compound (hereinafter, also referred to as "any other polymerizable compound") that is different from the optically active compound having the binaphthol moiety, the achiral polymerizable liquid crystal compound and the photopolymerization initiator containing oxime ester. The composition may contain a silane coupling agent in order to improve adhesion between a coating film and the support substrate. The composition may contain a polymerization initiator different from the photopolymerization initiator containing oxime ester or an additive such as a photosensitizer. The composition may contain an additive such as an ultraviolet light absorber, an antioxidant, a radical scavenge, a light stabilizer and a chain transfer agent in order to improve characteristics of the polymer. The composition may contain an organic solvent. The organic solvent is useful for forming the paint film having uniform thickness.

A ratio of each component in the composition according to the invention will be described.

A preferred ratio of component (B) being the optically active compound having the binaphthol moiety is approximately 0.1 to approximately 25% by weight based on the total weight of component (A), component (B), component (D), component (E) and component (F). A further preferred ratio is approximately 0.5 to approximately 20% by weight based thereon. An even further preferred ratio is approximately 1 to approximately 15% by weight based thereon.

A preferred ratio of the total weight of component (A), component (D), component (E) and component (F) being the achiral polymerizable liquid crystal compound is approximately 75 to approximately 99.9% by weight based on the total weight of component (A), component (B), component (D), component (E) and component (F). A further preferred ratio is approximately 80 to approximately 99.5% by weight based thereon. An even further preferred ratio is approximately 85 to approximately 99% by weight based thereon.

A preferred ratio of component (A) is approximately 1 to approximately 99.9% by weight based on the total weight of component (A), component (B), component (D), component (E) and component (F). A further preferred ratio is approximately 3 to approximately 99.5% by weight based thereon. An even further preferred ratio is approximately 5 to approximately 99% by weight based thereon.

A preferred ratio of component (D) is approximately 0 to approximately 74% by weight based on the total weight of component (A), component (B), component (D), component (E) and component (F). A further preferred ratio is approximately 0 to approximately 77% by weight based thereon. An even further preferred ratio is approximately 0 to approximately 80% by weight based thereon.

A preferred ratio of component (E) is approximately 0 to approximately 74% by weight based on the total weight of component (A), component (B), component (D), component (E) and component (F). A further preferred ratio is approximately 0 to approximately 77% by weight based thereon. An even further preferred ratio is approximately 0 to approximately 80% by weight based thereon.

A preferred ratio of component (F) is approximately 0 to approximately 74% by weight based on the total weight of component (A), component (B), component (D), component (E) and component (F). A further preferred ratio is approximately 0 to approximately 77% by weight based thereon. An even further preferred ratio is approximately 0 to approximately 80% by weight based thereon.

A preferred ratio of the photopolymerization initiator having the oxime ester moiety being component (C) is approximately 0.01 to approximately 0.15 in terms of a weight ratio based on the total weight of component (A), component (B), component (D), component (E) and component (F). A further preferred ratio is approximately 0.02 to approximately 0.13 based thereon. An even further preferred ratio is approximately 0.03 to approximately 0.10 based thereon.

A preferred ratio when the nonionic surfactant is added is approximately 0.0001 to approximately 0.03 in terms of a weight ratio based on the total weight of component (A), component (B), component (D), component (E) and component (F).

A preferred ratio when the silane coupling agent is added is approximately 0.01 to approximately 0.15 in terms of a weight ratio based on the total weight of component (A), component (B), component (D), component (E) and component (F). A further preferred weight ratio is approximately 0.03 to approximately 0.10 based thereon.

Upon adding any other polymerizable compound, a preferred ratio is approximately 0.01 to approximately 0.50 in terms of a weight ratio based on the total weight of component (A), component (B), component (D), component (E) and component (F), and preferably, approximately 0.03 to approximately 0.30 based thereon.

Upon further simultaneously using the additive such as the polymerization initiator, as usage, the additive only needs a minimum amount for attaining a purpose.

A preferred combination of each component in the composition according to the invention will be described.

The combination includes:
a combination of component (A), component (B) and component (C);
a combination of component (A), component (B), component (C) and component (D);
a combination of component (A), component (B), component (C) and component (E);
a combination of component (A), component (B), component (C) and component (F);
a combination of component (A), component (B), component (C), component (D) and component (E);
a combination of component (A), component (B), component (C), component (D) and component (F);
a combination of component (A), component (B), component (C), component (E) and (F) component; and
a combination of component (A), component (B), component (C), component (D), component (E) and component (F).

In order to incorporate a large amount of three-dimensional structure into the optically anisotropic substance to increase mechanical strength, the combination preferably includes:
a combination of component (A), component (B), component (C) and component (D);
a combination of component (A), component (B), component (C) and component (E); and
a combination of component (A), component (B), component (C), component (D) and component (E).

When alignment uniformity or application uniformity is adjusted, the nonionic surfactant may be combined with the composition. When the adhesion with the support substrate is improved, the silane coupling agent may be combined with the composition. Moreover, any other polymerizable compound may be further combined in each combination.

Next, methods for synthesizing the compounds will be described. The compounds used in the invention can be synthesized by combining synthesis methods in organic chemistry described in Houben Weyl, Methoden der Organischen Chemie, Georg Thieme Verlag, Stuttgart, Organic Reactions, John Wily & Sons Inc., Organic Syntheses, John Wily & Sons, Inc., Comprehensive Organic Synthesis, Pergamon Press, New Experimental Chemistry Course (Shin Jikken Kagaku Koza in Japanese) (Maruzen Co., Ltd.) or the like.

A method for synthesizing the compound represented by formula (1-1) is described in JP 2003-238491 A or JP 2006-307150 A.

A method for synthesizing the compound represented by formula (2-2) is described in U.S. Pat. No. 5,886,242 B or GB 2298202 A.

As for a method for synthesizing the compound represented by formula (3-1), a method described in U.S. Pat. No. 5,770,107 B can be used as a reference.

As for a method for synthesizing the compound represented by formula (3-2), a method described in JP 2006-307150 A can be used as a reference.

A method for synthesizing compound (4) is described in Makromol. Chem., 190, 3201-3215 (1989), Makromol. Chem., 190, 2255-2268 (1989), WO 97/00600 A, U.S. Pat. No. 5,770,107 B, JP 2004-231638 A or the like.

As a method for synthesizing compound (5), compound (5) can be synthesized by a method described in Macromolecules, 26, 6132-6134 (1993), Makromol. Chem., 183, 2311-2321 (1982), DE 19504224 A, WO 1997/00600 A, U.S. Pat. No. 4,952,334 B, U.S. Pat. No. 4,842,754 B, WO 1997/34862 A or the like.

A method for synthesizing photopolymerization initiator (6-1) having the oxime ester moiety is described in JP 2011-132215 A, JP 2004-534797 A, JP 2000-80068 A or the like.

Next, examples of component compounds are shown. Preferred examples of compound (1-1) are shown below.

Formula 14

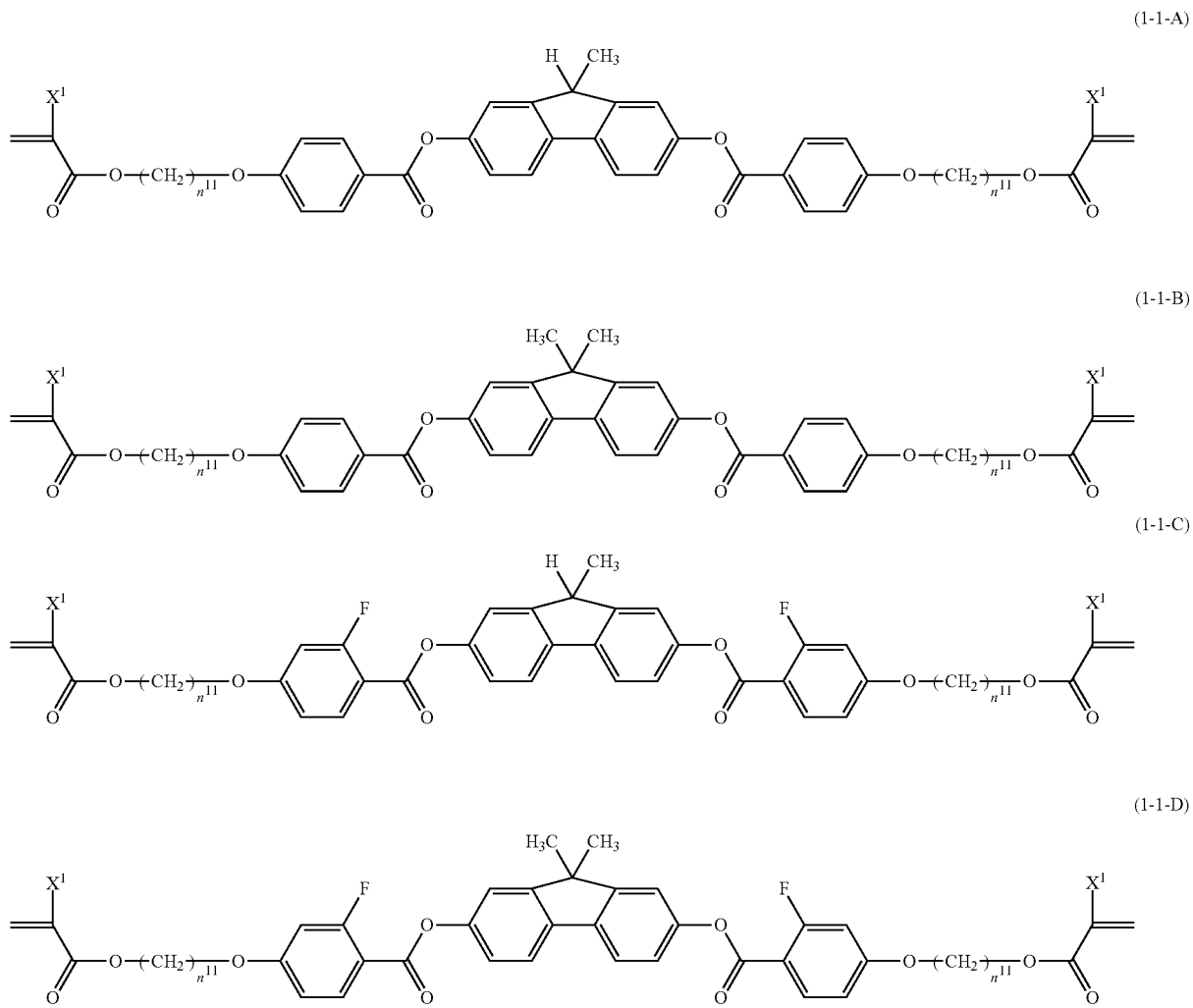

In formulas (1-1-A) to (1-1-D), $X^1$ is independently hydrogen, fluorine, methyl or trifluoromethyl, and $n^{11}$ is independently an integer from 2 to 10, and preferably, an integer from 3 to 6.
Preferred examples of compound (2-2) are shown below.
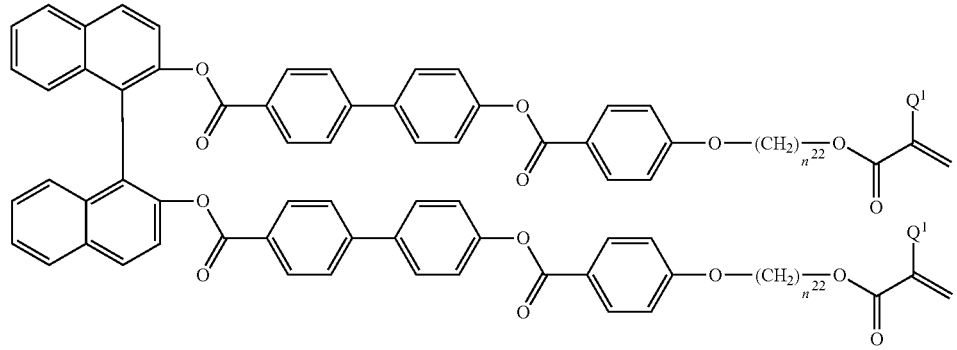
(2-2-A)
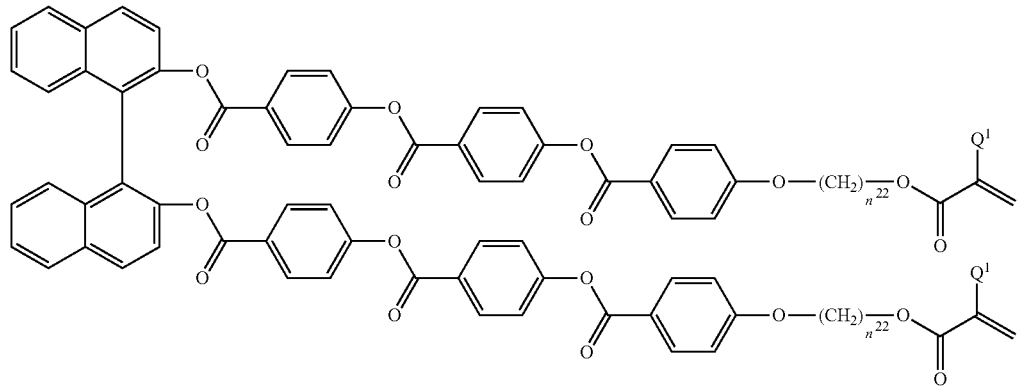
(2-2-B)
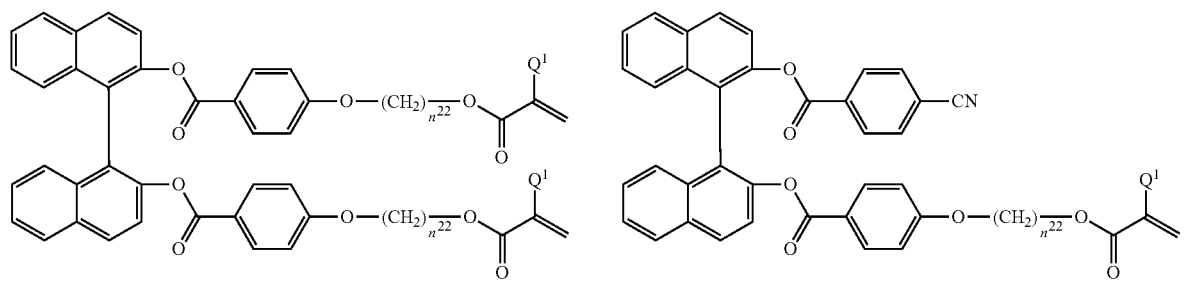
(2-2-C)          (2-2-D)
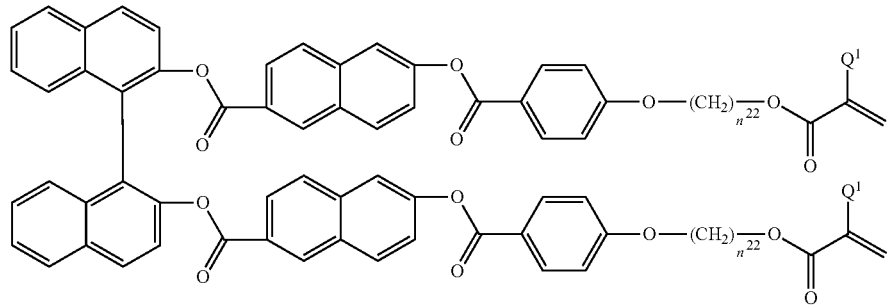
(2-2-E)

-continued
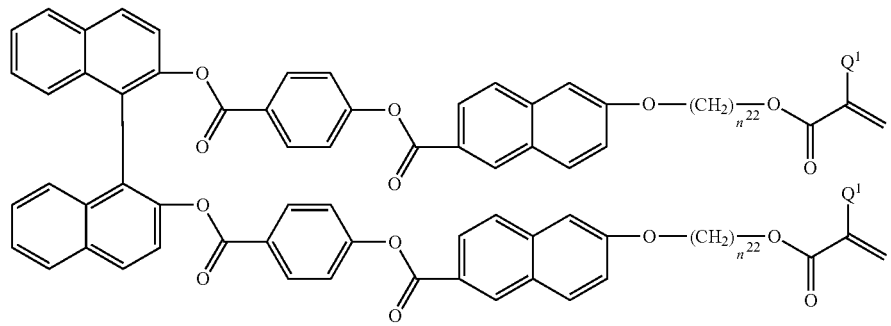
(2-2-F)
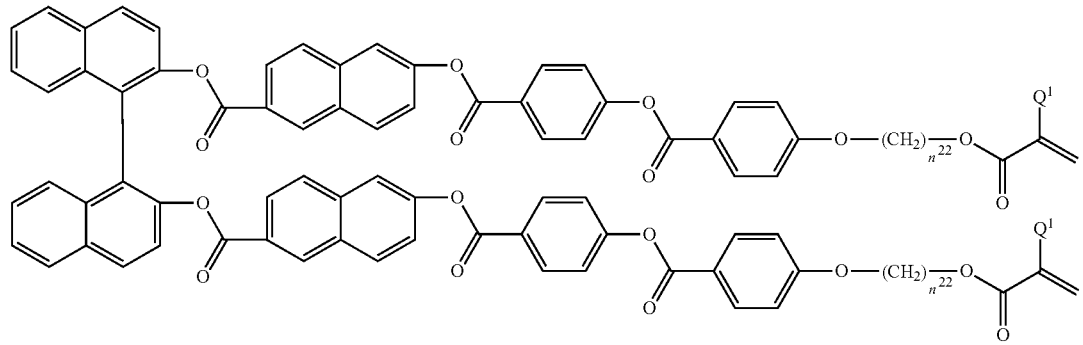
(2-2-G)
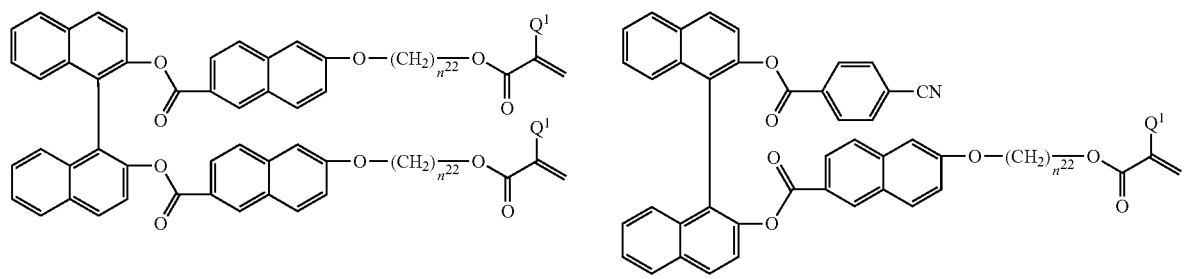
(2-2-H) (2-2-I)
$Q^1$ is independently hydrogen, methyl or trifluoromethyl, and $n^{22}$ is independently an integer from 2 to 12, and preferably, an integer from 3 to 6.
Preferred examples of compounds (3-1) to (3-2) are shown below.
Formula 16
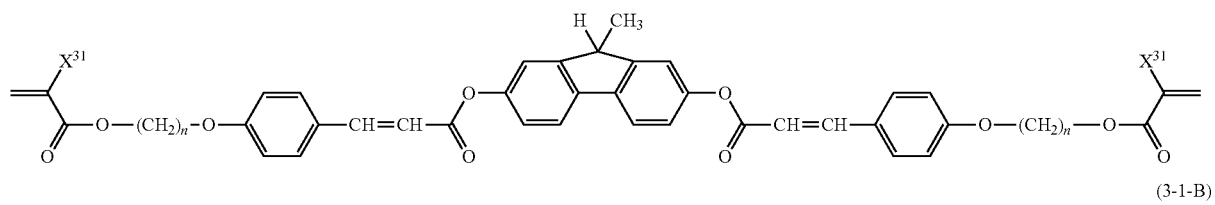
(3-1-A)
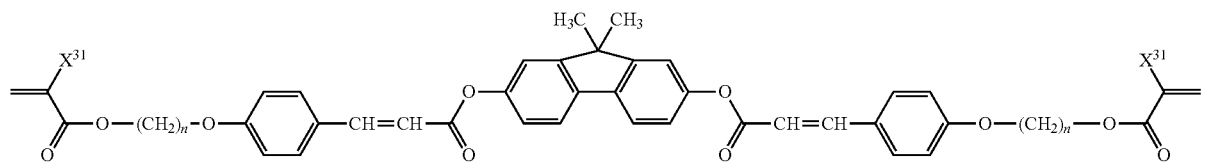
(3-1-B)

-continued
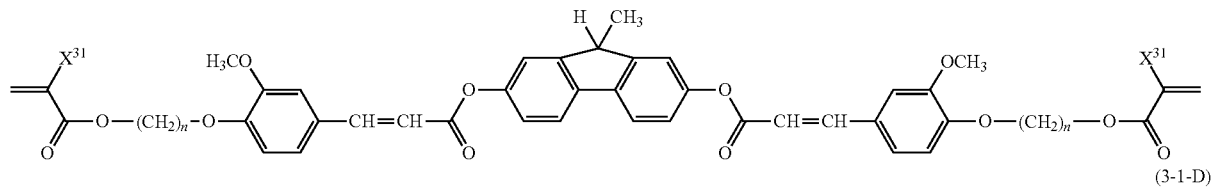
(3-1-C)
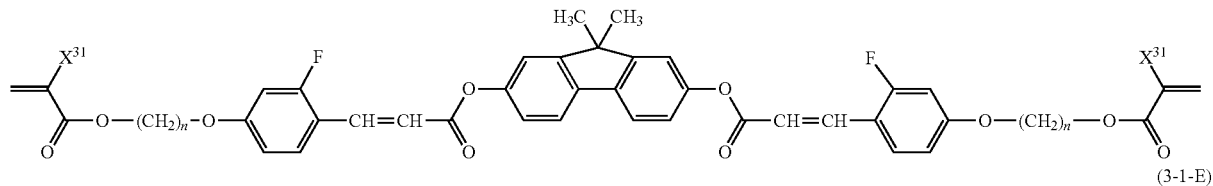
(3-1-D)
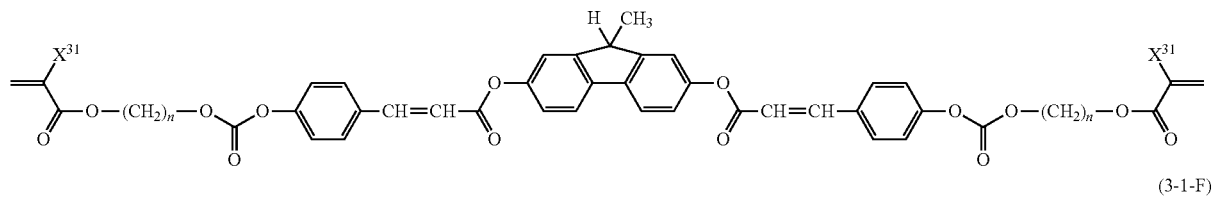
(3-1-E)
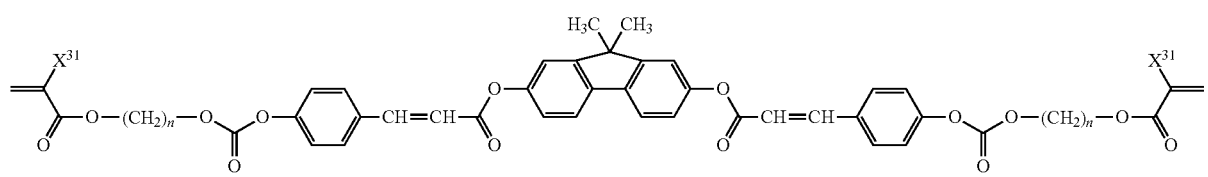
(3-1-F)
wherein, in formulas (3-1-A) to (3-1-F), $X^{31}$ is independently hydrogen, methyl or trifluoromethyl, and n is independently an integer from 2 to 20, and preferably, an integer from 3 to 6. In formulas (3-1-A) to (3-1-F), a trans isomer is preferred, and both of —CH=CH— further preferably take a trans form.
Formula 17
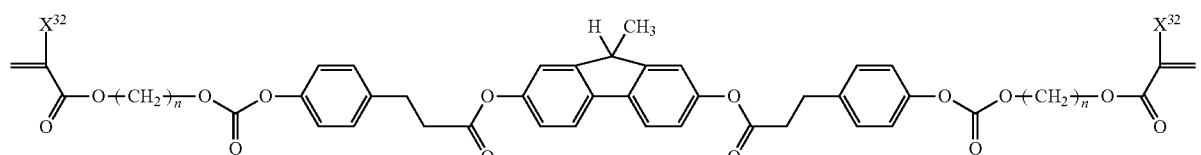
(3-2-A)
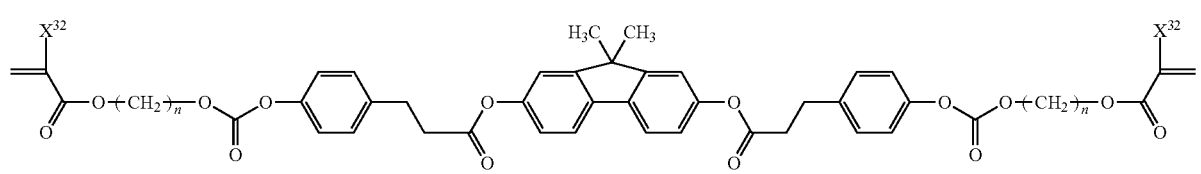
(3-2-B)
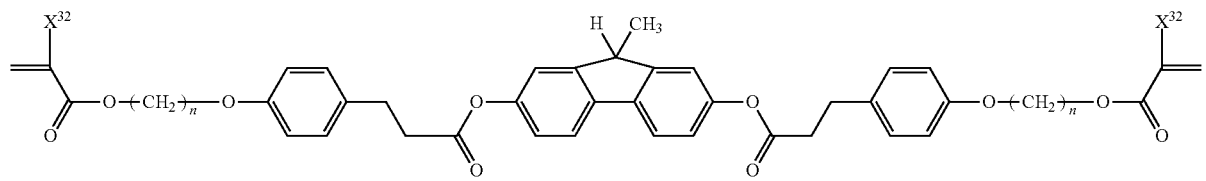
(3-2-C)

(3-2-D)
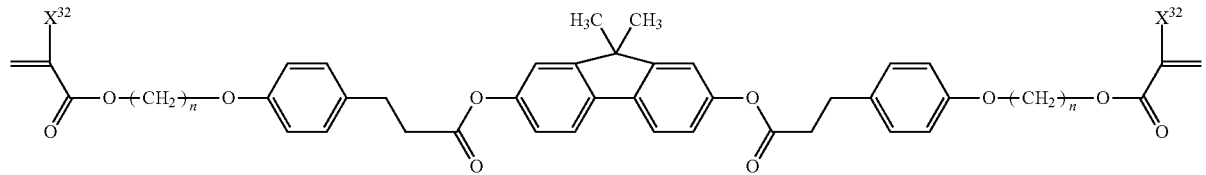
wherein, in formulas (3-2-A) to (3-2-D), $X^{32}$ is independently hydrogen, methyl or trifluoromethyl, and n is independently an integer from 2 to 20, and preferably, an integer from 3 to 6.
Preferred examples of compound (4) are shown below.
Formula 18
(4-A)
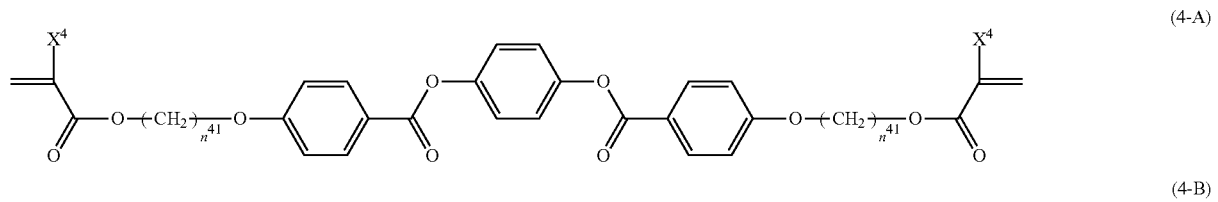
(4-B)
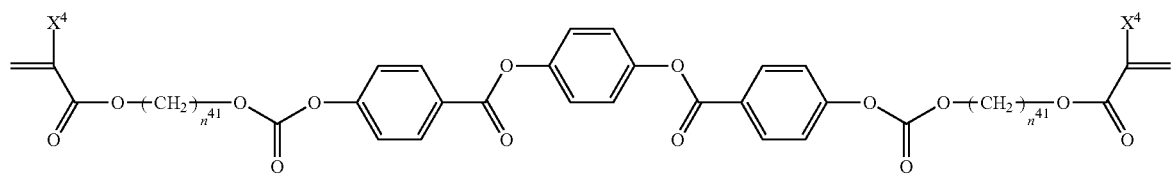
(4-C)
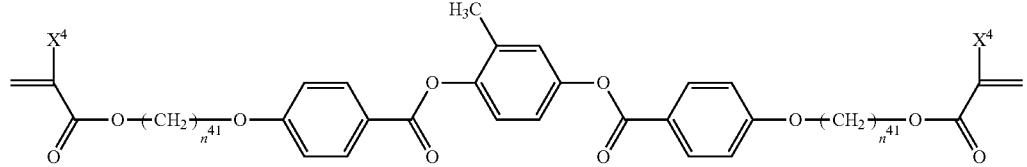
(4-D)
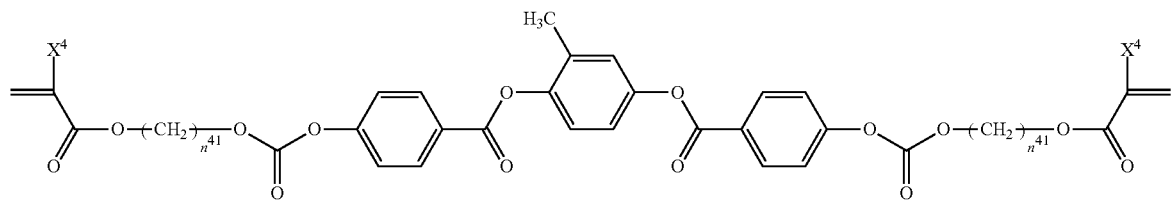
(4-E)
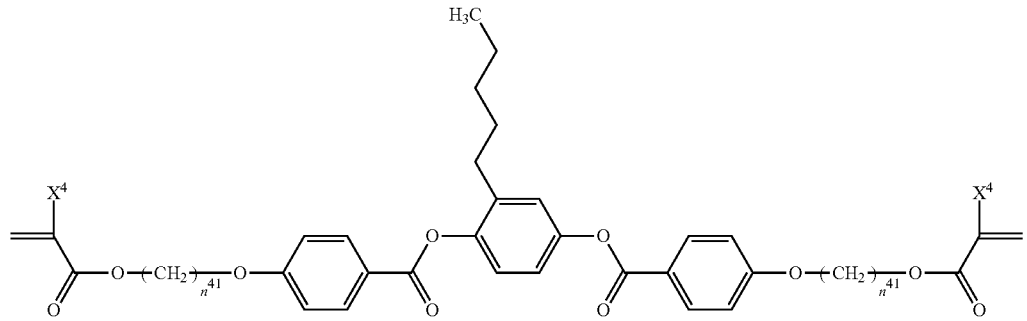

-continued
(4-F)
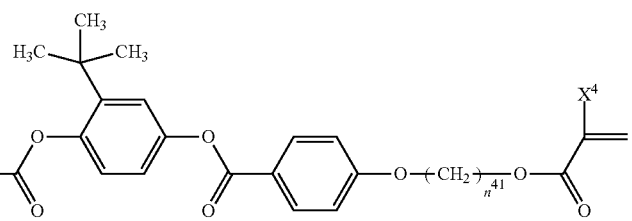
Formula 19
(4-G)
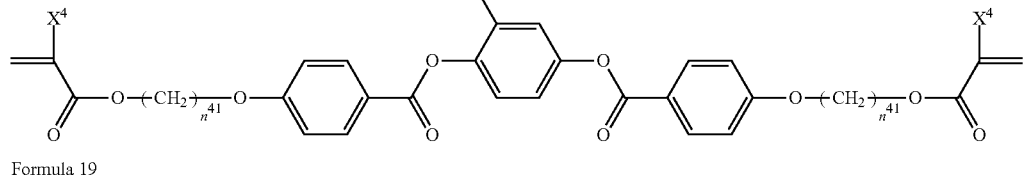
(4-H)
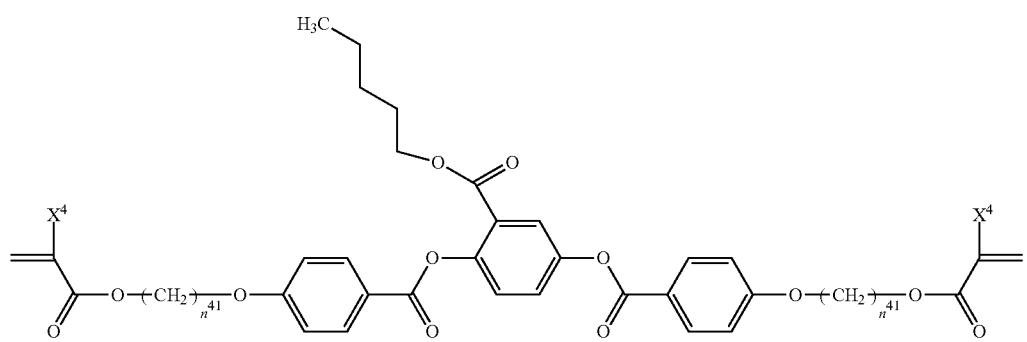
(4-I)
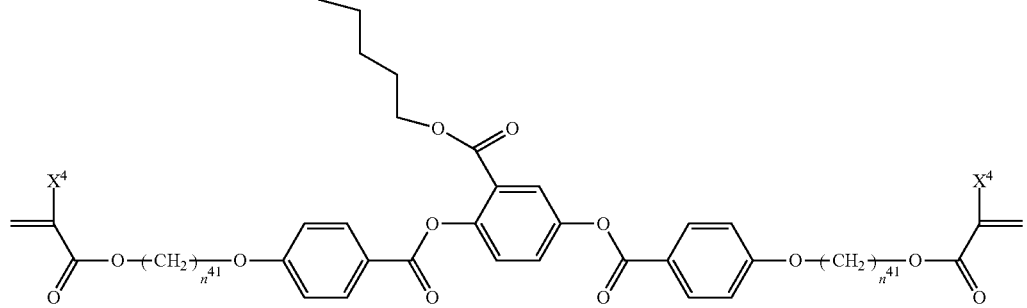
Formula 20
(4-J)
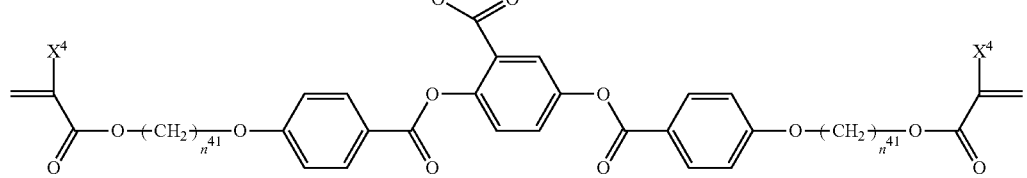

-continued
(4-K)
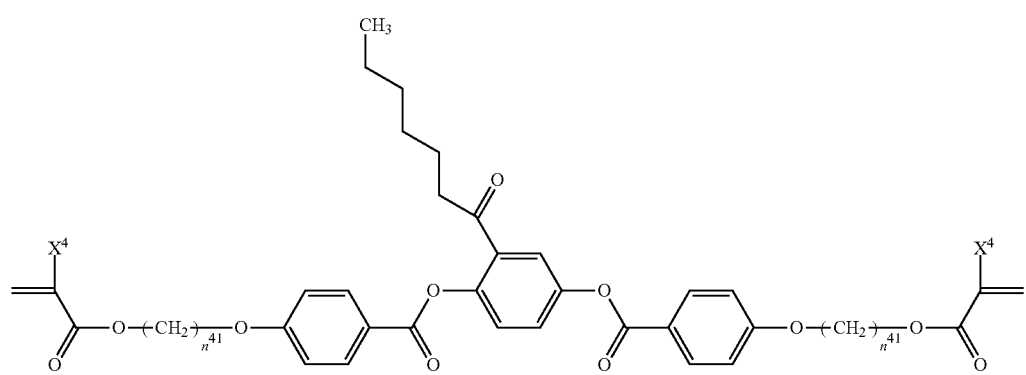
(4-L)
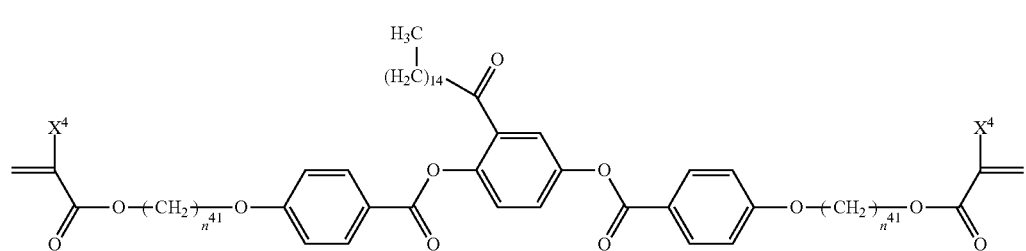
Formula 21
(4-M)
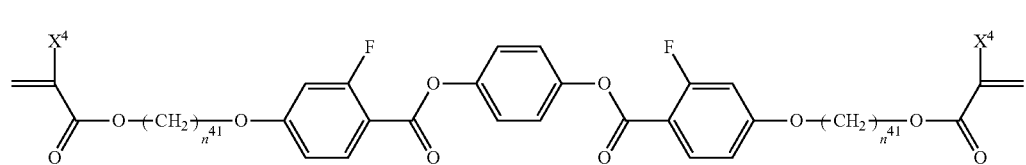
(4-N)
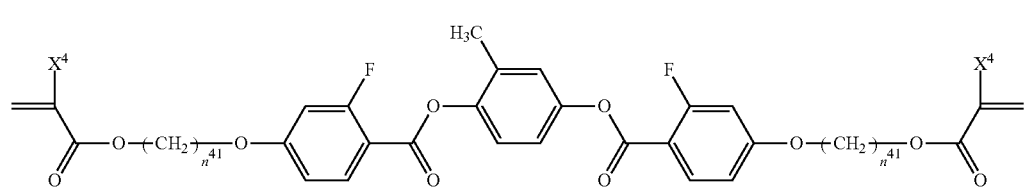
(4-O)
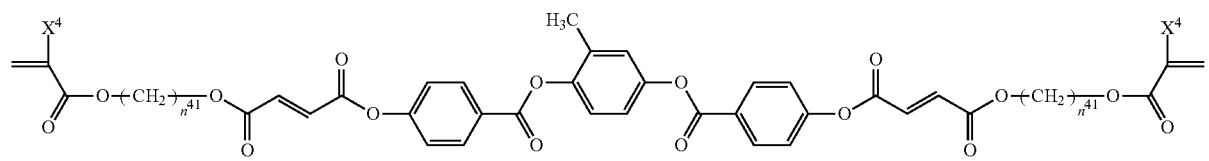
Formula 22
(4-P)
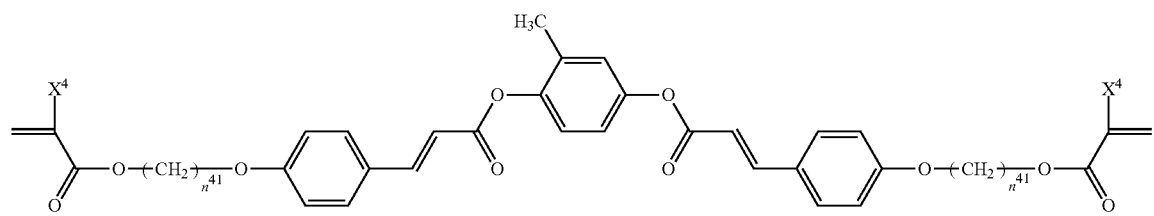

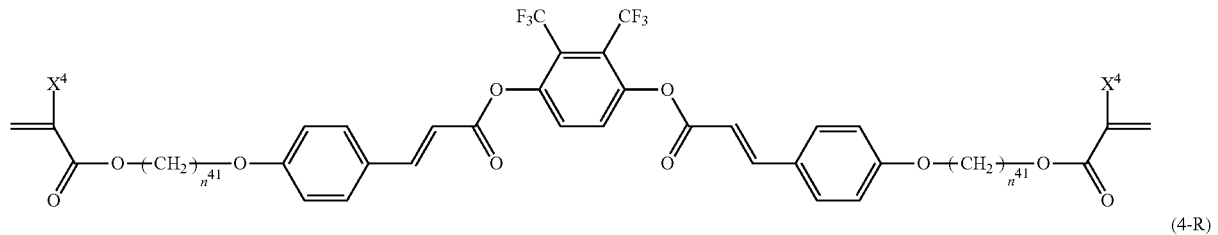
(4-Q)
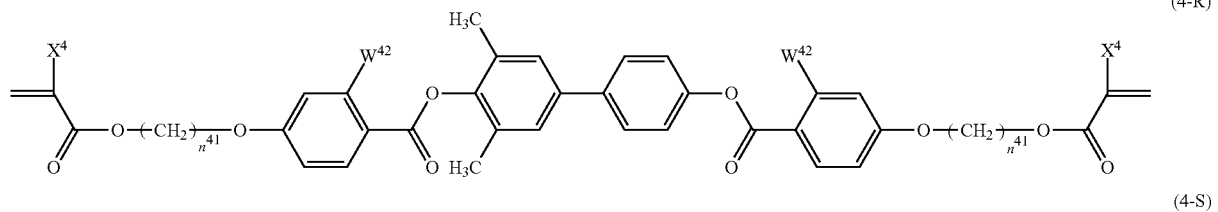
(4-R)
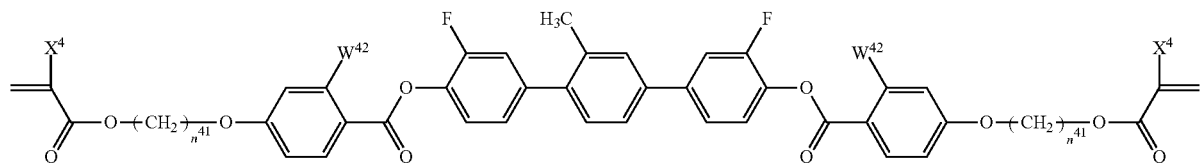
(4-S)
In formulas (4-A) to (4-S), $X^4$ is independently hydrogen, methyl, fluorine or trifluoromethyl, $W^{42}$ is hydrogen or fluorine, and $n^{41}$ is independently an integer from 2 to 10, and preferably, an integer from 3 to 6.
Preferred examples of compound (5) are shown below.
Formula 23
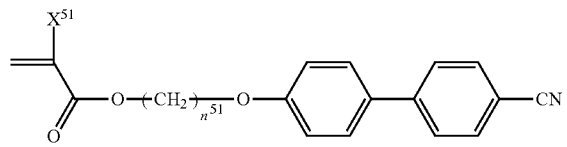
(5-A)
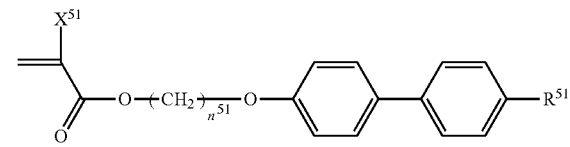
(5-B)
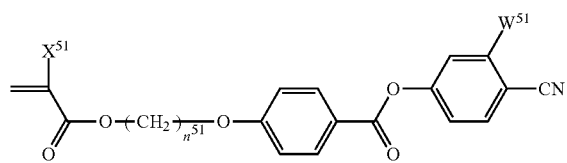
(5-C)
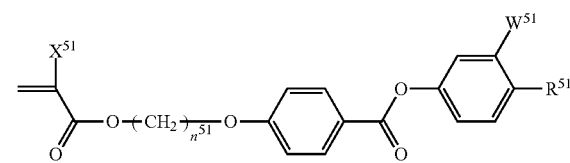
(5-D)
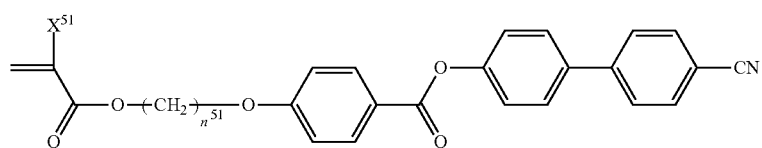
(5-E)
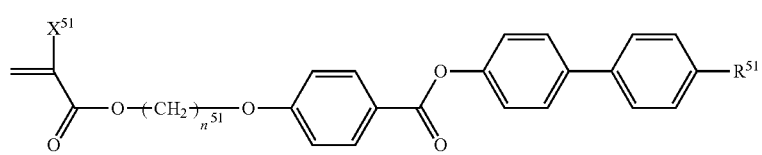
(5-F)

-continued
Formula 24
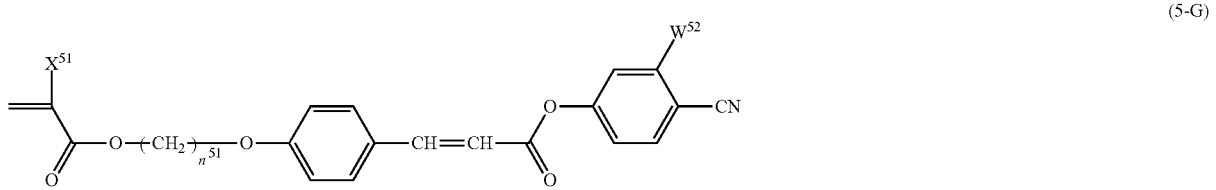
(5-G)
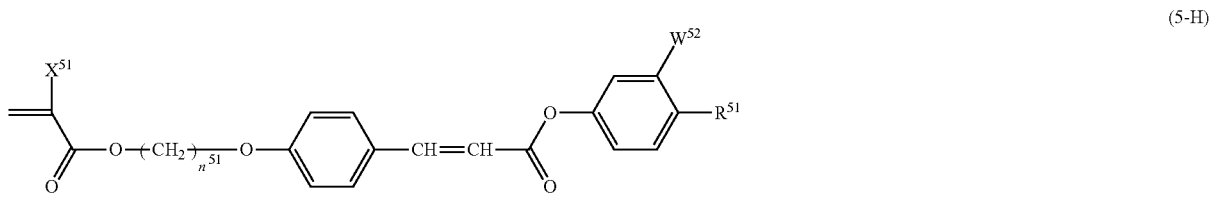
(5-H)
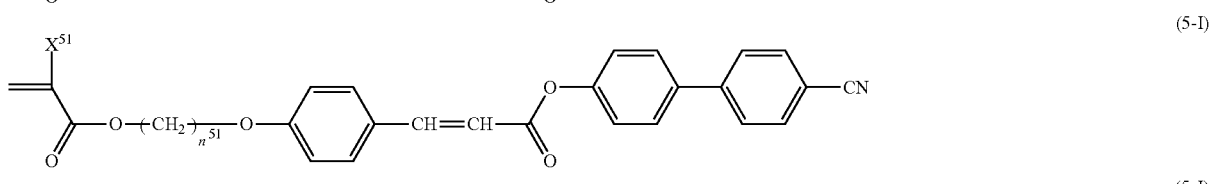
(5-I)
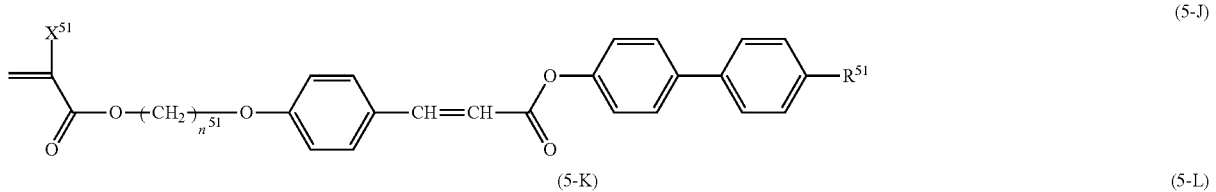
(5-J)
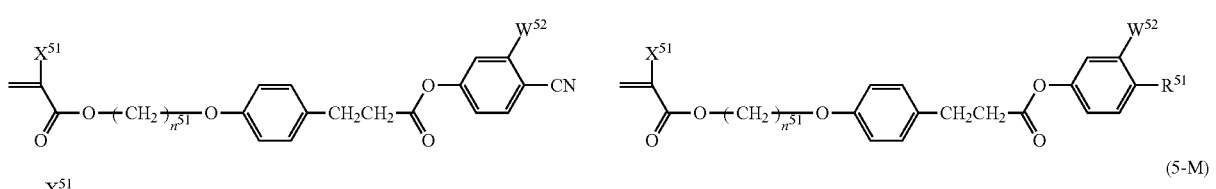
(5-K)  (5-L)
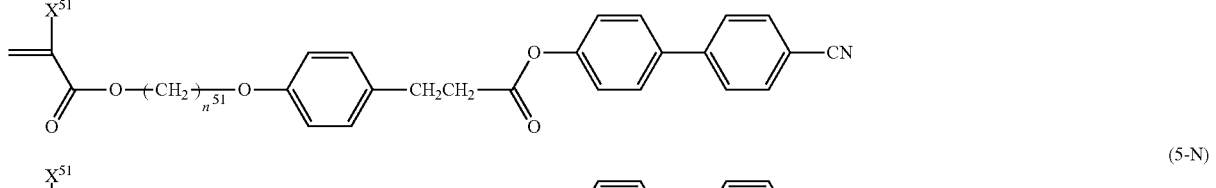
(5-M)
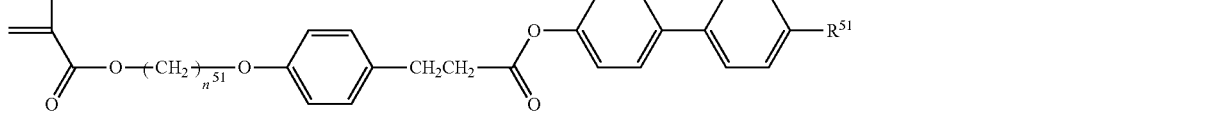
(5-N)
Formula 25
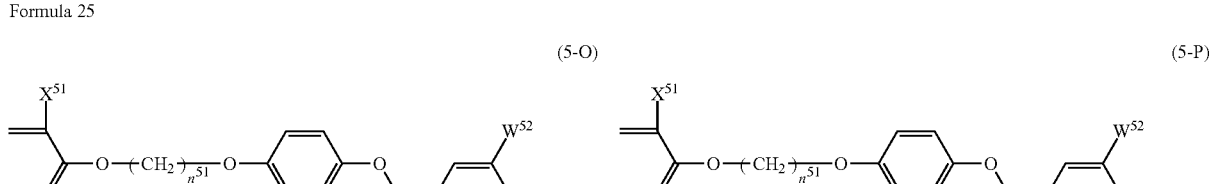
(5-O)  (5-P)
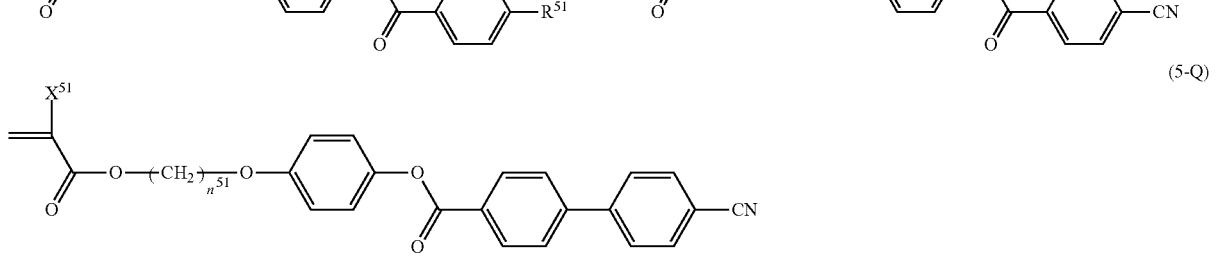
(5-Q)

-continued

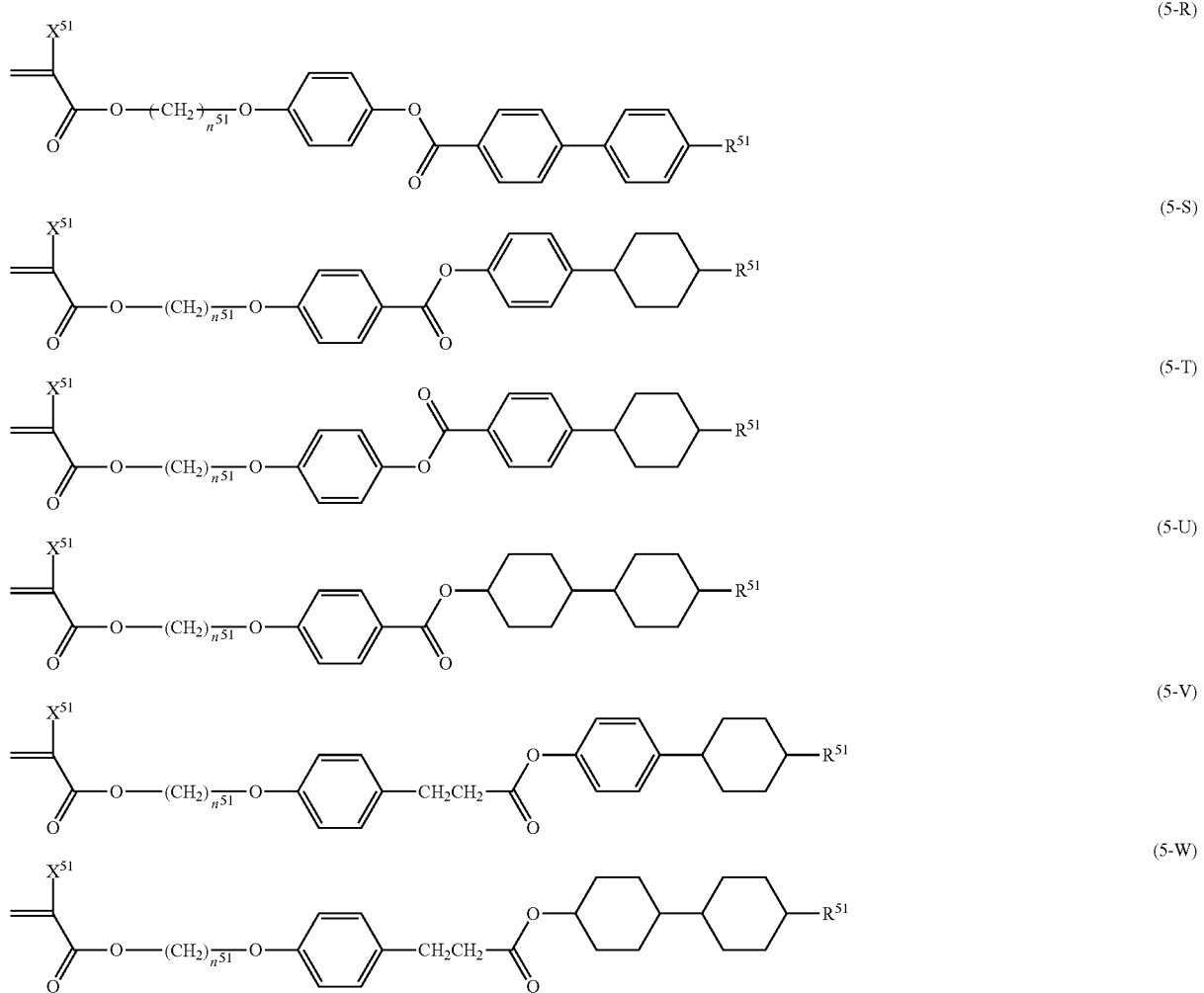

In formulas (5-A) to (5-W), $X^{51}$ is hydrogen or methyl, $W^{52}$ is hydrogen or fluorine, $R^{51}$ is alkyl having 1 to 20 carbons (preferably, straight-chain alkyl having 1 to 10 carbons), alkoxy having 1 to 20 carbons (preferably, straight-chain alkoxy having 1 to 10 carbons), trifluoromethoxy, alkyl ester having 1 to 20 carbons (—COOR$^c$, —OCOR$^c$ or —CH=CH—COOR; R$^c$ is straight-chain alkyl having 1 to 20 carbons (preferably, 1 to 10 carbons)), and $n^{51}$ is an integer from 2 to 10, and preferably, an integer from 3 to 6.

In formulas (5-G) to (5-J), a trans isomer is further preferred.

Specific examples of compound (1), compound (2), compound (3), compound (4) and compound (5) are shown below.

Formula 26

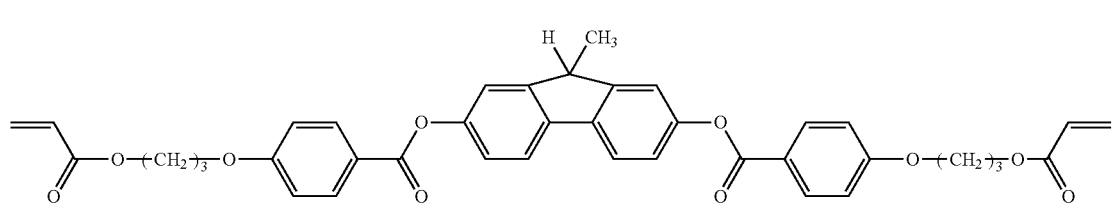

-continued
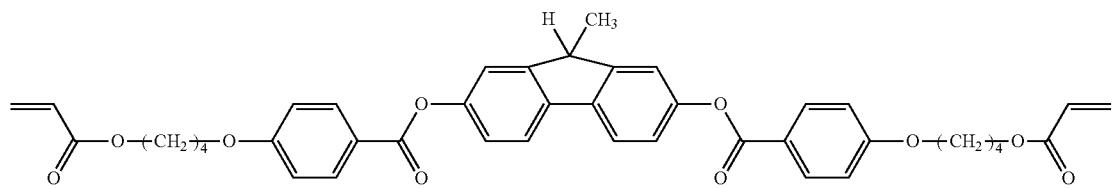
(1-1-A2)
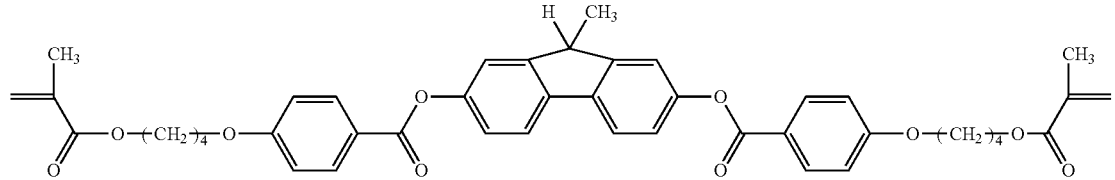
(1-1-A3)
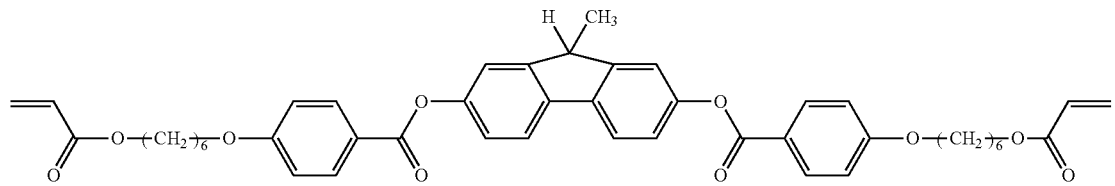
(1-1-A4)
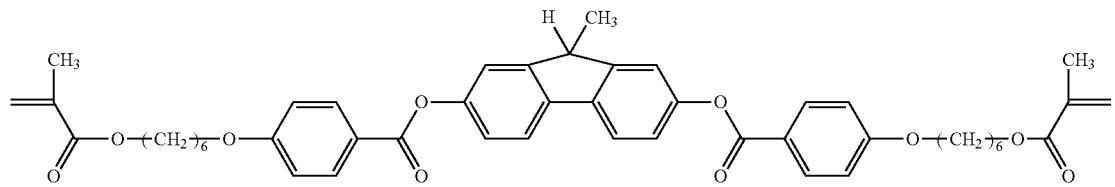
(1-1-A5)
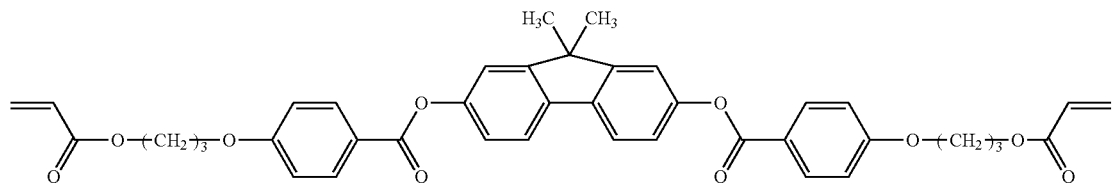
(1-1-B1)
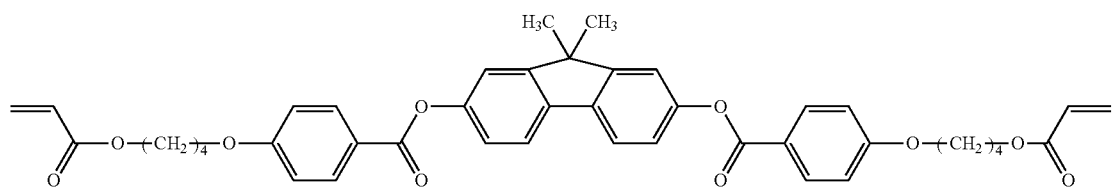
(1-1-B2)
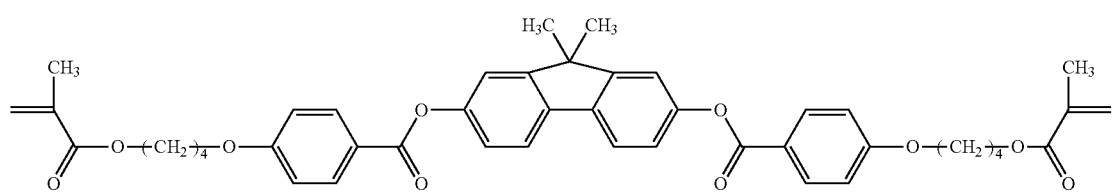
(1-1-B3)
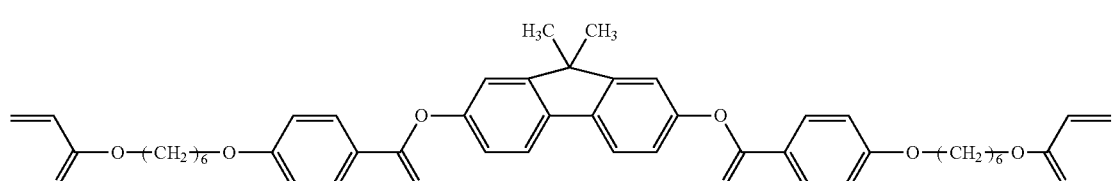
(1-1-B4)

-continued
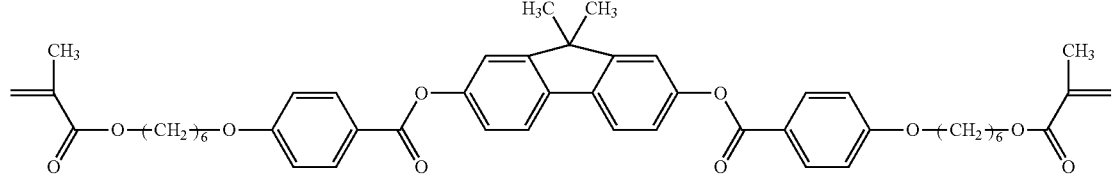
(1-1-B5)
Formula 27
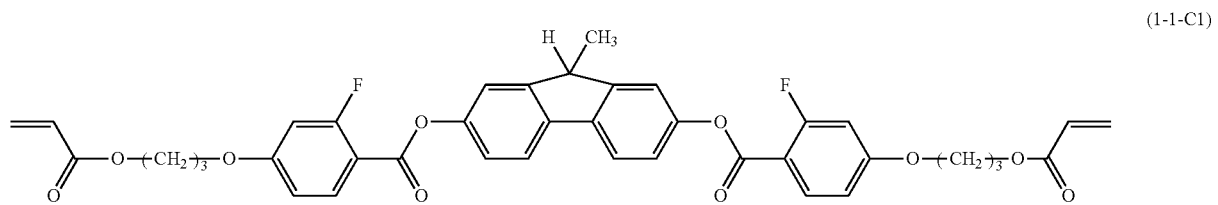
(1-1-C1)
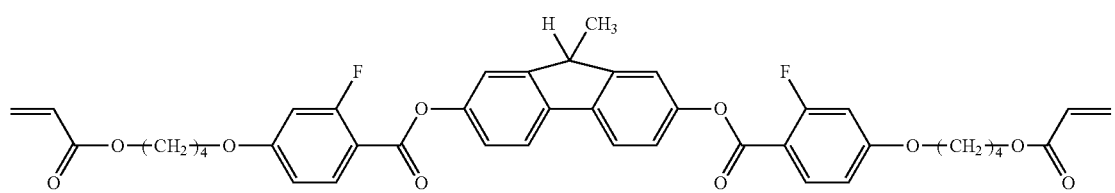
(1-1-C2)
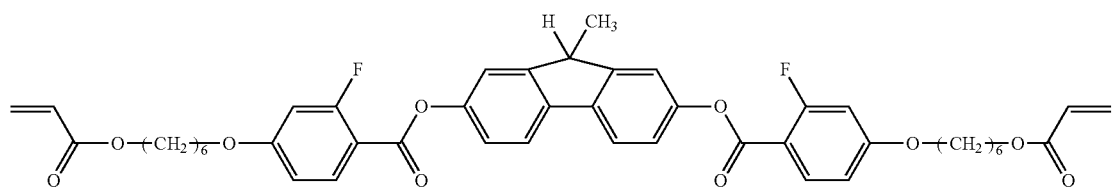
(1-1-C3)
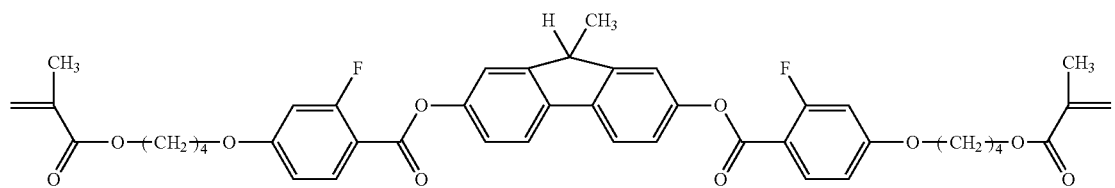
(1-1-C4)
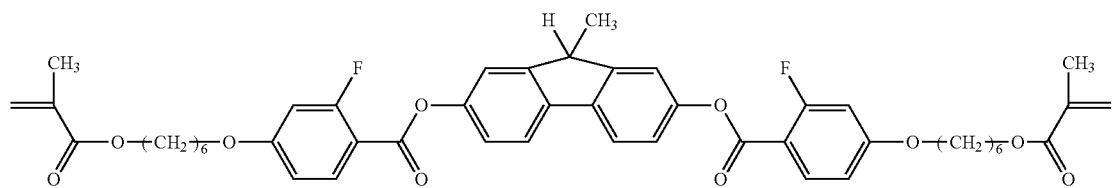
(1-1-C5)
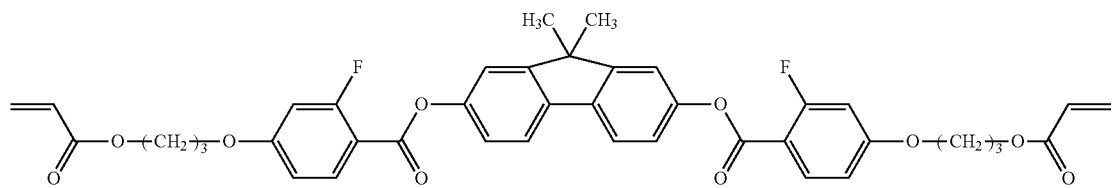
(1-1-D1)
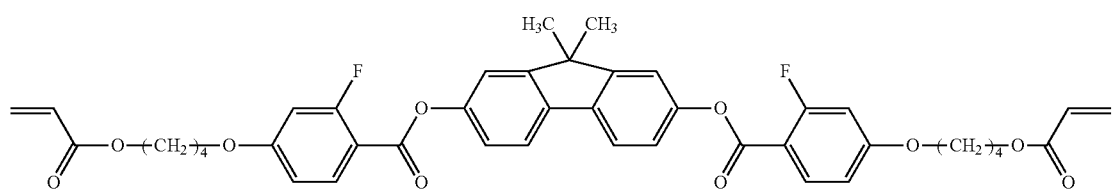
(1-1-D2)

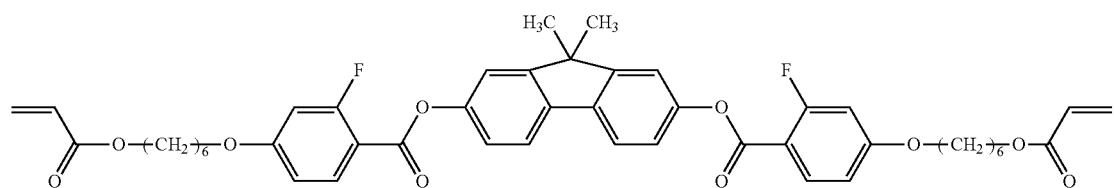
(1-1-D3)
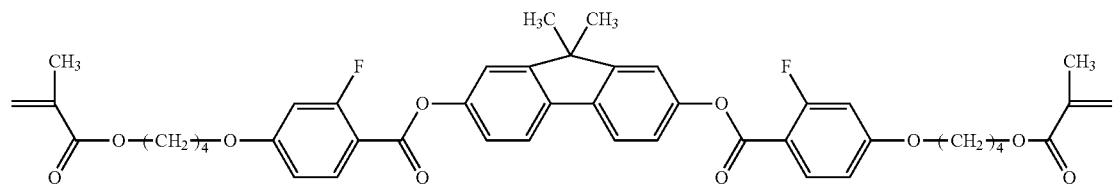
(1-1-D4)
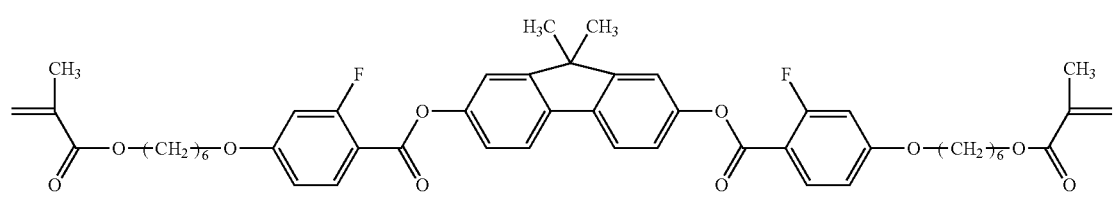
(1-1-D5)
Formula 28
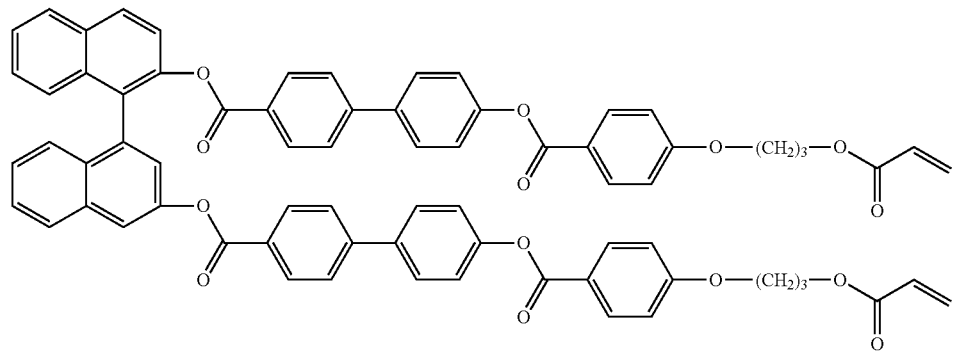
(2-2-A-1)
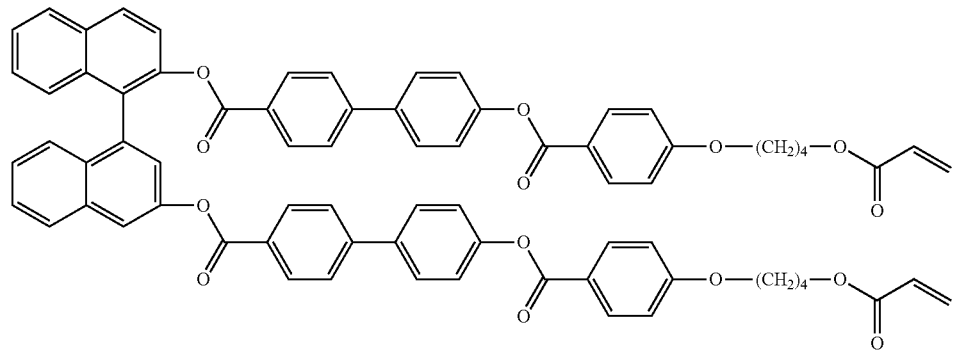
(2-2-A-2)

-continued
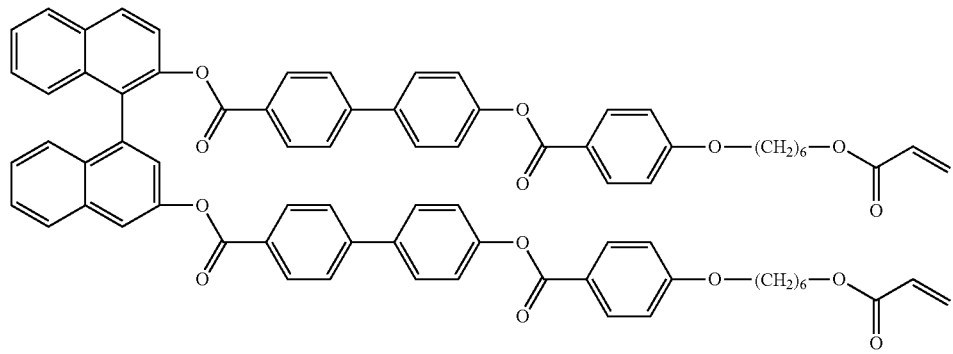
(2-2-A-3)
Formula 29
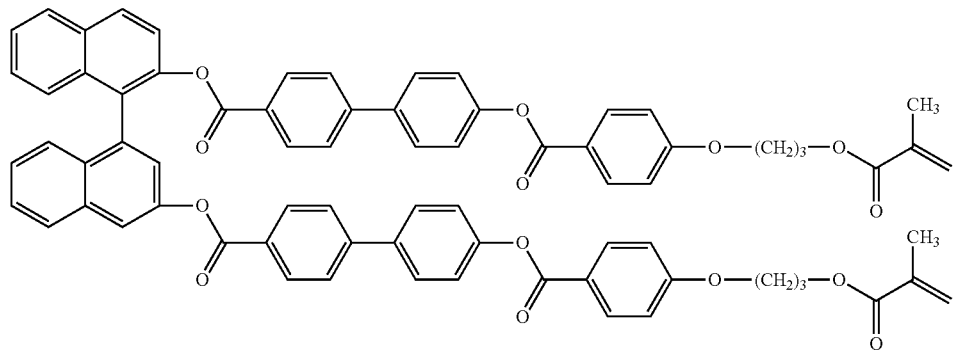
(2-2-A-4)
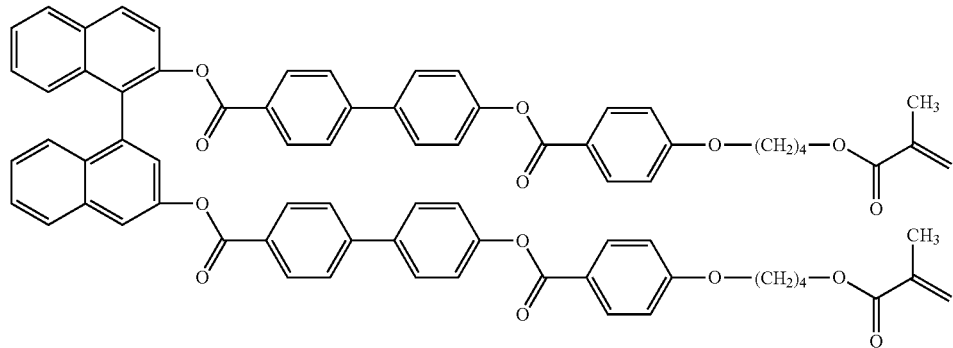
(2-2-A-5)
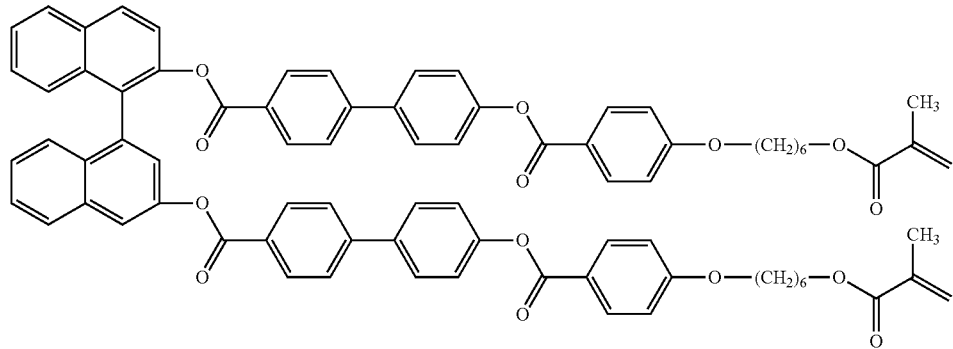
(2-2-A-6)

Formula 30
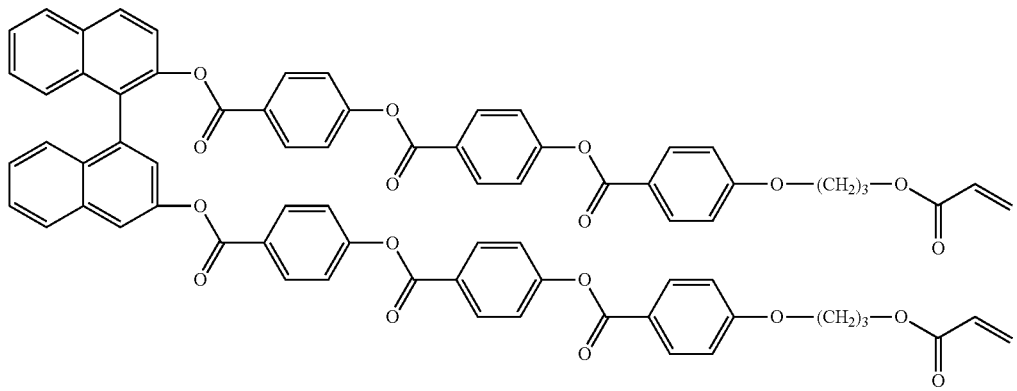
(2-2-B-1)
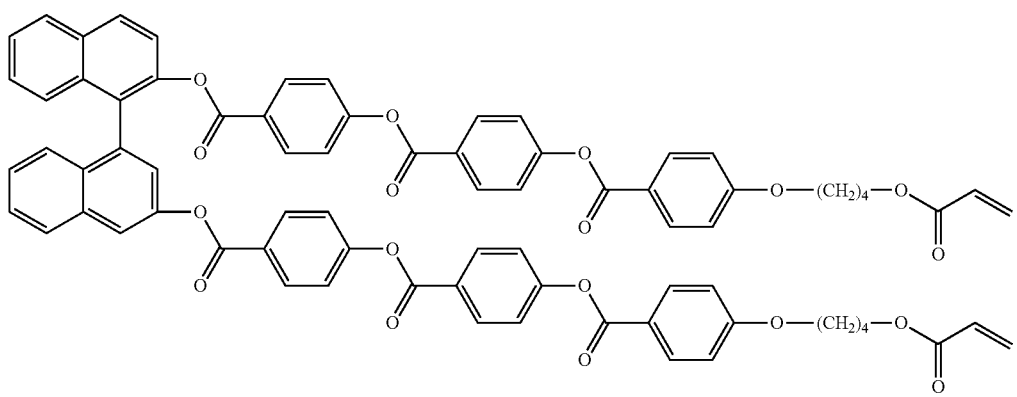
(2-2-B-2)
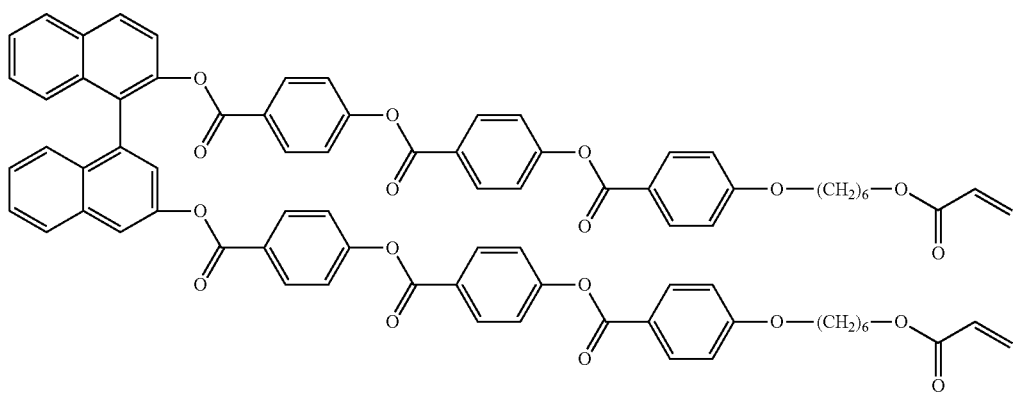
(2-2-B-3)
Formula 31
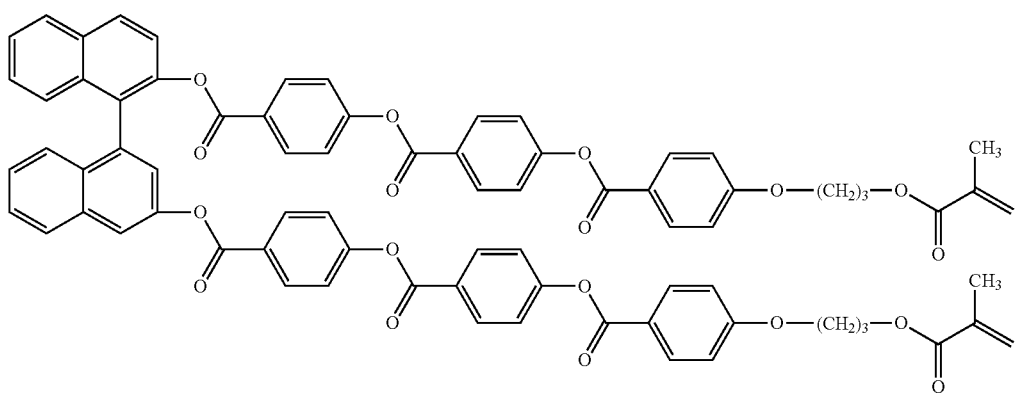
(2-2-B-4)

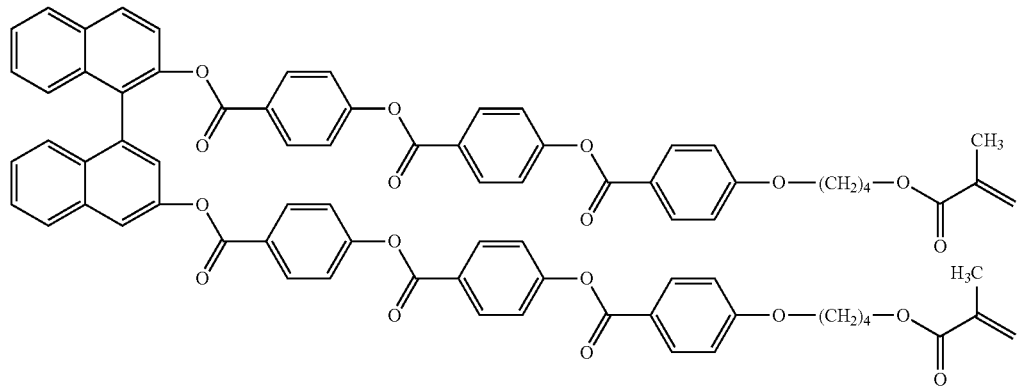
(2-2-B-5)
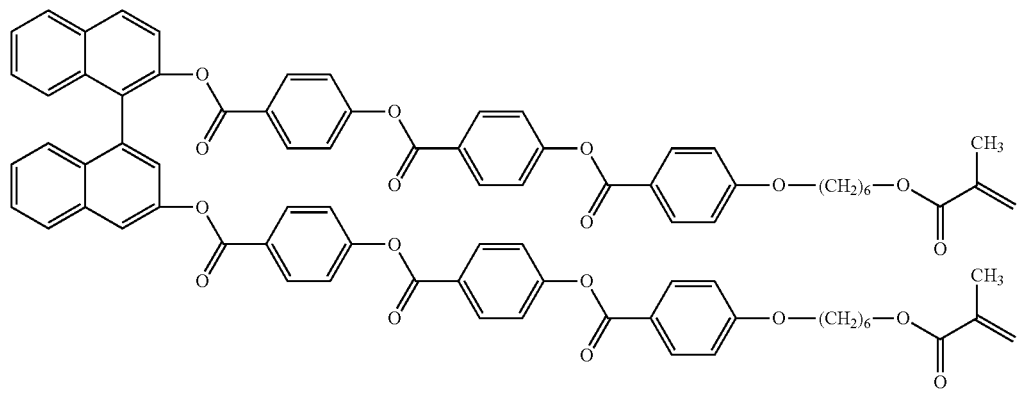
(2-2-B-6)
Formula 32
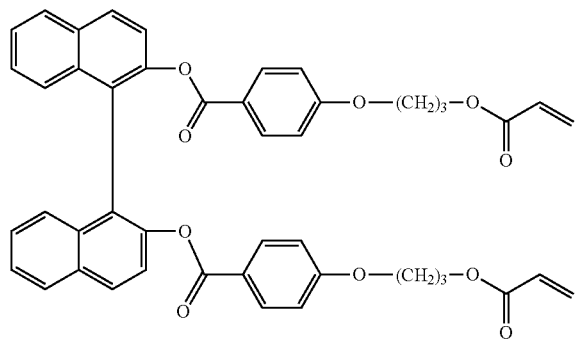
(2-2-C-1)
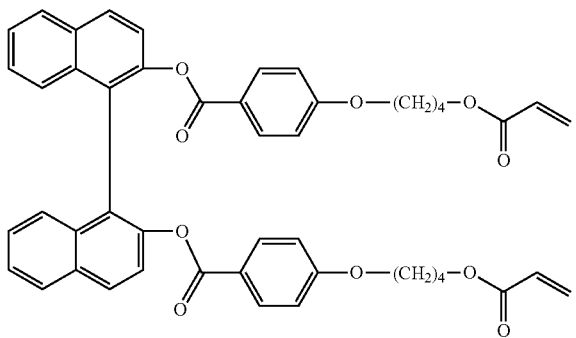
(2-2-C-2)
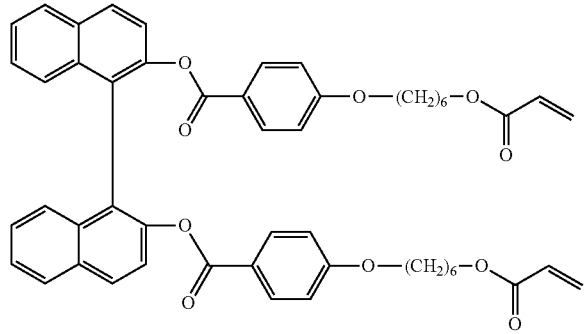
(2-2-C-3)

-continued
Formula 33
(2-2-D-1)
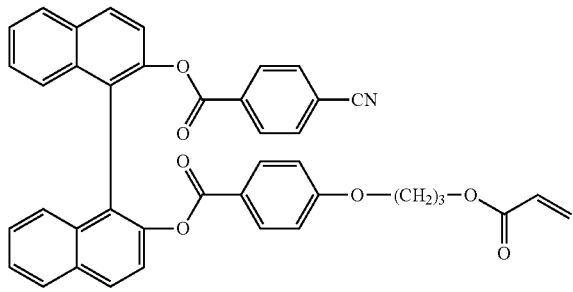
(2-2-D-2)
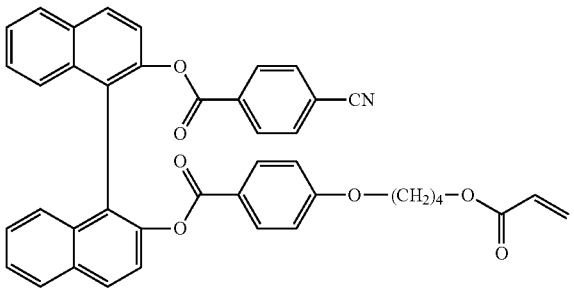
(2-2-D-3)
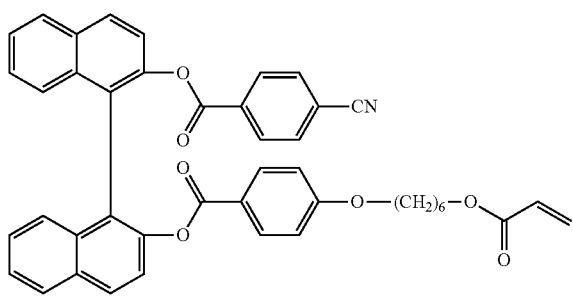
(2-2-E-1)
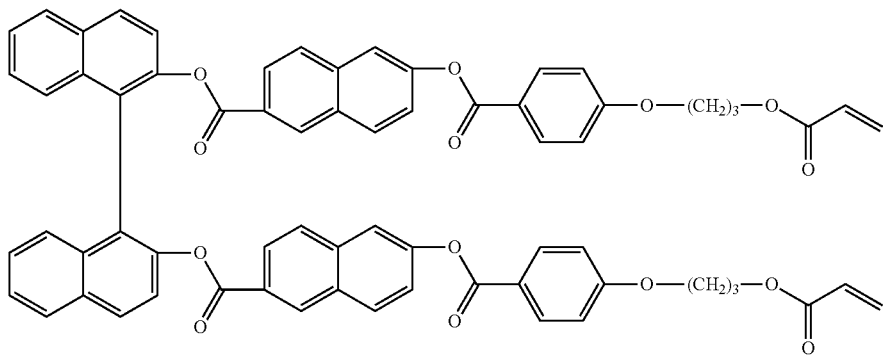
(2-2-E-2)
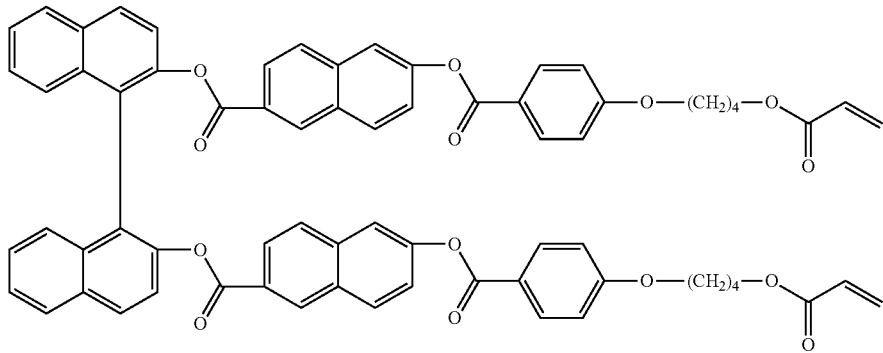

-continued
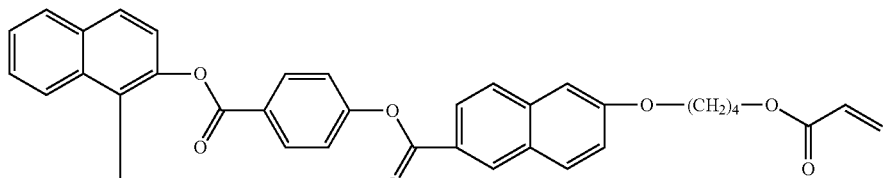
(2-2-F-1)
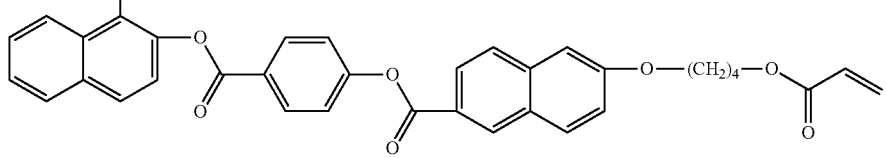
(2-2-G-1)
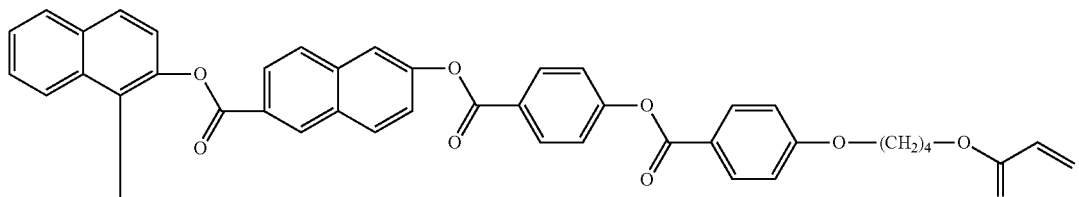
(2-2-H-1)
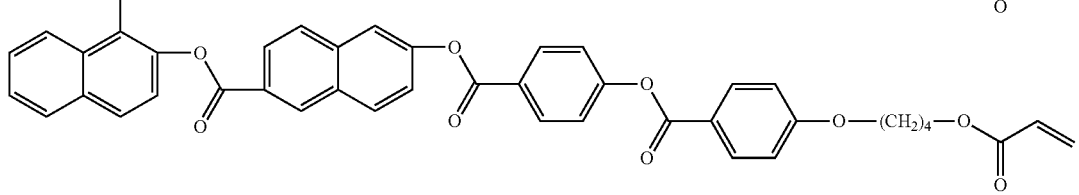
(2-2-I-1)
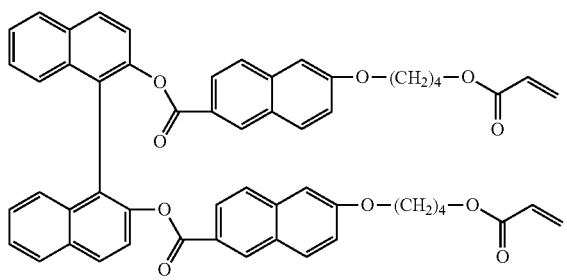
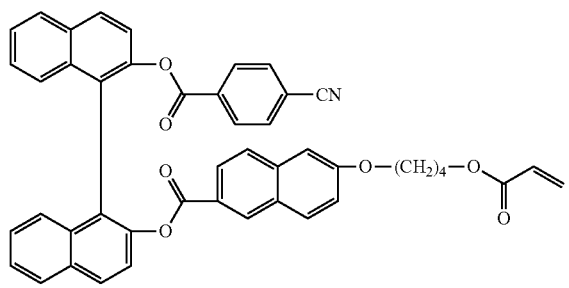
Formula 34
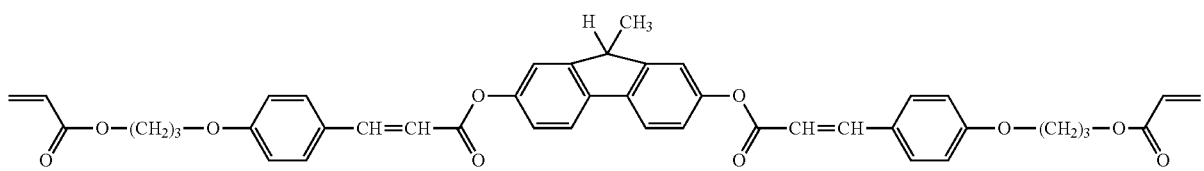
(3-1-A-1)
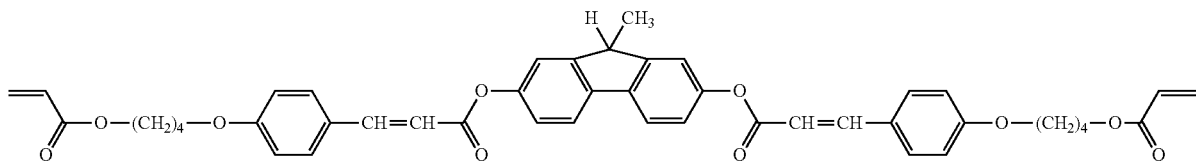
(3-1-A-2)

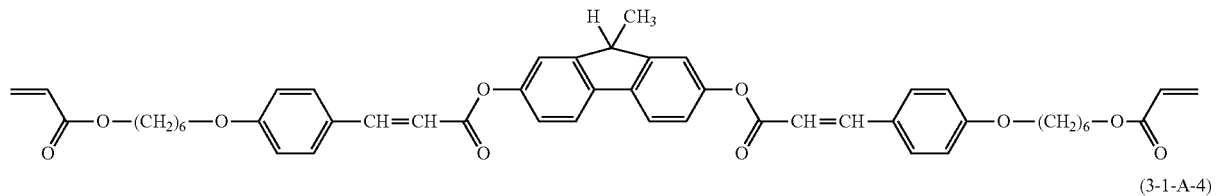
(3-1-A-3)
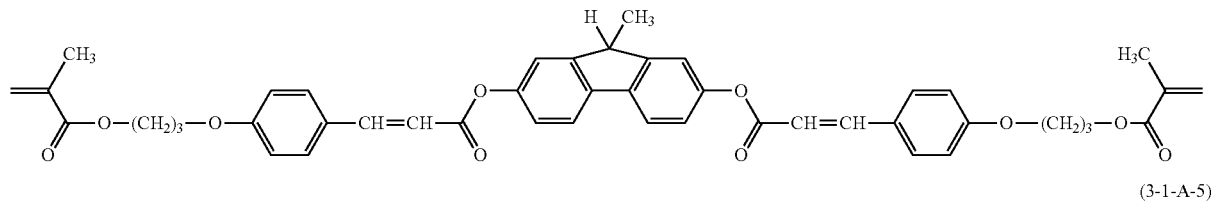
(3-1-A-4)
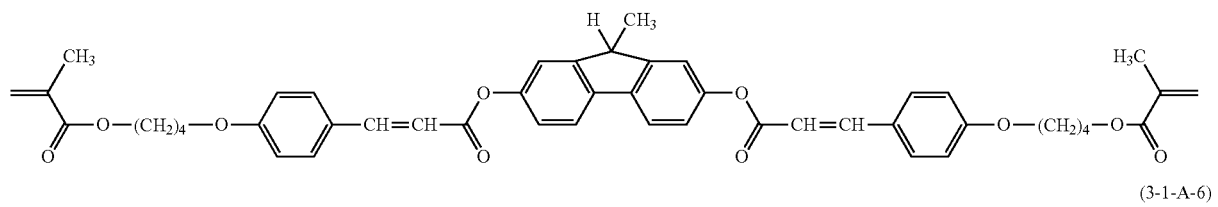
(3-1-A-5)
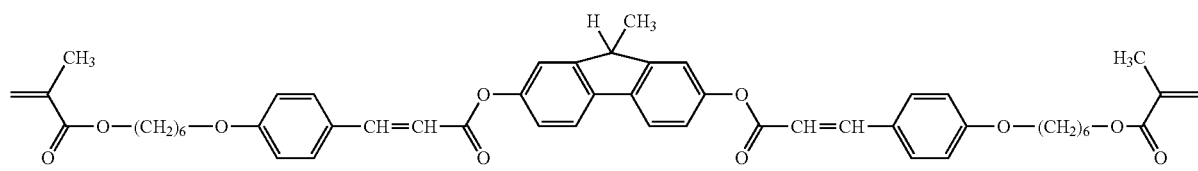
(3-1-A-6)
Formula 35
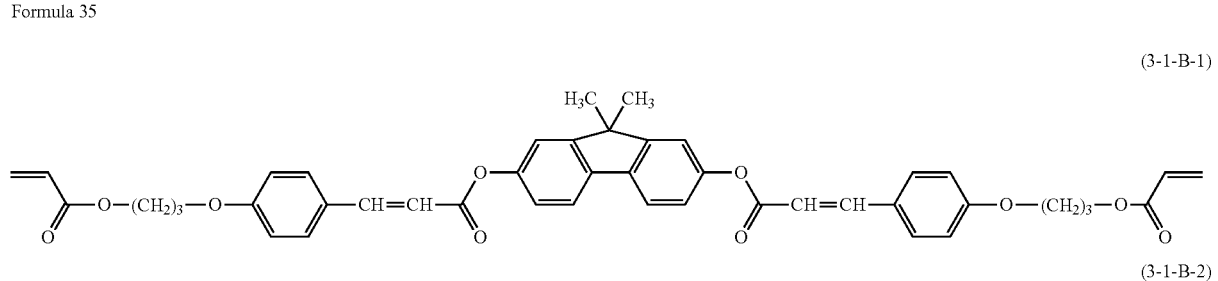
(3-1-B-1)
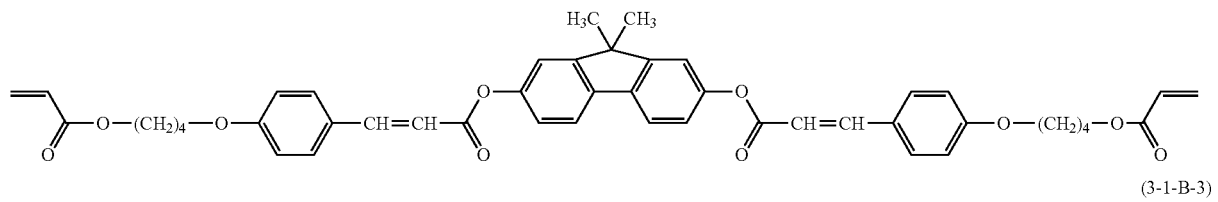
(3-1-B-2)
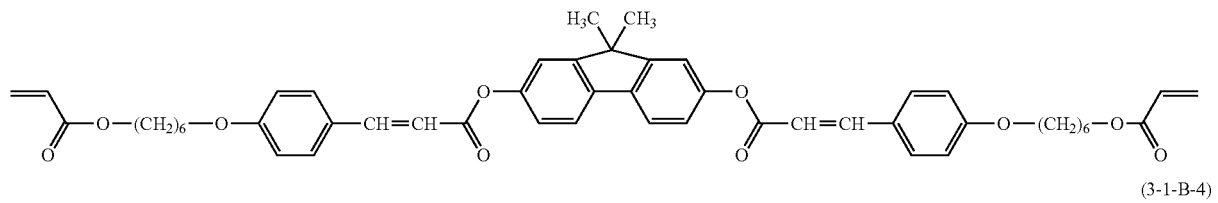
(3-1-B-3)
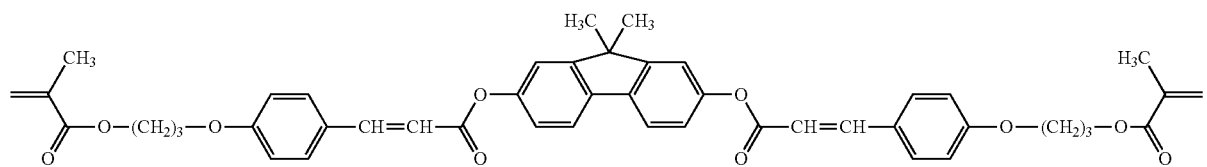
(3-1-B-4)

(3-1-B-5)
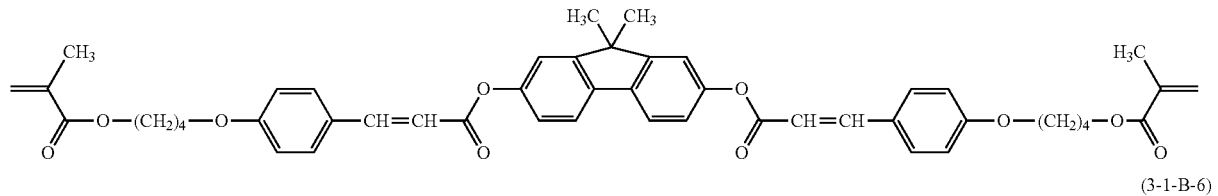
(3-1-B-6)
Formula 36
(3-1-C-1)
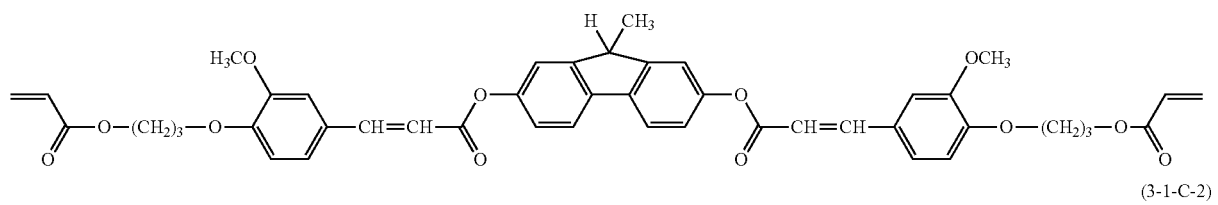
(3-1-C-2)
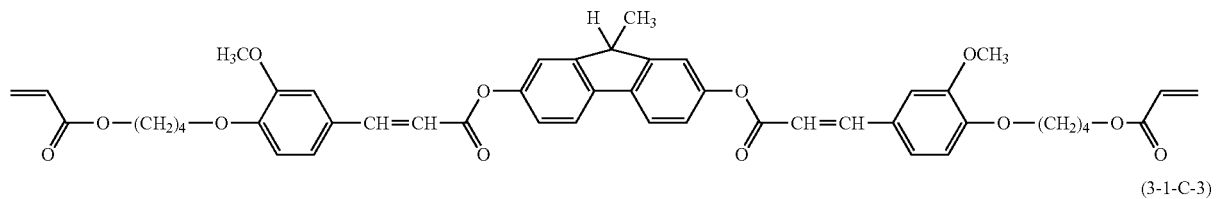
(3-1-C-3)
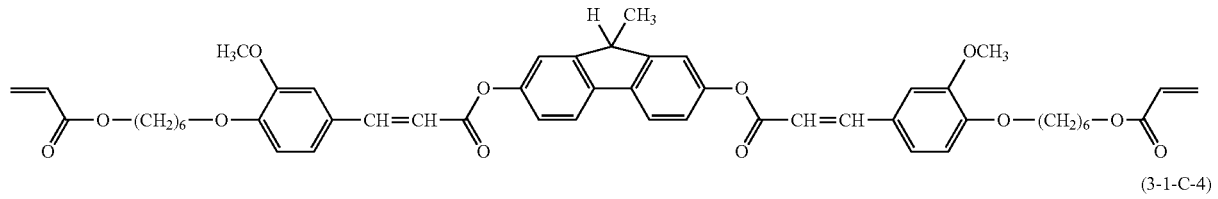
(3-1-C-4)
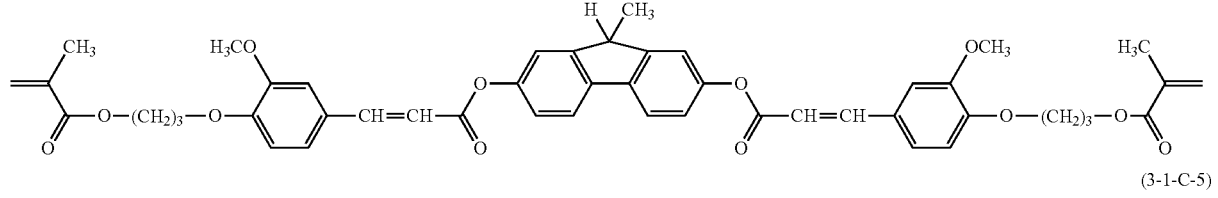
(3-1-C-5)
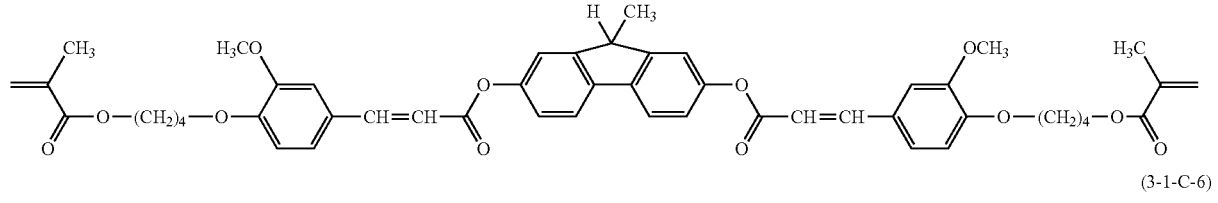
(3-1-C-6)
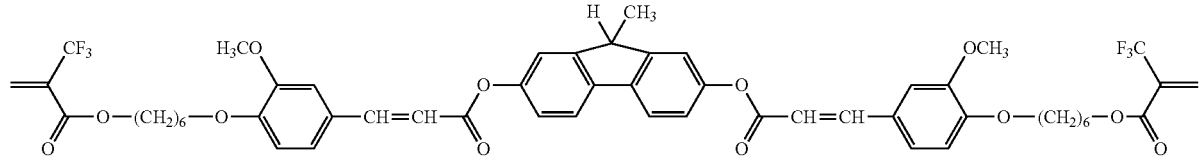

Formula 37
(3-1-D-1)
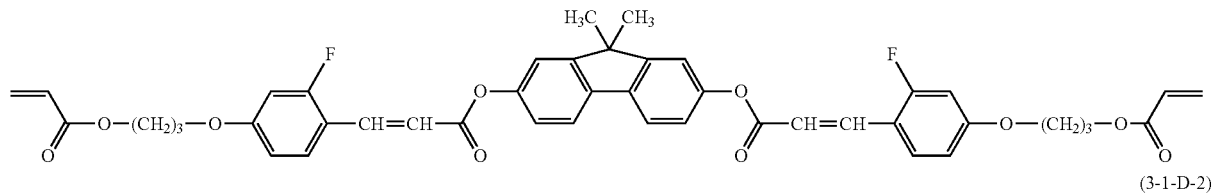
(3-1-D-2)
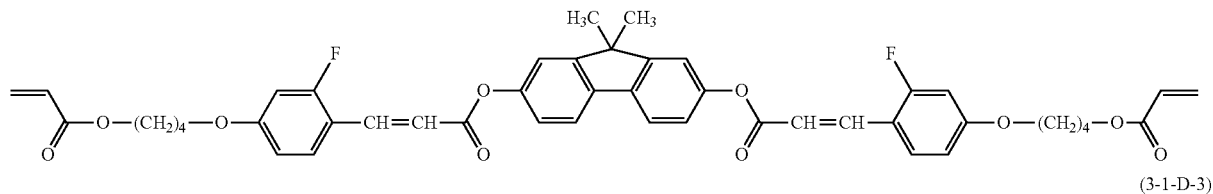
(3-1-D-3)
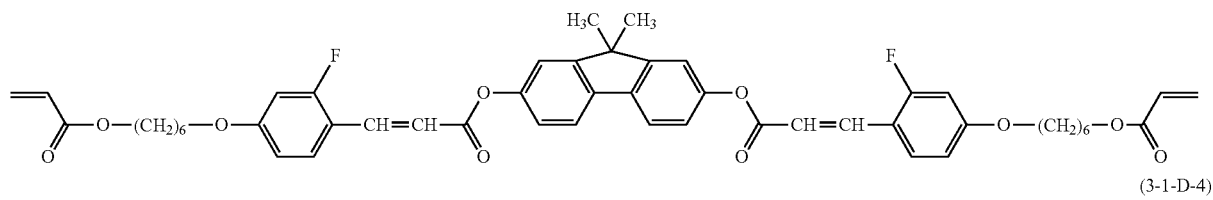
(3-1-D-4)
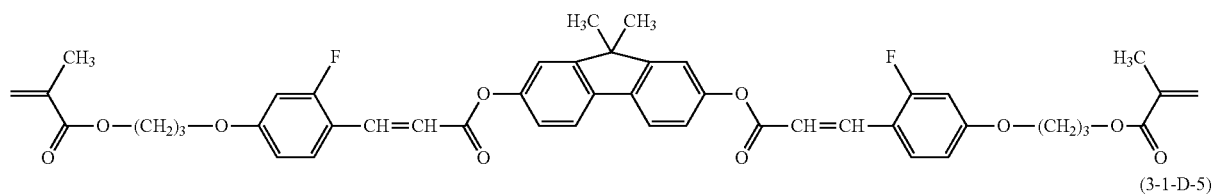
(3-1-D-5)
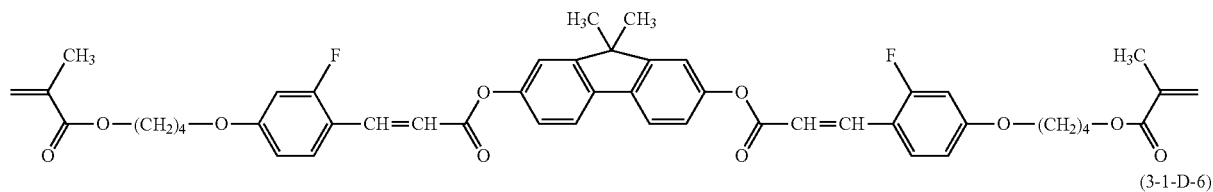
(3-1-D-6)
Formula 38
(3-1-E-1)
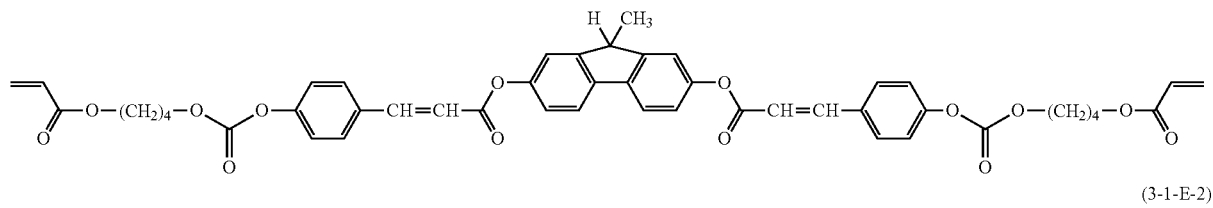
(3-1-E-2)
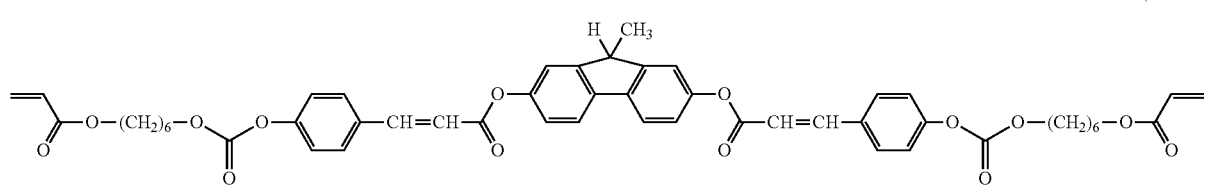

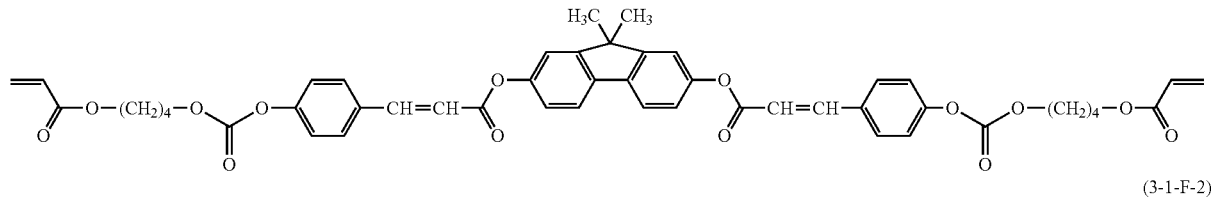
(3-1-F-1)
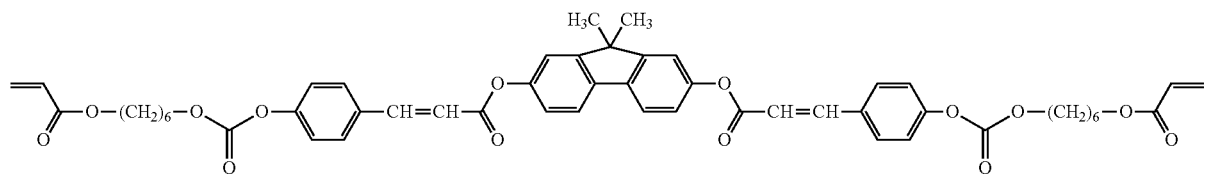
(3-1-F-2)
wherein, in formulas (3-1-A1) to (3-1-F-2), a trans isomer is preferred, and both of —CH=CH— further preferably take a trans form.
Formula 39
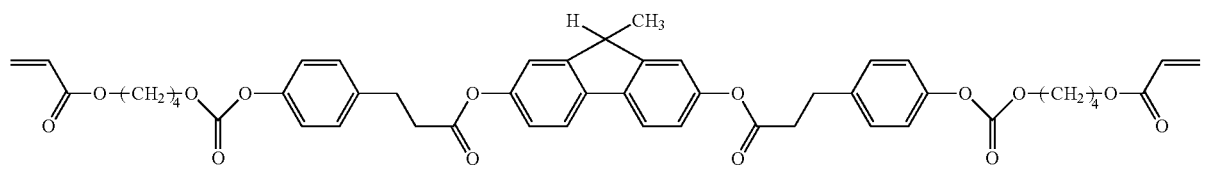
(3-2-A-1)
(3-2-A-2)
(3-2-B-1)
(3-2-B-2)
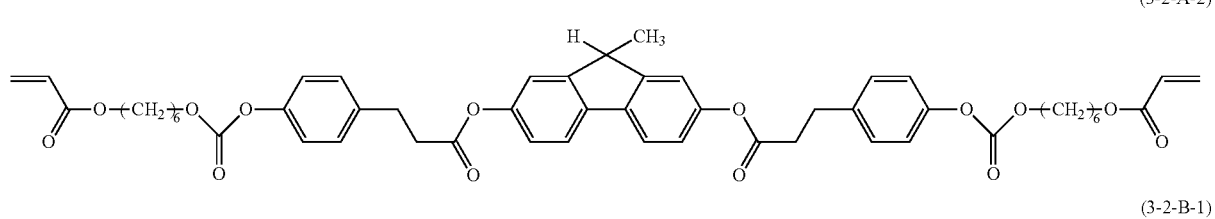
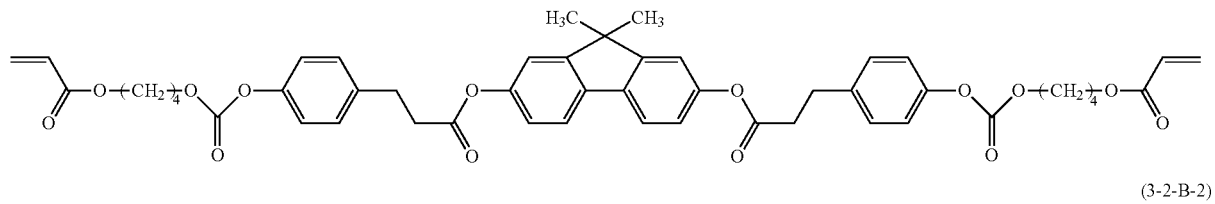
Formula 40
(3-2-C-1)
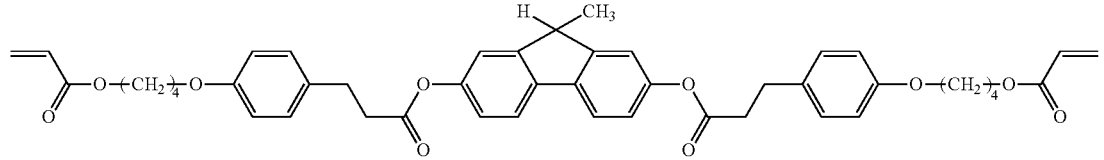

(3-2-C-2)
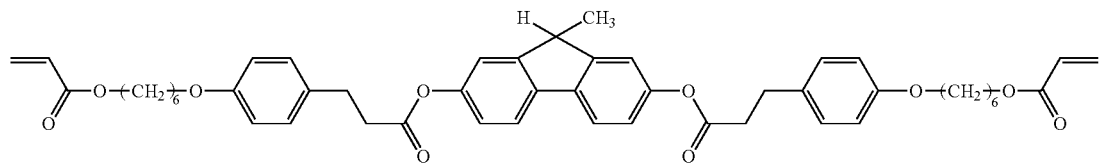
(3-2-D-1)
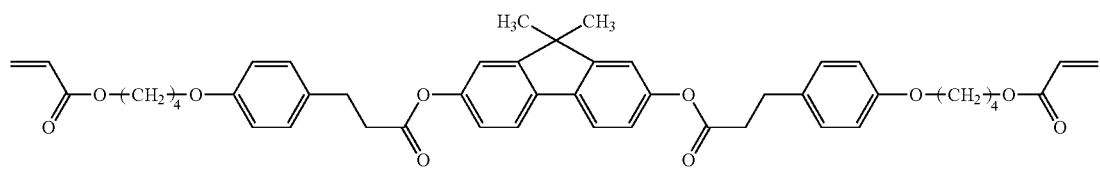
(3-2-D-2)
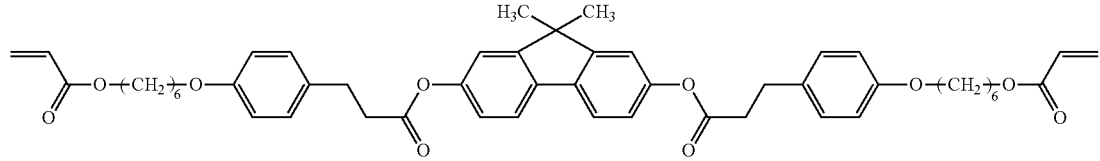
Formula 41
(4-A-1)
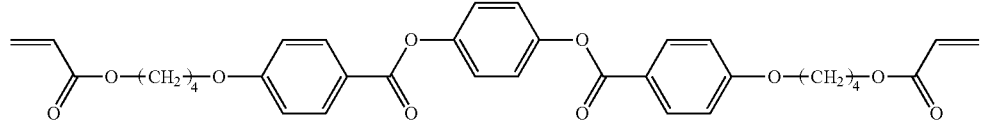
(4-A-2)
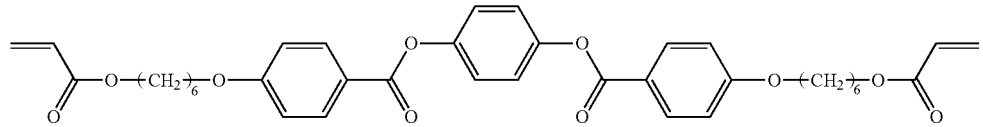
(4-A-3)
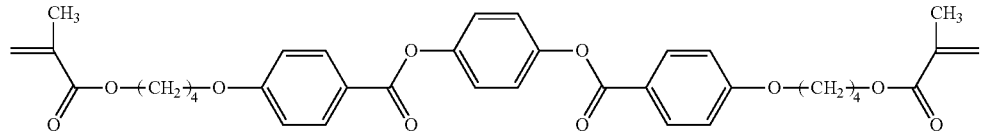
(4-A-4)
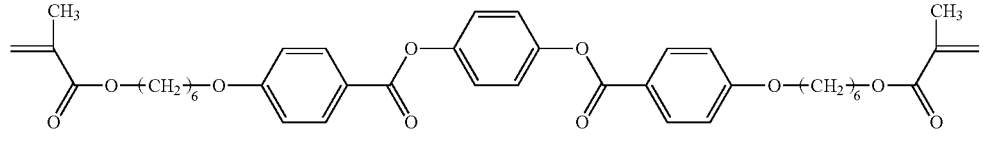
(4-A-5)
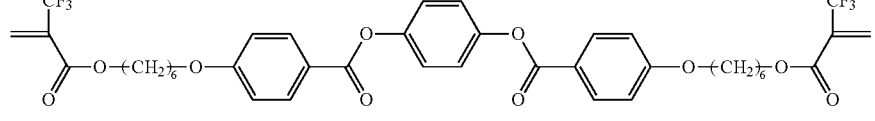
(4-M-1)
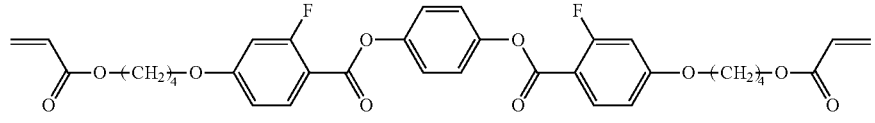
(4-M-2)
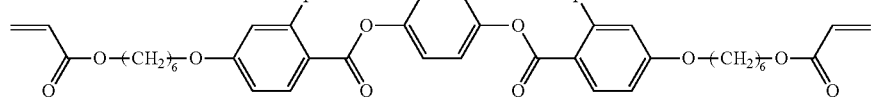

-continued
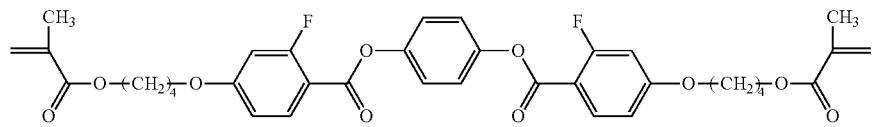
(4-M-3)
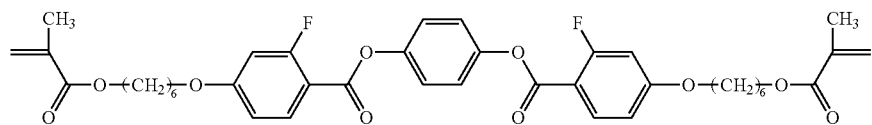
(4-M-4)
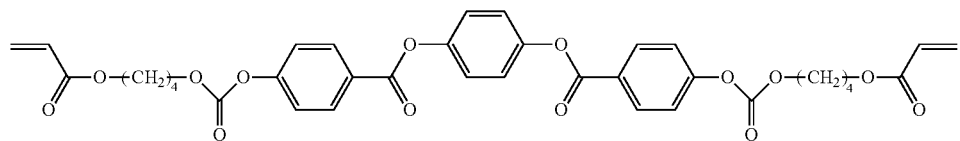
(4-B-1)
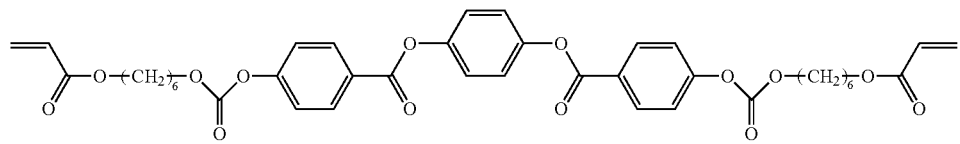
(4-B-2)
Formula 42
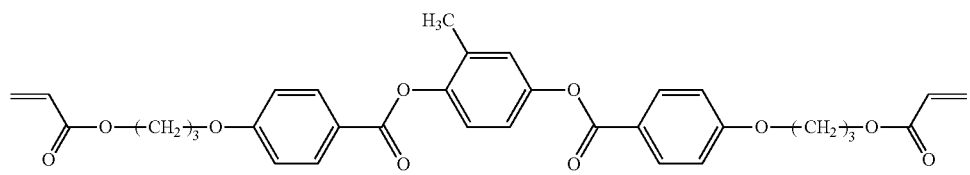
(4-C-1)
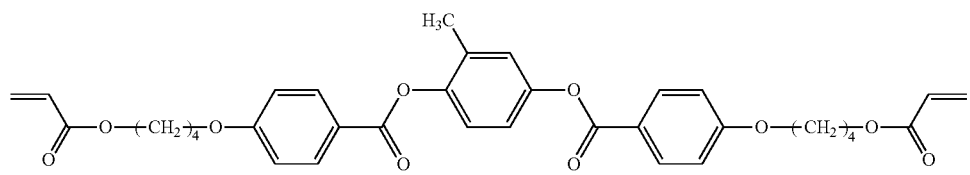
(4-C-2)
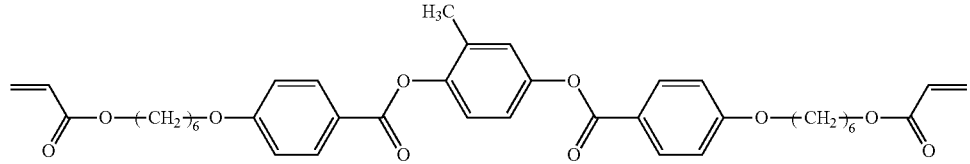
(4-C-3)
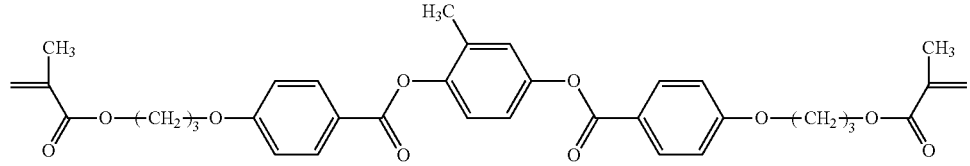
(4-C-4)
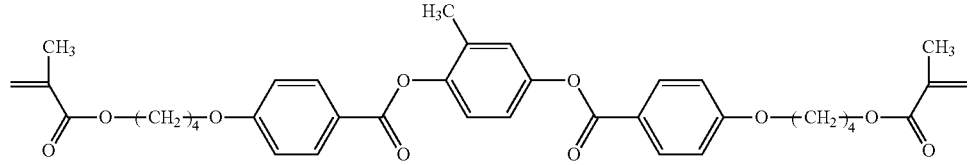
(4-C-5)

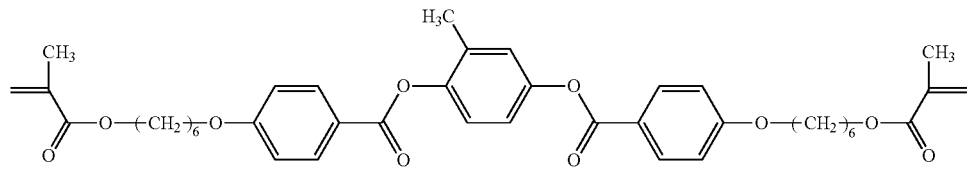
(4-C-6)
Formula 43
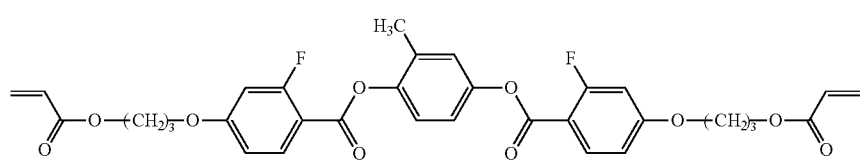
(4-N-1)
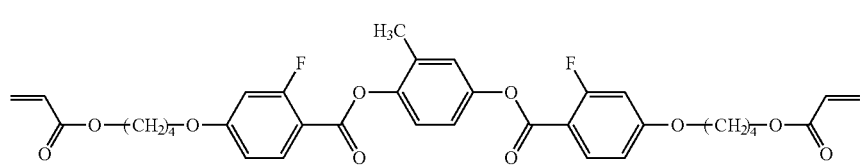
(4-N-2)
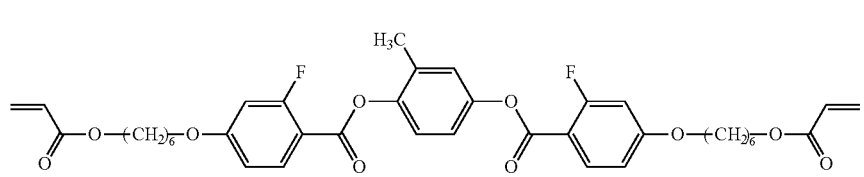
(4-N-3)
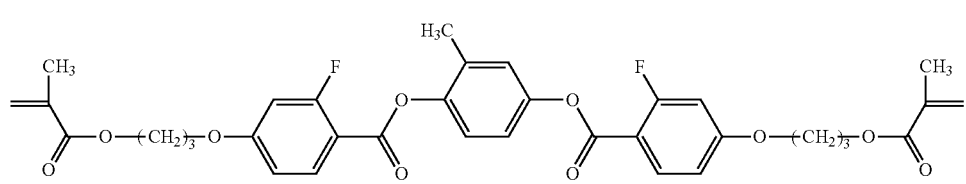
(4-N-4)
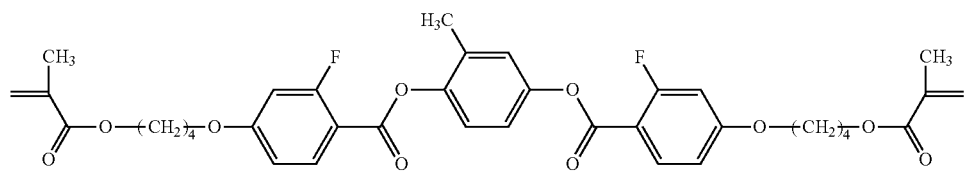
(4-N-5)
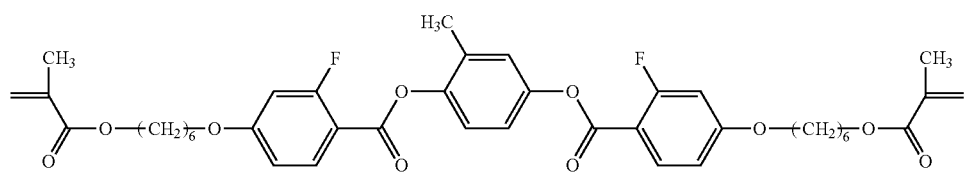
(4-N-6)
Formula 44
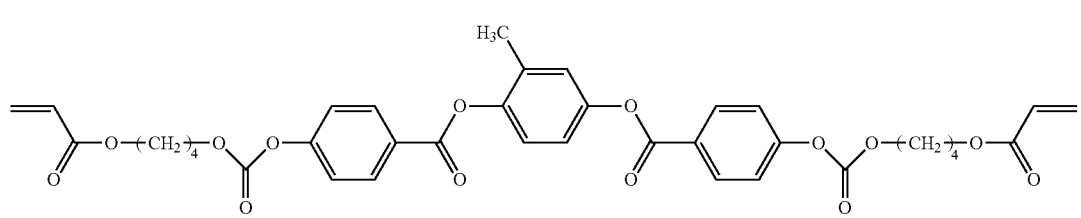
(4-D-1)

(4-D-2)
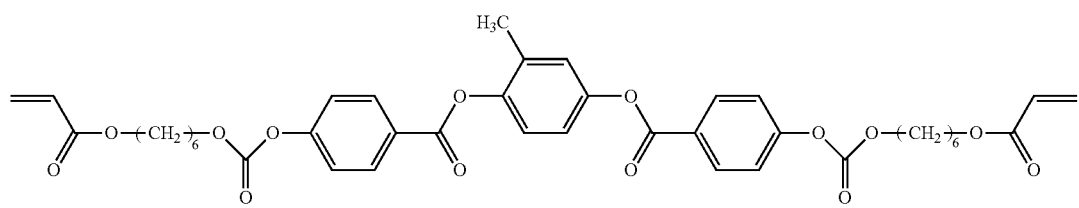
Formula 45
(4-O-1)
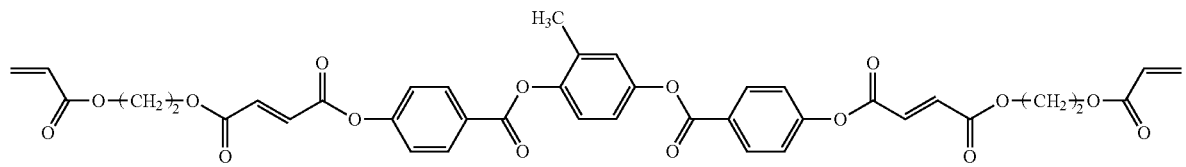
(4-O-2)
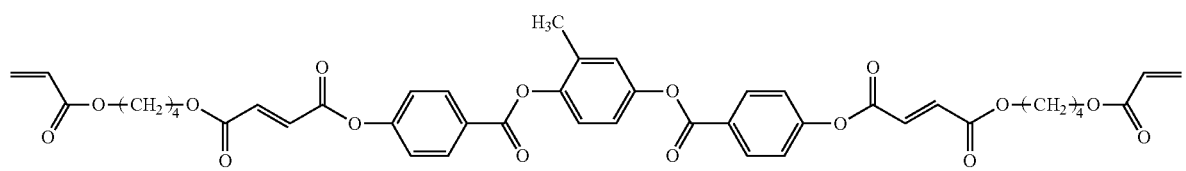
(4-O-3)
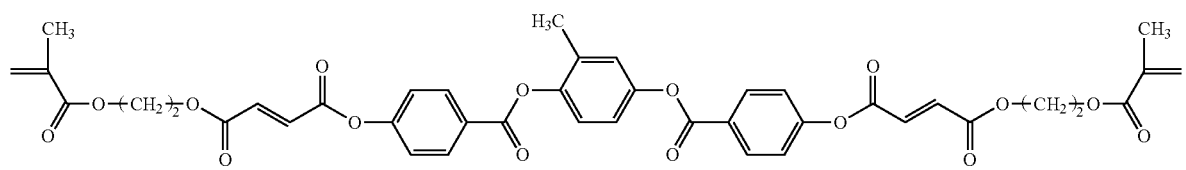
(4-O-4)
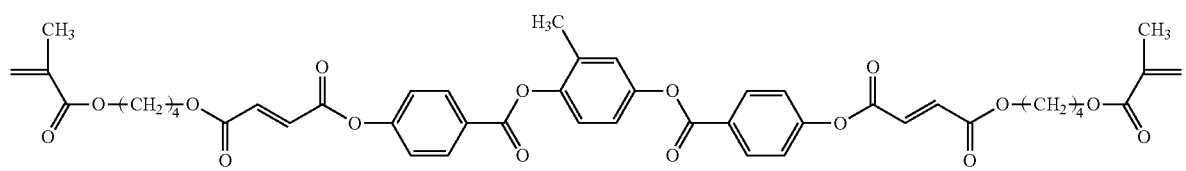
Formula 46
(4-P-1)
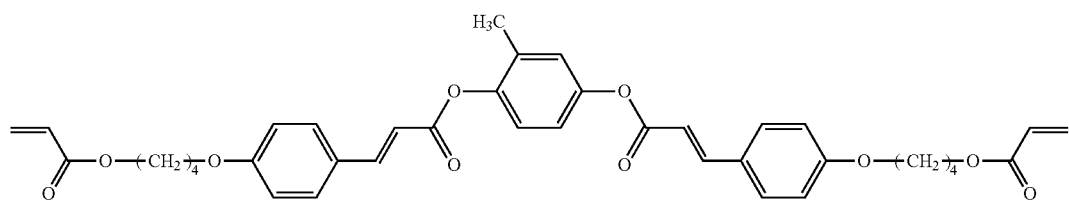
(4-P-2)
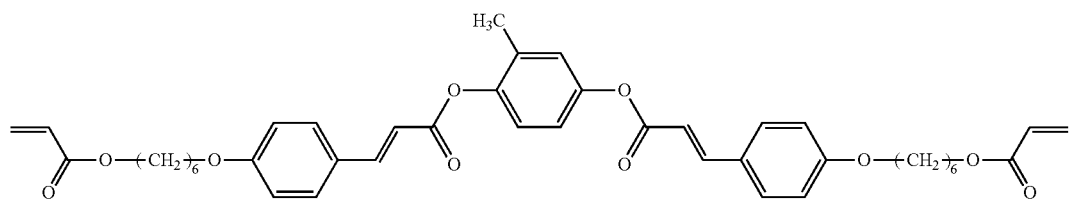

(4-Q-1)
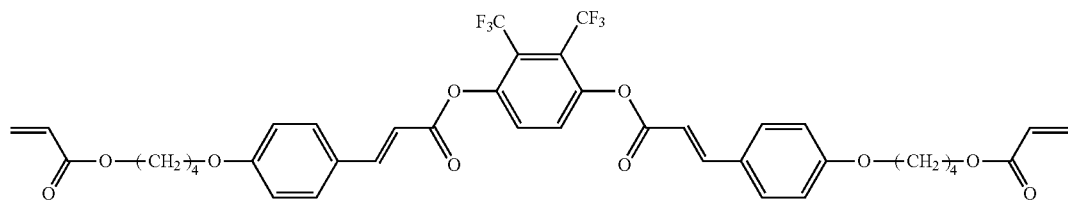
(4-Q-2)
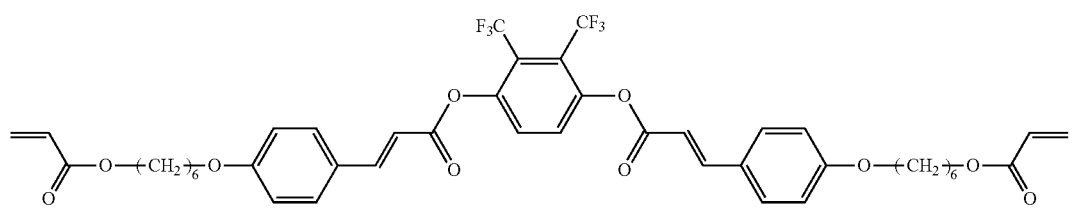
Formula 47
(4-R-1)
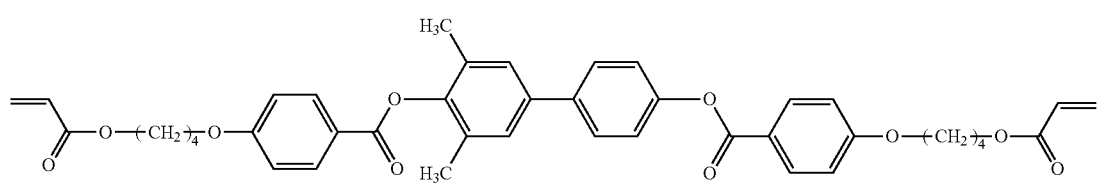
(4-R-2)
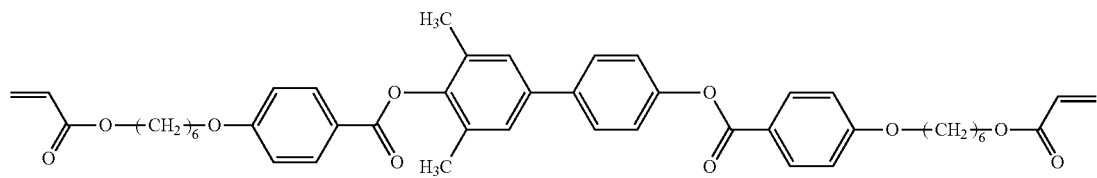
(4-R-3)
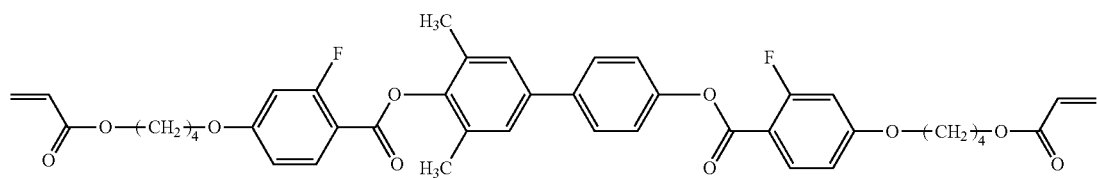
(4-R-4)
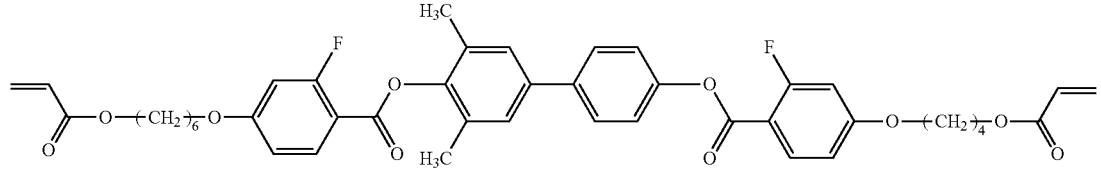
(4-S-1)
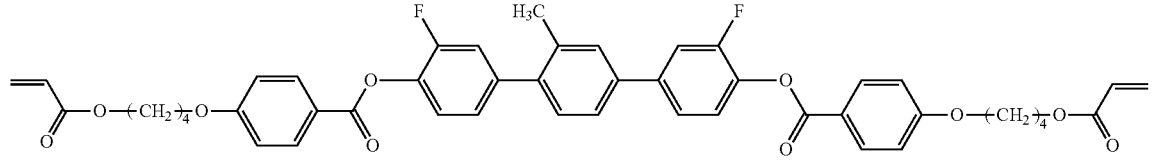
(4-S-2)
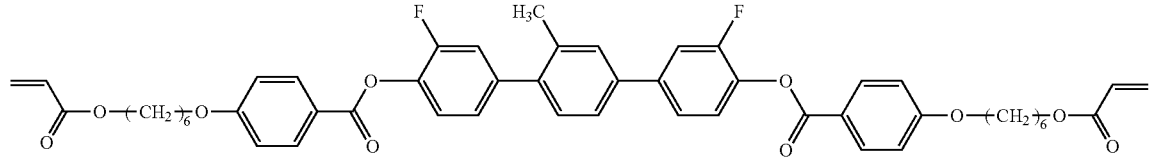

-continued
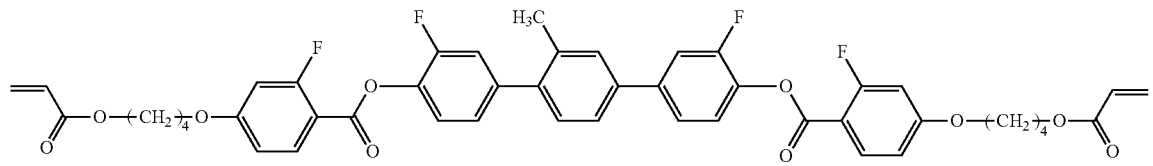
(4-S-3)
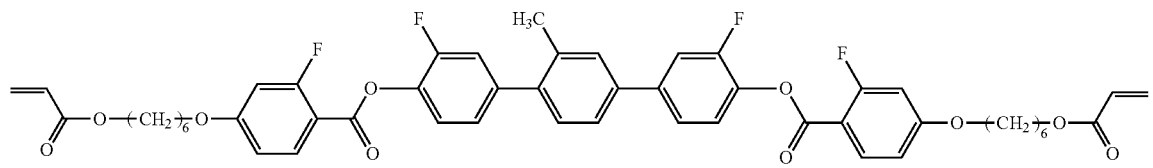
(4-S-4)
Formula 48
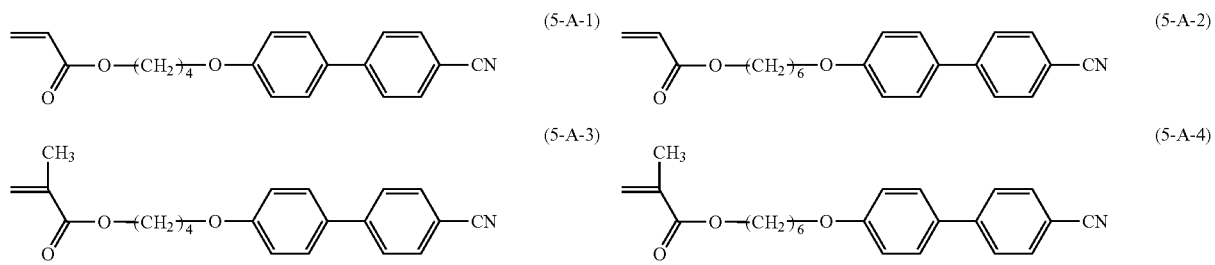
Formula 49
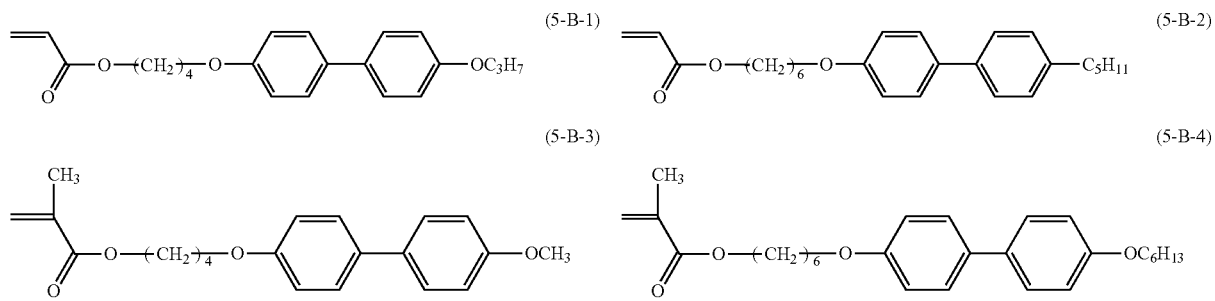
Formula 50
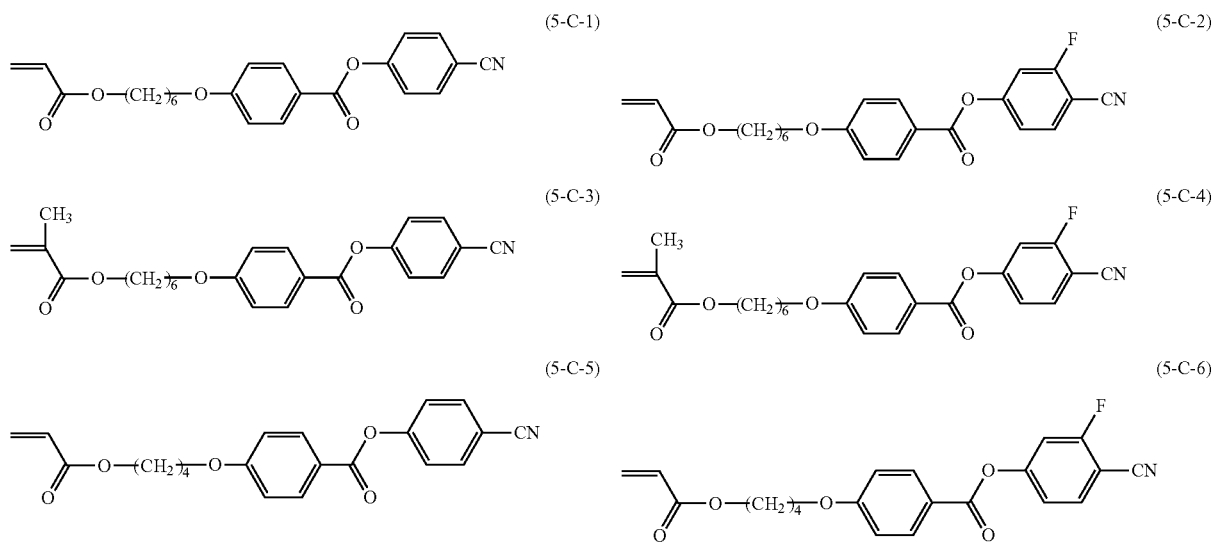

-continued
(5-C-7) 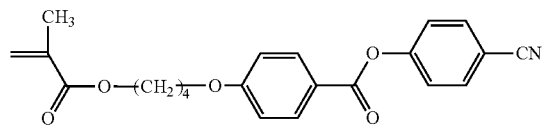
Formula 51
(5-C-8) 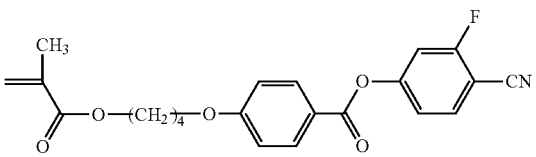
(5-D-1) 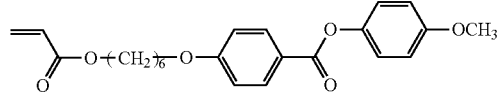
(5-D-2)
(5-D-3) 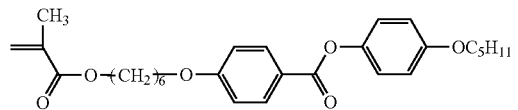
(5-D-4)
(5-D-5) 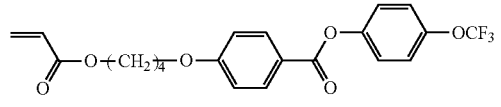
(5-D-6)
(5-D-7) 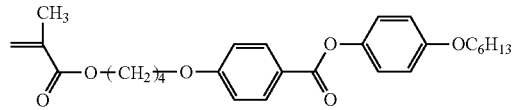
(5-D-8)
Formula 52
(5-E-1) 
(5-E-2)
(5-E-3) 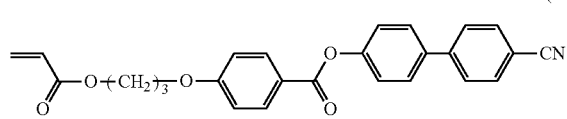
(5-E-4)
(5-F-1) 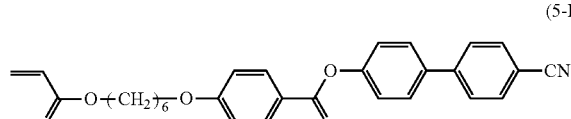
(5-F-2)
(5-F-3) 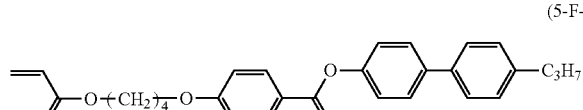
(5-F-4)
Formula 53
(5-P-1) 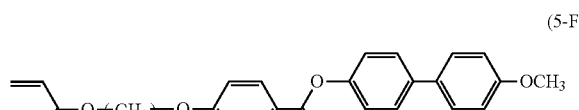
(5-P-2)
(5-P-3) 
(5-P-4)

-continued
(5-O-1)
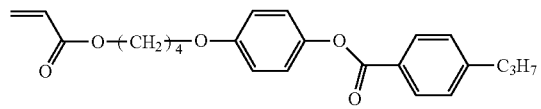
(5-O-2)
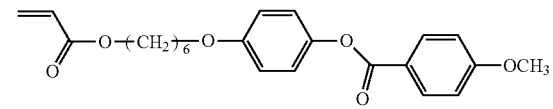
Formula 54
(5-D-9)
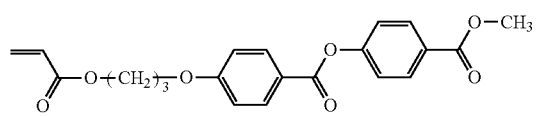
(5-D-10)
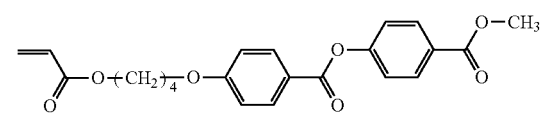
(5-D-11)
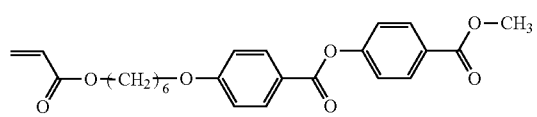
(5-D-12)
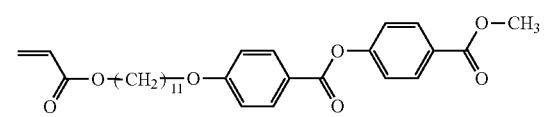
(5-D-13)
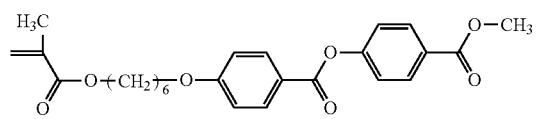
(5-D-14)
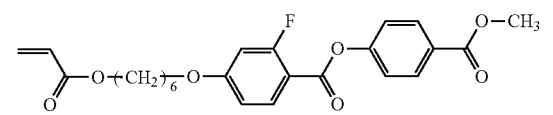
(5-D-15)
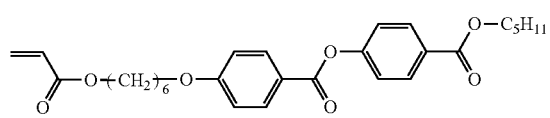
(5-D-16)
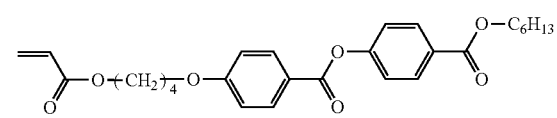
Formula 55
(5-F-5)
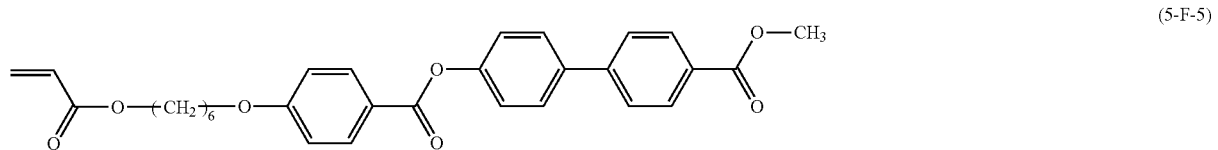
(5-F-6)
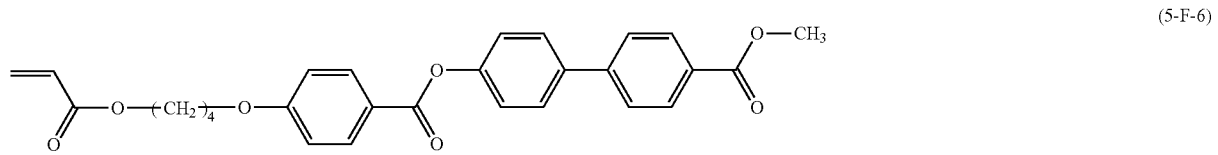
(5-F-7)
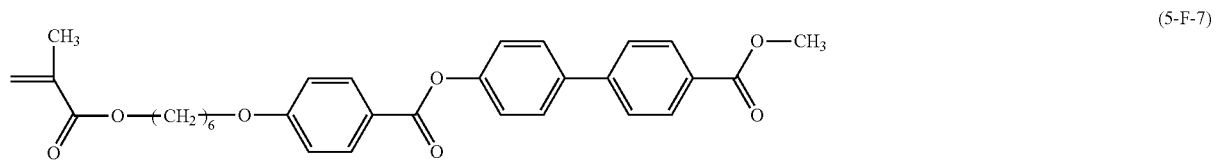
Formula 56
(5-H-1)
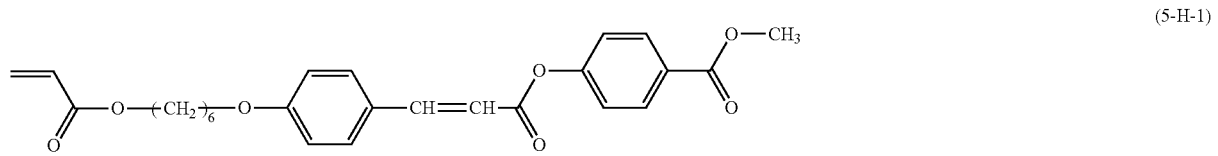
(5-H-2)
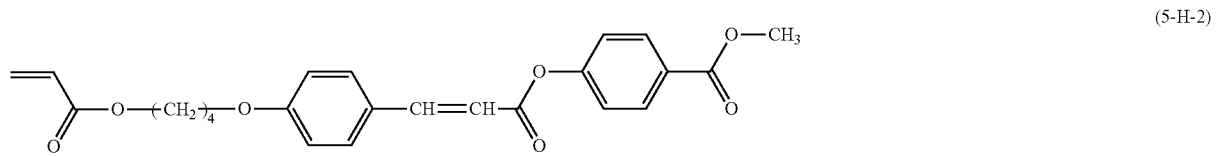

-continued
(5-J-1)
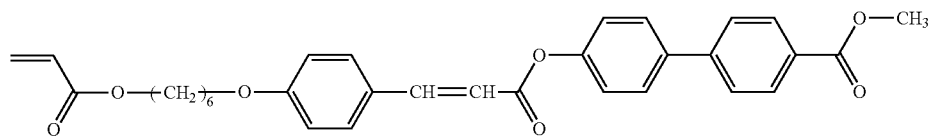
(5-J-25)
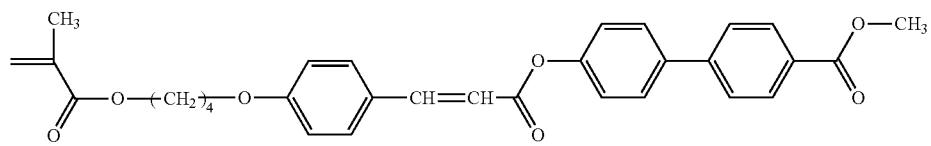
wherein, in formulas (5-H-1) to (5-H-2), (5-J-1) and (5-J-25), a trans isomer is further preferred.
Formula 57
(5-L-1)
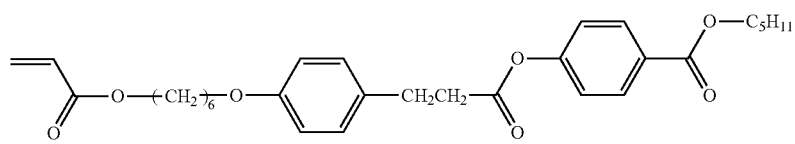
(5-N-1)
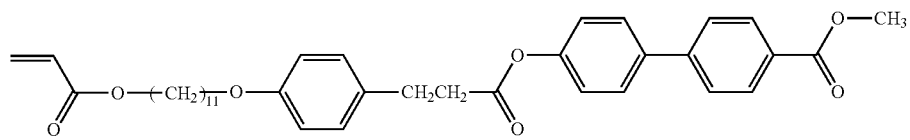
(5-O-1)
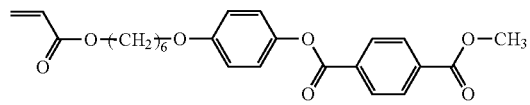
(5-S-1)
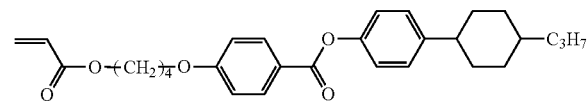
(5-S-2)
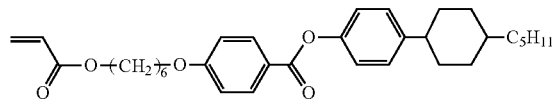
(5-T-1)
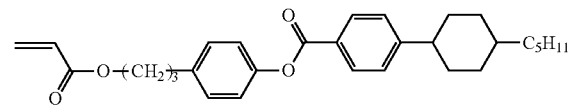
(5-T-2)
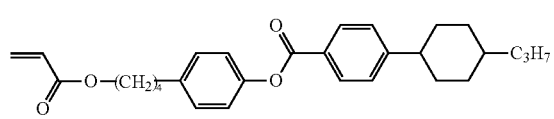
(5-U-1)
(5-U-2)
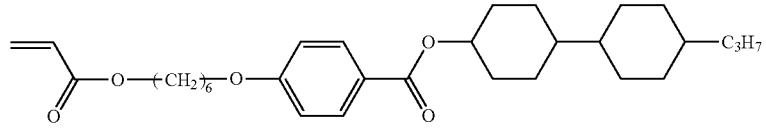
(5-V-1)
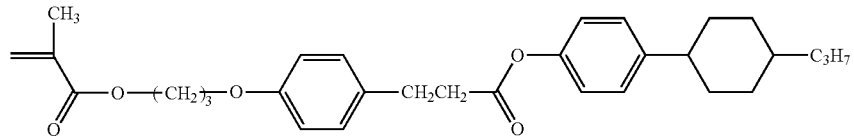
(5-W-1)
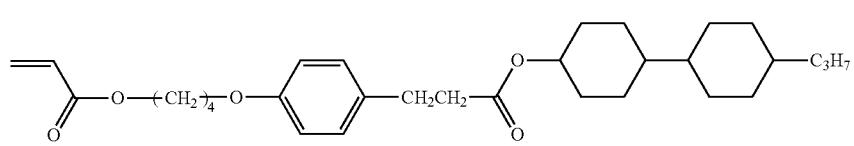

(5-W-2)

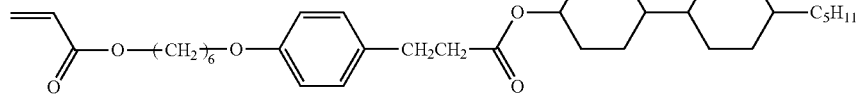

Next, examples of the photopolymerization initiator having oxime ester are described. The photopolymerization initiator may include a commercial item. Specific examples include compounds No. 1 to No. 108 described in paragraphs 0032 to 0046 in JP 2011-132215 A, compounds described in JP 2004-534797 A, compounds described in WO 2009/147031 A, compounds described in JP 2000-80068 A, compounds having oxime ester moieties described in JP 2006-251374 A, compounds having oxime ester moieties described in JP 2009-286976 A and compounds having oxime ester moieties described in JP 2009-29929 A. Preferred compounds among the compounds include NCI-930 or NCI-1919 (made by ADEKA Corporation) and Irgacure OXE01 or Irgacure OXE02 (made by BASF Japan Ltd.), and particularly from a viewpoint of less influence on the twist alignment, NCI-930 or Irgacure OXE01 each including no carbazole structure is preferably used.

In a polymerization reaction in an optically anisotropic layer including a polymerizable liquid crystal compound having twist alignment according to the invention, the polymerization reaction only needs to intensively progress wholly in the optically anisotropic layer. In the invention, an absorption maximum wavelength of a mixture including the achiral polymerizable liquid crystal compound (preferably, component (A) described above alone or a mixture of component (A) described above with one or more compounds selected from component (D), component (E) and component (F) as described above) and the optically active compound having the binaphthol moiety is in the range of approximately 220 nanometers to approximately 400 nanometers, and the absorption maximum wavelength is different from an absorption maximum wavelength of the photopolymerization initiator having oxime ester by approximately 50 nanometers or more and approximately 90 nanometers or less is preferred. Moreover, the absorption maximum wavelength of the photopolymerization initiator having oxime ester is further preferably different from the absorption maximum wavelength of the mixture including the achiral polymerizable liquid crystal compound and the optically active compound having the binaphthol moiety by the range of approximately 50 nanometers or more and approximately 90 nanometers or less, and the absorption maximum wavelength of the photopolymerization initiator having oxime ester is further preferably on a side of a long wavelength.

Presence of a difference in the absorption maximum wavelength allows conversion of energy of irradiated light into polymerization reaction energy in the optically anisotropic layer without any loss. As a result, the photopolymerization reaction in a process for manufacturing the optically anisotropic substance can be reinforced without adversely affecting optical properties in the optically anisotropic layer. An alignment state of the achiral polymerizable liquid crystal compound and the optically active compound having the binaphthol moiety is intensively immobilized by reinforcing the photopolymerization reaction, and an optically anisotropic substance having improved chemical strength can be obtained. The absorption maximum wavelength of the photopolymerization initiator herein is preferably a maximum absorption wavelength. One photopolymerization initiator may have two or more absorption maximum wavelengths. In the above case, one of the absorption maximum wavelengths only needs to be different from the absorption maximum wavelength of the mixture including the achiral polymerizable liquid crystal compound and the optically active compound having the binaphthol moiety by approximately 50 nanometers ore more and 90 nanometers or less.

The optically anisotropic layer is a thin film (thickness is approximately 0.05 to approximately 100 micrometers in general), and susceptible to oxygen prohibition action by oxygen in air. In order to prevent an influence of oxygen, quick progress of the polymerization reaction is desirable, and therefore a photopolymerization initiator having both of a large optical absorption coefficient and quantum efficiency to generate a large amount of radicals at one time is preferred.

The photopolymerization initiator is desirably selected from initiators having the absorption maximum wavelength in the range of approximately 220 to approximately 400 nanometers (ultraviolet light region). Moreover, an absorption spectrum (entire absorption spectrum of a plurality of photopolymerization initiators) of the photopolymerization initiator is preferably selected so as to coincide with a radiation spectrum of a light source.

Next, examples of any other polymerizable compound, the additive or the organic solvent are described. The compounds may include a commercial item. Specific examples of any other polymerizable compound include a compound having one polymerizable group, a compound having two polymerizable groups, a compound having three or more polymerizable groups, a non-liquid crystalline polymerizable compound having a functional group including a hydroxyl group and acryloyl or methacryloyl in one compound, a polymerizable compound having a carboxyl group and a polymerizable compound having a phosphate group. One or two or more compounds selected from the groups can be used.

Specific examples of the compound having one polymerizable group but having no functional group including the hydroxyl group include styrene, nucleus-substituted styrene, acrylonitrile, vinyl chloride, vinylidene chloride, vinyl pyridine, N-vinyl pyrrolidone, vinylsulfonic acid, fatty acid vinyl ester (vinyl acetate), α,β-ethylenic unsaturated carboxylic acid (acrylic acid, methacrylic acid, maleic acid, fumaric acid and itaconic acid), alkyl ester of (meth)acrylic acid (the number carbons of alkyl: 1 to 18), hydroxy alkyl ester of (meth)acrylic acid (the number of carbons of hydroxyalkyl: 1 to 18), aminoalkyl ester of (meth)acrylic acid (the number of carbons of aminoalkyl: 1 to 18), ether oxygen-containing alkyl ester of (meth)acrylic acid (the number of carbons of ether oxygen-containing alkyl: 3 to 18, such as methoxyethyl ester, ethoxyethyl ester, methoxypropyl ester, methylcarbyl ester, ethylcarbyl ester and butylcarbyl ester), N-vinylacetamide, vinyl p-t-butyl benzoate, vinyl N,N-dimethylaminobenzoate, vinyl benzoate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, dicyclopentanyloxylethyl(meth)acrylate, isobornyloxylethyl(meth)acrylate, isobornyl(meth)acrylate, adamantyl(meth)acrylate, dimethyladamantyl(meth)acrylate, dicyclopentanyl(meth)acrylate, dicyclopentenyl(meth)acrylate and mono(meth)acrylic ester of polyalkylene glycol such as mono(meth)acrylate of polyethylene glycol capped with alkyl having 1 to 6 carbons at a terminal (repeating units (polymerization degree): 2 to 20), mono(meth)acrylate of polyethylene glycol capped with alkyl having 1 to 6 carbons at a terminal (repeating units (degree of polymerization): 2 to 20), mono(meth)acrylate of polypropylene glycol capped with alkyl having 1 to 6 carbons at a terminal (repeating units (degree of polymerization): 2 to 20) and a copolymer (degrees of polymerization: 2 to 20) of ethylene oxide and propylene oxide.

Specific examples of the compound having two polymerizable groups but having no functional group including the hydroxyl group include 1,4-butanediol diacrylate, 1,6-hexanediol diacrylate, 1,9-nonanediol diacrylate, neopentylglycol diacrylate, dimethyloltricyclodecane diacrylate, triethyleneglycol diacrylate, dipropyleneglycol diacrylate, tripropyleneglycol diacrylate, tetraethyleneglycol diacrylate, bisphenol A EO-added diacrylate, bisphenol A glycidyl diacrylate (Viscoat V#700), polyethylene glycol diacrylate and a methacrylate compound of the compound thereof. The compounds are suitable for further improving film-formation capability of a polymer.

Specific examples of the compound having three or more polymerizable groups but having no functional group including the hydroxyl group include trimethylolpropane tri(meth)acrylate, trimethylol EO-added tri(meth)acrylate, tris(meth)acryloyloxyethyl phosphate, tris(meth)(acryloyloxyethyl)isocyanurate, alkyl-modified dipentaerythritol tri(meth)acrylate, EO-modified trimethylolpropane tri(meth)acrylate, PO-modified trimethylolpropane tri(meth)acrylate, pentaerythritol tetra(meth)acrylate, alkyl-modified dipentaerythritol tetra(meth)acrylate, ditrimethylolpropane tetra(meth)acrylate, dipentaerythritol hexa(meth)acrylate, alkyl-modified dipentaerythritol penta(meth)acrylate, Viscoat V#802 (the number of functional groups=8) and Viscoat V#1000 (the number of functional groups=14 on average). "Viscoat" is a trade name of products from Osaka Organic Chemical Industry Ltd. A compound having 16 or more functional groups can be obtained by using Boltom H20 (16 functional groups), Boltom H30 (32 functional groups) and Boltom H40 (64 functional groups) sold by Perstorp Specialty Chemicals AB as a raw material and acrylating the raw material.

The non-liquid crystalline polymerizable compound having the functional group including the hydroxyl group and having acryloyl or methacryloyl may include a commercial item. Preferred examples include butanediol monoacrylate, a reaction product between butyl glycidyl ether and (meth)acrylic acid (Denacol DA151 (registered trademark), made by Nagase & Co., Ltd.), 3-chloro-2-hydroxypropyl methacrylate, glycerol methacrylate (Blemmer (registered trade mark) GLM, made by NOF Corporation), glycerol acrylate, glycerol dimethacrylate (Blemmer GMR series, made by NOF Corporation), glycerol triacrylate (EX-314, made by Nagase ChemteX Corporation), 2-hydroxyethyl acrylate (BHEA, made by Nippon Shokubai Co., Ltd.), 2-hydroxyethyl methacrylate (HEMA, made by Nippon Shokubai Co., Ltd.), 2-hydroxypropyl acrylate (HPA, made by Nippon Shokubai Co., Ltd.), 2-hydroxypropyl methacrylate (HPMA, made by Nippon Shokubai Co., Ltd.), caprolactone-modified 2-hydroxyethyl acrylate, caprolactone-modified 2-hydroxyethyl methacrylate, phenoxyhydroxypropyl acrylate (M-600A, made by Kyoeisha Chemical Co., Ltd.), 2-hydroxy-3-acryloyloxypropyl methacrylate (G-201 P, made by Kyoeisha Chemical Co., Ltd.), Kayarad (registered trademark) R167, made by Nippon Kayaku Co., Ltd., triglycerol diacrylate (Epoxy Ester 80MFA, made by Kyoeisha Chemical Co., Ltd.), pentaerythritol tri(meth)acrylate, dipentaerythritolmonohydroxy penta(meth)acrylate, 2-acryloyloxyethyl succinate, 2-acryloyloxyethyl hexahydrophthalate, 2-acryloyloxyethyl phthalate, 2-acryloyloxyethyl-2-hydroxyethyl phthalate, 2-acryloyloxyethyl acid phosphate, 2-methacryloyloxyethyl acid phosphate, 2-methacryloyloxyethyl succinate, 2-methacryloyloxyethyl hexahydrophthalate, 2-acryloyloxyethyl-2-hydroxyethyl phthalate, 4-(2-acryloyloxyeth-1-yloxy)benzoic acid, 4-(3-acryloyloxy-n-prop-1-yloxy)benzoic acid, 4-(2-methacryloyloxyeth-1-yloxy)benzoic acid, 4-(4-acryloyloxy-n-but-1-yloxy)benzoic acid, 4-(6-acryloyloxy-n-heX-1-yloxy)benzoic acid, 4-(6-acryloyloxy-n-heX-1-yloxy)-2-methylbenzoic acid, 4-(6-methacryloyloxy-n-heX-1-yloxy)benzoic acid, 4-(10-acryloyloxy-n-dec-1-yloxy)benzoic acid, 2-acryloyloxyethyl acid phosphate and 2-methacryloiloxy-ethyl acid phosphate.

Specific examples of monomethacrylate of polyethylene glycol having a degree of polymerization from 2 to 20, as exemplified by formula (T-1) described below, include Blemmer PE-90 (n=2), PE-200 (n=4.5) and PE-350 (n=8), as made by NOF Corporation. The number of repeating units (degree of polymerization) of a polyethylene glycol chain herein is further preferably 2 to 10, in which n represents the mean number of constitutional units.

Formula 58

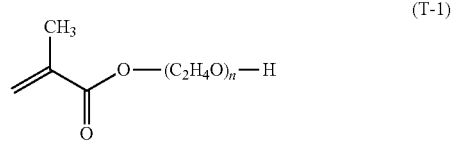

(T-1)

Specific examples of monoacrylic ester of polyethylene glycol having a degree of polymerization from 2 to 20 include, as exemplified by formula (T-2) described below, Blemmer AE-90 (n=2), AE-200 (n=4.5) and AE-400 (n=10), as made by NOF Corporation. The number of repeating units (degree of polymerization) of a polyethylene glycol chain herein is further preferably 2 to 10.

Formula 59

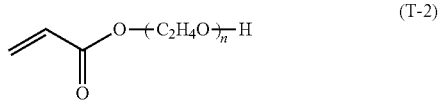

(T-2)

Specific examples of monomethacrylate of polypropylene glycol having a degree of polymerization from 2 to 20 include, as exemplified by formula (T-3) described below, Blemmer PP-1000 (n=4 to 6), PP-500 (n=9) and PP-800 (n=13), as made by NOF Corporation. The number of repeating units (degree of polymerization) of a polyethylene glycol chain is further preferably 3 to 13.

Formula 60

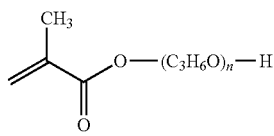
(T-3)

Specific examples of monoacrylate of polypropylene glycol having a degree of polymerization from 2 to 20 include, as exemplified by formula (T-4) described below, Blemmer AP-150 (n=3), AP-400 (n=6), AP-550 (n=9) and AP-800 (n=13), as made by NOF Corporation. The number of repeating units (degree of polymerization) of a polyethylene glycol chain is further preferably 3 to 13.

Formula 61

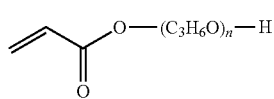
(T-4)

Specific examples of poly(ethylene glycol-propylene glycol)monomethacrylate include, as exemplified by formula (T-5) described below, Blemmer 50PEP-300, made by NOF Corporation. Ethylene or propylene that means R herein is randomly copolymerized. The mean number (m) of constitutional units of ethyleneoxy and propyleneoxy is approximately 2.5 and approximately 3.5, respectively. Further, m described below also represents the mean number of constitutional units of each alkylene.

Formula 62

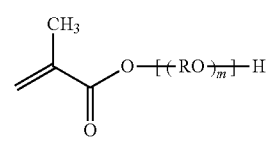
(T-5)

R: $C_2H_4$ or $C_3H_6$

Specific examples of polyethylene glycol-polypropylene glycol monomethacrylate include, as exemplified by formula (T-6) described below, Blemmer 70PEP-350 B (m=5, n=2), made by NOF Corporation.

Formula 63

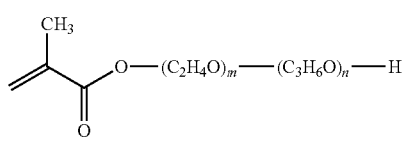
(T-6)

Specific examples of polyethylene glycol-polypropylene glycol monoacrylate include Blemmer AEP series.

Specific examples of poly(ethylene glycol-tetramethylene glycol)monomethacrylate include, as exemplified by formula (T-7) described below, Blemmer 55PET-400, 30PET-800 and 55PET-800, as made by NOF Corporation. The number of repeating units of a poly(ethylene glycol-tetramethylene glycol) chain herein is further preferably 2 to 10. In the formula, ethylene or butylene that means R is randomly copolymerized. The mean number (m) of constitutional units of ethyleneoxy and butyleneoxy is 5 and 2 in 55PET-400, 6 and 10 in 30PET-800, and 10 and 5 in 55PET-800, respectively.

Formula 64

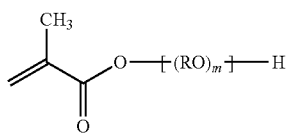
(T-7)

R: $C_2H_4$ or $C_4H_8$

Specific examples of poly(ethylene glycol-tetramethylene glycol)monoacrylate include Blemmer AET series, made by NOF Corporation.

Specific examples of poly(propylene glycol-tetramethylene glycol)monomethacrylate include, as exemplified by formula (T-8) described below, Blemmer 30PPT-800, 50PPT-800 and 70PPT-800, as made by NOF Corporation. The number of repeating units of a poly(propylene glycol-tetramethylene glycol) chain herein is further preferably 3 to 10. In the formula, propyleneoxy or butyleneoxy that means R is randomly copolymerized. The mean number (m) of constitutional units of propylene and butylene is 4 and 8 in 30PPT-800, 7 and 6 in 50PPT-800 and 10 and 3 in 70PPT-800, respectively.

Formula 65

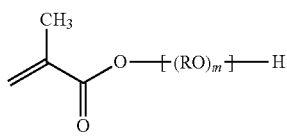
(T-8)

R: $C_3H_6$ or $C_4H_8$

Specific examples of poly(propylene glycol-tetramethylene glycol)monoacrylate include Blemmer APT series, made by NOF Corporation.

Specific examples of propylene glycol-polybutylene glycol mono((meth)acrylate) include, as exemplified by formula (T-9) described below, Blemmer 10PPB-500B (n=6), and as exemplified by formula (T-10) described below, 10APB-500B (n=6), as made by NOF Corporation. The number of repeating units of a propylene glycol-polybutylene glycol chain herein is further preferably 6.

Formula 66

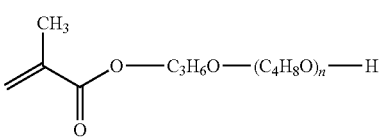
(T-9)

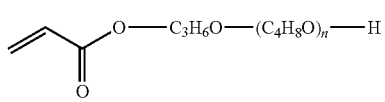 (T-10)

Specific preferred examples of the polymerizable compound having carboxyl are described below, and may include a commercial item.

Specific preferred examples include 2-methacryloyloxyethyl succinate (Light Ester HO-MS (N), made by Kyoeisha Chemical Co., Ltd.), 2-methacryloyloxyethyl hexahydrophthalate (Light Ester HO-HH(N), made by Kyoeisha Chemical Co., Ltd.), 2-acryloyloxyethyl succinate (Light Ester HOA-MS(N), made by Kyoeisha Chemical Co., Ltd.), 2-acryloyloxyethyl hexahydrophthalate (Light Acrylate HOA-HH(N), made by Kyoeisha Chemical Co., Ltd.), 2-acryloyloxyethyl phthalate (Light Acrylate HOA-MPL (N), made by Kyoeisha Chemical Co., Ltd.), 2-acryloyloxyethyl-2-hydroxyethyl phthalate (LightAcrylate HOA-MPE (N), made by Kyoeisha Chemical Co., Ltd.), 4-(2-acryloyloxyeth-1-yloxy)benzoic acid (ST01630, made by Synthon Chemicals GmbH & Co. KG), 4-(3-acryloyloxy-n-prop-1-yloxy)benzoic acid (ST02453, made by Synthon Chemicals GmbH & Co. KG), 4-(2-methacryloyloxyeth-1-yloxy)benzoic acid (ST01889, made by Synthon Chemicals GmbH & Co. KG), 4-(4-acryloyloxy-n-but-1-yloxy)benzoic acid (ST01680, made by Synthon Chemicals GmbH & Co. KG), 4-(6-acryloyloxy-n-heX-1-yloxy)benzoic acid (ST00902, made by Synthon Chemicals GmbH & Co. KG), 4-(6-acryloyloxy-n-heX-1-yloxy)-2-methylbenzoic acid (ST03606, made by Synthon Chemicals GmbH & Co. KG), 4-(6-methacryloyloxy-n-heX-1-yloxy)benzoic acid (ST01618, made by Synthon Chemicals GmbH & Co. KG) and 4-(10-acryloyloxy-n-dec-1-yloxy)benzoic acid (ST03604, made by Synthon Chemicals GmbH & Co. KG).

Specific preferred examples of the polymerizable compound having the phosphate group are described below, and may include a commercial item. Specific examples include 2-acryloyloxyethyl acid phosphate (Light Acrylate P-1A(N), made by Kyoeisha Chemical Co., Ltd.), 2-methacryloyloxyethyl acid phosphate (Light Ester P-1M, made by Kyoeisha Chemical Co., Ltd.), Light Ester P-2M, made by Kyoeisha Chemical Co., Ltd. and KAYAMER (registered trademark) PM-2, made by Nippon Kayaku Co., Ltd.

Specific examples of the surfactant include a cationic surfactant, an anionic surfactant and a nonionic surfactant.

Specific examples of the ionic surfactant include a titanate compound, imidazoline, a quaternary ammonium salt, alkylamine oxide, a polyamine derivative, a polyoxyethylene-polyoxypropylene condensate, polyethylene glycol and an ester thereof, sodium lauryl sulfate, ammonium lauryl sulfate, amines lauryl sulfate, alkyl-substituted aromatic sulfonate, alkyl phosphate, an aliphatic or aromatic sulfonic acid-formalin condensate, laurylamidopropyl betaine, laurylaminoacetic acid betaine, polyethylene glycol fatty acid ester, polyoxyethylene alkylamine, perfluoroalkyl sulfonate and perfluoroalkyl carboxylate.

Specific examples of kinds of nonionic surfactants include vinyl-based, silicone-based, fluorine-based and hydrocarbon-based surfactants.

Specific examples of the vinyl-based nonionic surfactant include polyalkyl acrylate, polyalkyl methacrylate, polyalkyl vinyl ether, polybutadiene, polyolefin and polyvinyl ether.

Specific examples of the silicone-based nonionic surfactant include polydimethylsiloxane, polyphenylsiloxane, specifically modified siloxane, fluorine-modified siloxane and surface-treated siloxane.

Specific examples of the fluorine-based nonionic surfactant include a fluorine polymer.

Specific examples of the hydrocarbon-based nonionic surfactant include polyethylene, polypropylene, polyisobutylene, paraffin, liquid paraffin, chlorinated polypropylene, chlorinated paraffin and chlorinated liquid paraffin.

Specific examples include surfactants described in paragraphs 0196 to 0199 in JP 2011-246365 A, surfactants described in paragraph 0019 in JP 2009-242563 A, TEGO Flow 300, TEGO Flow 370 and TEGO Flow ZFS460 (made by Evonik Degussa GmbH) and surfactants described in paragraphs 0014 to 0016 in JP 2009-242563 A.

The surfactants may be used alone or in combination of two or more surfactants.

Above all, as the kind of the surfactants, the vinyl-based surfactant such as polyalkyl acrylate (acrylic polymer), polyalkyl methacrylate or the like being the nonionic surfactant is preferred due to a trend of a smaller influence on the twist alignment from a viewpoint of a lower degree of segregation on a surface of the paint film (without excessive localization) in comparison with the silicone-based or fluorine-based nonionic surfactant.

Specific examples of the surfactant containing such an acryl-based polymer or acryl (co)polymer as a main component include Polyflow series (No. 7, No. 50E, No. 50EHF, No. 54N, No. 75, No. 77, No. 85, No. 85HF, No. 90, No. 90D-50, No. 95 and No. 99C), TEGO Flow series (300, 370, or ZFS 460) and BYK series (350, 352, 354, 355, 356, 358N, 361N, 381, 392, 394, 3441 and 3440).

Addition of the surfactants as described above presumably minimizes an influence on the twist alignment to allow suppression of tilt alignment on a side of the air interface. Moreover, in order to optimize applicability onto the substrate, a surfactant classified as a (substrate) wetting agent may be simultaneously used within the range in which the twist alignment is not influenced. The wetting agent is effective in decreasing surface tension of a polymerizable liquid crystal solution and improving applicability to a coating substrate. Specific examples of such a wetting agent include Polyflow series (KL-100, KL-700, LE-604, LE-605 and LE-606), TEGO Twin series (4000) and TEGO Wet series (KL245, 250, 260, 265, 270, 280, 500, 505 and 510). In addition, as an auxiliary agent of the wetting agent, a surfactant containing as a main component a fluoride-modified polymer or a fluorine-modified acrylic polymer may be applied. Specific examples of such an agent include 3000 series (3277, 3700 and 3770), made by AFCONA Additives Co., Ltd.

In addition, in order to cause integration with the polymerizable liquid crystal compound, the surfactant may have a polymerizable group. Specific examples of the polymerizable group to be introduced into the surfactant include an ultraviolet light reaction-type functional group and a thermally polymerizable functional group. From a viewpoint of reactivity with the polymerizable liquid crystal compound, the ultraviolet light reaction-type functional group is preferred.

A preferred ratio of the surfactant is in the range of approximately 0.0001 to approximately 0.05, and further preferably, in the range of approximately 0.0003 to approximately 0.03 in terms of a weight ratio based on the total weight of component (A), component (B), component (D), component (E) and component (F), although the preferred ratio is different depending on a kind of surfactant, a compositional ratio of the compositions or the like.

Polyflow described above is a name of products sold by Kyoeisha Chemical Co., Ltd. BYK is a name of products sold by BYK-Chemie Japan K.K. TEGO is a name of products sold by Evonik Industries AG.

In order to optimize a rate of polymerization of the polymerizable liquid crystal composition, a publicly known photopolymerization initiator different from photopolymerization initiator (C) may be simultaneously used. A preferred amount of addition of the publicly known photopolymerization initiator is approximately 0.0001 to approximately 0.20 in terms of a weight ratio based on the total weight of component (A), component (B), component (D), component (E) and component (F). A further preferred weight ratio is in the range of approximately 0.001 to approximately 0.15. An even further preferred ratio is in the range of approximately 0.01 to approximately 0.15.

Specific examples of the photopolymerization initiator include 2-hydroxy-2-methyl-1-phenylpropane-1-one (Darocur 1173), 1-hydroxycyclohexyl phenyl ketone, 2,2-dimethoxy-1,2-diphenylethane-1-one (Irgacure 651), 1-hydroxycyclohexyl-phenyl-ketone (Irgacure 184), Irgacure 127, Irgacure 500 (mixture of Irgacure 184 and benzophenone), Irgacure 2959, Irgacure 907, Irgacure 369, Irgacure 379, Irgacure 754, Irgacure 1300, Irgacure 819, Irgacure 1700, Irgacure 1800, Irgacure 1850, Irgacure 1870, Darocur 4265, Darocur MBF, Darocur TPO, Irgacure 784 and Irgacure 754. Both of Darocur and Irgacure described above are names of products Sold by BASF Japan, Ltd. A publicly known sensitizer (isopropylthioxanthone, diethylthioxanthone, ethyl-4-dimethylaminobenzoate (Darocur EDB), 2-ethylhexyl-4-dimethylaminobenzoate (Darocur EHA) or the like) and 4,4-bis(diethylamino)benzophenone may be added to the initiators.

As a photoradical polymerization initiator, the photoradical polymerization initiators described below can also be used. The initiators include p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a benzophenone-Michler's ketone mixture, a hexaarylbiimidazole-mercaptobenzimidazole mixture, 1-(4-isopropylphenyl)-2-hydroxy-2-methylpropane-1-one, benzyl dimethyl ketal, 2-methyl-1-[4-(methylthio)phenyl]-2-morpholinopropane-1-one, a 2,4-diethylxanthone-methyl p-dimethylaminobenzoate mixture and a benzophenone-methyltriethanolamine mixture.

Mechanical characteristics of the polymer can also be controlled by adding one kind or two or more kinds of chain transfer agents to the polymerizable liquid crystal composition. A length of a polymer chain or a length of two crosslinked polymer chains in a polymer film can be controlled by using the chain transfer agent. The lengths can also be simultaneously controlled. When an amount of the chain transfer agent is increased, the length of the polymer chain decreases. Specific preferred examples of the chain transfer agents include a thiol compound and a styrene dimer. Specific examples of monofunctional thiol include dodecanethiol and 2-ethylhexyl-(3-mercaptopropionate). Specific examples of polyfunctional thiol include trimethylolpropanetris(3-mercaptopropionate), pentaerythritoltetrakis(3-mercaptopropionate), 1,4-bis(3-mercaptobutyryloxy)butane (Karenz MT BD1), pentaerythritoltetrakis(3-mercaptobutylate) (Karenz MT PE1) and 1,3,5-tris(3-mercaptobutyloxyethyl)-1,3,5-triazine-2,4,6(1H,3H,5H)-trione (Karenz MT NR1). "Karenz" is a trade name of products from Showa Denko K.K. Specific examples of a thiol compound other than the compounds described above include a thiol compound described in paragraphs 0042 to 0043 in WO 2013/080855 A and a compound described in $11^{th}$ line on p. 23 to $27^{th}$ line on p. 24 in WO 2008/077261 A. Specific examples of the styrene dimer include α-methylstyrene dimer (2,4-diphenyl-4-methyl-1-pentene) and 1,1-diphenylethylene. Moreover, Quinoexter QE-2014 can also be utilized. "Quinoexter" is a trade name of products from Kawasaki Kasei Chemicals Ltd.

A polymerization preventive agent can be added to the polymerizable liquid crystal composition in order to prevent polymerization start during storage. A publicly known polymerization preventive agent can be used, and preferred examples include 2,5-di(t-butyl)hydroxytoluene (BHT), hydroquinone, p-methoxyphenol, Methyl Blue, diphenylpicryl hydrazide (DPPH), benzothiazine, 4-nitrosodimethylaniline (NIDI) and o-hydroxybenzophenone.

An polymerization inhibitor can also be added in order to improve storage stability of the polymerizable liquid crystal composition. When a radical is generated within the composition or the solution of the composition, the polymerization reaction of the polymerizable compound is accelerated. The polymerization inhibitor is preferably added in order to prevent such a reaction. As the polymerization inhibitor, a phenolic antioxidant, a sulfur-based antioxidant and a phosphate-based antioxidant can be utilized.

In order to further improve weather resistance of the polymerizable liquid crystal composition, an ultraviolet light absorber, a light stabilizer (radical scavenger), an antioxidant and so forth may be added. Specific examples of the ultraviolet light absorber include Tinuvin PS, Tinuvin P, Tinuvin 99-2, Tinuvin 109, Tinuvin 213, Tinuvin 234, Tinuvin 326, Tinuvin 328, Tinuvin 329, Tinuvin 384-2, Tinuvin 571, Tinuvin 900, Tinuvin 928, Tinuvin 1130, Tinuvin 400, Tinuvin 405, Tinuvin 460, Tinuvin 479, Tinuvin 5236, ADK STAB LA-32, ADK STAB LA-34, ADK STAB LA-36, ADK STAB LA-31, ADK STAB 1413 and ADK STAB LA-51. "Tinuvin" is a trade name of products from BASF Japan Ltd. Moreover, "ADK STAB" is a trade name of products from ADEKA Corporation.

Specific examples of the light stabilizer include Tinuvin 111 FDL, Tinuvin 123, Tinuvin 144, Tinuvin 152, Tinuvin 292, Tinuvin 622, Tinuvin 770, Tinuvin 765, Tinuvin 780, Tinuvin 905, Tinuvin 5100, Tinuvin 5050 and 5060, Tinuvin 5151, Chimassorb 119 FL, Chimassorb 944 FL, Chimassorb 944 LD, ADK STAB LA-52, ADK STAB LA-57, ADK STAB LA-62, ADK STAB LA-67, ADK STAB LA-63P, ADK STAB LA-68LD, ADK STAB LA-77, ADK STAB LA-82, ADK STAB LA-87, Cyasorb UV-3346 and GoodRite UV-3034, made by Goodrich Corporation. "Chimassorb" is a trade name of products from BASF Japan Ltd.

Specific examples of the antioxidant include ADK STAB AO-20, AO-30, AO-40, AO-50, AO-60 and AO-80, as made by ADEKA Corporation, Sumilizer (registered trademark) BHT, Sumilizer BBM-S and Sumilizer GA-80 as sold by Sumitomo Chemical Co., Ltd., and Irganox 1076, Irganox 1010, Irganox 1035, Irganox 1098, Irganox 1135, Irganox 1330, Irganox 1425, Irganox 1520, Irganox 1726, Irganox 259, Irganox 3790, Irganox 5057, Irganox 565, Irganox 3114 and Irganox 245 as sold by BASF Japan Ltd. Commercial items thereof may also be used.

In order to control the adhesion with the substrate, the silane coupling agent may be further added to the polymerizable liquid crystal composition. Specific examples include vinyl-trialkoxysilane, 3-isocyanatepropyl-triethoxysilane, 3-aminopropyltrialkoxysilane, N-(2-aminoethyl)3-aminopropyl-trialkoxysilane, N-(1,3-dimethylbutylidene)-

3-(trialkoxysilyl)-1-propanamine, 3-glycidoxy propyl trialkoxysilane, 3-chloro trialkoxysilane, 3-acryloxyprophyltrimethoxysilane, 3-methacryloxypropyl trialkoxysilane. Specific example in the compound is dialkoxy methylsilane in which one of alkoxies (three) is replaced to methyl.

The polymerizable liquid crystal composition may be occasionally directly applied onto the substrate. However, in order to facilitate application, the polymerizable liquid crystal composition is diluted using a solvent, or each component of the polymerizable liquid crystal composition is dissolved into the solvent, and the solution of the polymerizable liquid crystal composition including the polymerizable liquid crystal composition and the solvent is prepared, and the solution is applied. The solvent can be used alone or in combination of two or more kinds. Specific examples of the solvent include an ester solvent, an amide solvent, an alcohol solvent, an ether solvent, a glycol monoalkyl ether solvent, an aromatic hydrocarbon solvent, a halogenated aromatic hydrocarbon solvent, an aliphatic hydrocarbon solvent, a halogenated aliphatic hydrocarbon solvent, an alicyclic hydrocarbon solvent, a ketone solvent and an acetate solvent.

Preferred examples of the ester solvent include alkyl acetate (methyl acetate, ethyl acetate, propyl acetate, isopropyl acetate, butyl acetate, 3-methoxybutyl acetate, isobutyl acetate, pentyl acetate and isopentyl acetate), cyclohexyl acetate, ethyl trifluoroacetate, alkyl propionate (methyl propionate, methyl 3-methoxypropionate, ethyl propionate, propyl propionate and butyl propionate), alkyl butyrate (methyl butyrate, ethyl butylate, butyl butyrate, isobutyl butyrate and propyl butyrate), dialkyl malonate (diethyl malonate), alkyl glycolate (methyl glycolate and ethyl glycolate), alkyl lactate (methyl lactate, ethyl lactate, isopropyl lactate, n-propyl lactate, butyl lactate and ethylhexyl lactate), alkyl pyruvate (ethyl pyruvate), monoacetin, γ-butyrolactone and γ-valerolactone.

Preferred examples of the amide solvent include N-methyl-2-pyrrolidone, N,N-dimethylacetamide, N-methylpropionamide, N,N-dimethylformamide, N,N-diethylformamide, N,N-diethylacetamide, N,N-dimethylacetamide dimethyl acetal, N-methylcaprolactam and dimethylimidazolidinone.

Preferred examples of the alcohol solvent include methanol, ethanol, 1-propanol, 2-propanol, 1-methoxy-2-propanol, diacetone alcohol, t-butyl alcohol, sec-butyl alcohol, butanol, 2-ethylbutanol, n-hexanol, n-heptanol, n-octanol, 1-dodecanol, ethylhexanol, 3,5,5-trimethylhexanol, n-amyl alcohol, hexafluoro-2-propanol, glycerol, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol and methyl cyclohexanol.

Preferred examples of the ether solvent include ethylene glycol dimethyl ether, diethylene glycol dimethyl ether, diethylene glycol methyl ethyl ether, bis(2-propyl)ether, 1,3-dioxolane, 1,4-dioxane and tetrahydrofuran (THF).

Preferred examples of the glycol monoalkyl ether solvent include ethylene glycol monoalkyl ether (ethylene glycol monomethyl ether and ethylene glycol monobutyl ether), diethylene glycol monoalkyl ether (diethylene glycol monoethyl ether), triethylene glycol monoalkyl ether, propylene glycol monoalkyl ether (propylene glycol monomethyl ether and propylene glycol monobutyl ether), dipropylene glycol monoalkyl ether (dipropylene glycol monomethyl ether), ethylene glycol monoalkyl ether acetate (ethylene glycol monobutyl ether acetate), diethylene glycol monoalkyl ether acetate (diethylene glycol monoethyl ether acetate), triethylene glycol monoalkyl ether acetate, propylene glycol monoalkyl ether acetate (propylene glycol monoethyl ether acetate, propylene glycol monoethyl ether acetate and propylene glycol monobutyl ether acetate), dipropylene glycol monoalkyl ether acetate (dipropylene glycol monomethyl ether acetate) and diethylene glycol methyl ethyl ether.

Preferred examples of the aromatic hydrocarbon solvent include benzene, toluene, anisole, xylene, mesitylene, ethylbenzene, diethylbenzene, i-propylbenzene, n-propylbenzene, t-butylbenzene, s-butylbenzene, n-butylbenzene, terpene derivatives (p-cymene, 1,4-cineole, 1,8-cineole, D-limonene, D-limonene oxide, p-menthane, α-pinene, β-pinene, γ-terpinene, terpinolene) and tetralin. Preferred examples of the halogenated aromatic hydrocarbon solvent include chlorobenzene. Preferred examples of the aliphatic hydrocarbon solvent include hexane and heptane. Preferred examples of the halogenated aliphatic hydrocarbon solvent include chloroform, dichloromethane, carbon tetrachloride, dichloroethane, trichloroethylene and tetrachloroethylene. Preferred examples of the alicyclic hydrocarbon solvent include cyclohexane, methylcyclohexane and decalin.

Preferred examples of the ketone solvent include acetone, methyl ethyl ketone, methyl isobutyl ketone, 2-heptanone, cyclohexanone, cyclopentanone and methyl propyl ketone.

Preferred examples of the acetate solvent include ethylene glycol monomethyl ether acetate, propylene glycol monomethyl ether acetate, propylene glycol monoethyl ether acetate, methyl acetoacetate and 1-methoxy-2-propyl acetate.

From a viewpoint of solubility of the polymerizable liquid crystal compound, use of the amide solvent, the aromatic hydrocarbon or the ketone solvent is preferred, and when a boiling point of the solvent is taken into consideration, simultaneous use of the ester solvent, the alcohol solvent, the ether solvent and the glycol monoalkyl ether solvent is also preferred. Selection of the solvent is not particularly restricted, but when the plastic substrate is used as the support substrate, drying temperature is required to be decreased for preventing substrate deformation, and the solvent is required to cause no substrate erosion. Preferred examples of the solvent used in such a case include the aromatic hydrocarbon solvent, the ketone solvent, the ester solvent, the ether solvent, the alcohol solvent, the acetate solvent and the glycol monoalkyl ether solvent.

A ratio of the solvent in the solution of the polymerizable liquid crystal composition is ordinarily in the range of approximately 50 to approximately 95% based on the total weight of the solution. A lower limit of the range is set to a numerical value in consideration of the solubility of the polymerizable liquid crystal compound and optimum viscosity upon application of the solution. Then, an upper limit thereof is set to a numerical value in consideration of an economic viewpoint such as solvent cost, and time and an amount of heat upon evaporating the solvent. A preferred ratio thereof is in the range of approximately 60 to approximately 90%, and further preferably, in the range of approximately 70 to approximately 85%.

In the description below, the polymer (optically anisotropic substance) obtained by polymerizing the polymerizable liquid crystal composition may be occasionally referred to as a liquid crystal film. The liquid crystal film can be obtained in a manner described below. First, the solution of the polymerizable liquid crystal composition is applied onto the support substrate, and the resulting applied material is dried to form the paint film. The paint film is irradiated with light to polymerize the polymerizable liquid crystal composition and to immobilize nematic alignment formed by the composition in the paint film in the liquid crystal state. The support substrates that can be used include glass and the plastic film. Specific examples of the plastic film include a film of polyimide, polyamideimide, polyamide, polyetherimide, polyether ether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose, triacetyl cellulose and a partially saponified product thereof, an epoxy resin, a phenolic resin and a cycloolefin resin.

Specific examples of the cycloolefin resin include a norbornene resin and a dicyclopentadiene resin, but are not limited thereto. Among the resins, a resin having no unsaturated bond or a resin in which an unsaturated bond is hydrogenated is suitably used. Specific examples include a hydrogenated product of a ring-opened (co)polymer of one kind or two or more kinds of norbornene monomers, an addition (co)polymer of one kind or two or more kinds of norbornene monomers, an addition copolymer of a norbornene monomer and an olefin monomer (ethylene, α-olefin), an addition copolymer of a norbornene monomer and a cycloolefin monomer (cyclopentene, cyclooctene, 5,6-dihydrodicyclopentadiene) and a modified product thereof. Specific examples include ZEONEX, ZEONOR (made by Zeon Corporation), ARTON (made by JSR Corporation), TOPAS (made by Ticona GmbH), APEL (made by Mitsui Chemicals, Inc.), Esushina (made by Sekisui Chemical Co., Ltd.) and OPTOREZ (made by Hitachi Chemical Co., Ltd.).

The plastic films may include a uniaxially stretched film or a biaxially stretched film. The plastic films may be subjected to surface treatment such as hydrophilization treatment including corona treatment or plasma treatment, or hydrophobization treatment. A method for applying the hydrophilization treatment is not particularly restricted, but corona treatment or plasma treatment is preferred, and a particularly preferred method is plasma treatment. For the plasma treatment, a method described in JP 2002-226616 A, JP 2002-121648 A or the like may be applied. Moreover, an anchor coat layer may be formed for improving adhesion between the liquid crystal film and the plastic film. Such an anchor coat layer may be formed of any of an inorganic material or an organic material without any problem, as long as the material improves the adhesion between the liquid crystal film and the plastic film. Moreover, the plastic film may include a laminated film. In place of the plastic film, a material can also be used, such as a metallic substrate of aluminum, iron or copper on a surface of which slit-shaped grooves are formed, and a glass substrate of alkaline glass, borosilicate glass or flint glass to a surface of which etching processing is applied in a slit shape.

Prior to forming the paint film of the polymerizable liquid crystal composition, mechanical or physical surface treatment by rubbing treatment or photoalignment treatment may be applied onto the support substrate such as the glass and the plastic film. An arbitrary method can be employed for the rubbing treatment, but a method is ordinarily employed by winding around a metallic roll or the like a rubbing fabric formed of a raw material such as rayon, cotton and polyamide to move the roll while rotating the roll in a state in contact with a support substrate or a polymer coat, or by moving a support substrate side while fixing the roll.

The rubbing treatment may be directly applied to the support substrate, or the polymer coat is arranged beforehand on the support substrate, and then the rubbing treatment may be applied to the polymer coat. The method of the rubbing treatment is as described above. Depending on a kind of the support substrate, silicon oxide is obliquely vapor-deposited on a surface of the substrate to allow provision of alignment ability on the surface thereof. When a photoalignment film is used, the alignment ability can also be provided by irradiating the film with polarized ultraviolet light.

Upon application of the polymerizable liquid crystal composition or the solution thereof, specific examples of an application method for obtaining uniform thickness include a spin coating method, a micro gravure coating method, a gravure coating method, a wire bar coating method, a dip coating method, a spray coating method, a meniscus coating method and a die coating method. In particular, the wire bar coating method or the like in which shear stress is applied to the liquid crystal compound during application may be applied in controlling alignment of the liquid crystal compound without applying the surface treatment onto the substrate by rubbing or the like.

Upon application of the solution of the polymerizable liquid crystal composition according to the invention, the solvent is removed after the application to allow formation of a polymerizable liquid crystal layer, namely, a polymerizable liquid crystal composition layer having uniform thickness on the support substrate. Conditions for solvent removal are not particularly limited. Drying only needs to be performed until the solvent is substantially removed and flowability of the paint film of the polymerizable liquid crystal composition is lost. The solvent can be removed by applying air drying at room temperature, drying on a hot plate, drying in a drying furnace, blowing of warm air or hot air or the like. Depending on a kind and a composition ratio of the compounds used for the polymerizable liquid crystal composition, the nematic alignment of the polymerizable liquid crystal composition in the paint film is completed in a process of drying of the paint film in several cases. Therefore, the paint film through a drying step can be provided for a polymerization step without passing through a heat treatment step to be described later.

A preferred range of temperature and time upon applying heat treatment to the paint film, a wavelength of light used for irradiation with light, an amount of light to be irradiated from a light source, or the like is different depending on a kind and a composition ratio of the compounds used for the polymerizable liquid crystal composition, presence or absence of addition of the photopolymerization initiator, an amount of addition thereof, or the like. Therefore, conditions of the temperature and the time of heat treatment of the paint film, the wavelength of light used for irradiation with light, and the amount of light to be irradiated from the light source described below represent only an approximate range.

The heat treatment of the paint film is preferably applied on conditions under which the solvent is removed and uniform alignment properties of the polymerizable liquid crystal are obtained, and is also applied at temperature equal to or higher than a transition temperature of liquid crystal phases of the polymerizable liquid crystal composition. One example of the method of heat treatment includes a method of warming the paint film to temperature at which the polymerizable liquid crystal compound exhibits a nematic liquid crystal phase to allow formation of the nematic alignment in the polymerizable liquid crystal compound in the paint film. The nematic alignment may be formed by changing the temperatures of the paint film within a temperature range in which the polymerizable liquid crystal compound exhibits the nematic liquid crystal phase. The above method includes a method of warming the paint film to a high temperature region in the temperature range described above to almost compete the nematic alignment in the paint film, and subsequently to form further ordered alignment by decreasing the temperature.

Even when any one of the heat treatment methods described above is applied, the heat treatment temperature is in the range of approximately room temperature (25° C.) to approximately 150° C. A preferred temperature range is approximately room temperature (25° C.) to approximately 130° C., a further preferred range is approximately room temperature (25° C.) to approximately 110° C., and an even further preferred range is approximately room temperature (25° C.) to approximately 100° C. Heat treatment time is in the range of approximately 5 seconds to approximately 2 hours. A preferred range of the time is approximately 10 seconds to approximately 40 minutes, and a further preferred range is approximately 20 seconds to approximately 20 minutes. In order to increase the temperature of the layer formed of the polymerizable liquid crystal composition to a predetermined temperature, the heat treatment time is preferably adjusted to approximately 5 seconds or more. In order to avoid a decrease in productivity, the heat treatment time is preferably adjusted within approximately 2 hours. Thus, the polymerizable liquid crystal layer in which the twist alignment is formed according to the invention is obtained.

A nematic alignment state of the polymerizable liquid crystal compound as formed in the polymerizable liquid crystal layer is immobilized by polymerizing the polymerizable liquid crystal compound by irradiation with light. A wavelength of light used for irradiation with light is not particularly limited, and is preferably coincided with the absorption maximum wavelength of the photopolymerization initiator as much as possible. Electron beams, ultraviolet light, visible light, infrared light (heat rays) or the like can be used. Ultraviolet light or visible light is ordinarily sufficiently used.

A range of the wavelength is approximately 150 to approximately 500 nanometers. A preferred range is approximately 220 to approximately 450 nanometers, and a further preferred range is approximately 250 to approximately 400 nanometers. Specific examples of the light sources include a low-pressure mercury lamp (a germicidal lamp, a fluorescent chemical lamp or a black light), a high-pressure discharge lamp (a high-pressure mercury lamp or a metal halide lamp) and a short arc discharge lamp (an ultra-high pressure mercury lamp, a xenon lamp or a mercury-xenon lamp). Preferred examples of the light sources include a metal halide lamp, a xenon lamp, an ultra-high pressure mercury lamp and a high-pressure mercury lamp. A wavelength region of the light source for irradiation may be selected by installing a filter or the like between the light source and the polymerizable liquid crystal layer to pass light only in a specific wavelength region through the layer.

An amount of light to be irradiated from the light source is approximately 2 to approximately 5,000 mJ/cm$^2$ at arriving at a paint film plane. A preferred range of the amount of light is approximately 10 to approximately 3,000 mJ/cm$^2$, and a further preferred range is approximately 100 to approximately 2,000 mJ/cm$^2$. Temperature conditions during irradiation with light are preferably set up in a manner similar to the conditions of the heat treatment temperature described above. Moreover, an atmosphere of a polymerization environment may include any of a nitrogen atmosphere, an inert gas atmosphere and an air atmosphere, but a nitrogen atmosphere or an inert gas atmosphere is preferred from a viewpoint of improving curability.

When the polymerizable liquid crystal layer and the liquid crystal film obtained by polymerizing the polymerizable liquid crystal composition using light, heat or the like according to the invention are used for various optical devices, or applied as an optical compensation device used for a liquid crystal display apparatus, control of uniformity of the twist alignment in a thickness direction becomes significantly important. The uniformity herein refers to expression of planer molecular arrangement in the twist alignment, and arrangement of the liquid crystal molecules such that the helical axis of the liquid crystal becomes perpendicular to the substrate plane. In such alignment, the tilt angle of the liquid crystal molecules on the side of the air interface is required to be horizontal to the substrate plane, and addition of the nonionic surfactant to the composition according to the invention facilitates the planer arrangement.

In addition thereto as described above, the methods for controlling the uniformity of twist alignment include a method for adjusting a kind, a composition ratio or the like of the liquid crystal compounds used for the polymerizable liquid crystal composition. The uniformity of twist alignment can be influenced also by adding any other component to the polymerizable liquid crystal compound. The uniformity of twist alignment can also be controlled by a kind, rubbing conditions or photoalignment treatment of the support substrate or the alignment film, or by drying conditions or heat treatment conditions or the like of the paint film of the polymerizable liquid crystal composition. Further, an irradiation atmosphere, temperature or the like during irradiation in a photopolymerization step after the twist alignment is achieved influences the uniformity of twist alignment. More specifically, almost all conditions in a process for manufacturing the liquid crystal film may be considered to influence the uniformity of twist alignment in any way. Therefore, the uniformity of twist alignment can be controlled by optimizing the polymerizable liquid crystal composition, and simultaneously appropriately selecting the conditions in the process for manufacturing the liquid crystal film.

In the twist alignment, the tilt angles of the liquid crystal molecules are uniformly close to 0 degrees from a substrate interface to a free interface, and are distributed particularly in the range of 0 to 5 degrees. An alignment state thereof is obtained by applying, onto a support substrate surface preferably subjected to the surface treatment such as rubbing, the polymerizable liquid crystal composition including as essential components the optically active compound having the binaphthol moiety, the achiral polymerizable liquid crystal compound and the photopolymerization initiator having oxime ester to form the paint film according to the invention.

A ratio of using component (A) to component (F) in the description below is as described above. In order to obtain uniform twist alignment in the invention, preferred examples of compounds (1) being component (A) include compounds (1-1-A) and (1-1-C), and further preferred examples include compound (1-1-A). Use of a compound in which $n^{11}$ is 3 to 6 and $X^1$ is hydrogen in formula (1-1-A) is preferred. In addition, a plurality of compounds represented by compound (1) may be combined and used.

Preferred examples of compound (2) being component (B) include compound (2-2-A), and use of a compound in which $n^{22}$ is 3 to 6 and $Q^1$ is hydrogen is preferred. In addition, a plurality of compounds represented by compound (2) may be combined and used.

As the photopolymerization initiator having the oxime ester moiety being component (C), NCI-930 or Irgacure Oxe01 is preferred.

Compound (3) being component (D) is not always required. However, in the case of use for adjusting Δn or the like, use of compound (3-1) allows an increase in Δn, and use of compound (3-2) allows a decrease in Δn. Use of a compound in which n is 3 to 6 and $X^{31}$ is hydrogen in formula (3-1-A) is preferred. Moreover, use of a compound in which n is 3 to 6 and $X^{32}$ is hydrogen in formula (3-2-C) is also preferred. In addition, a plurality of compounds represented by compound (3) may be combined and used.

Compound (4) being component (E) is not always required, but may be used for adjusting the planer alignment or the like. Use of compound (4-C) or compounds (4-0) to compound (4-S) allows reduction of a decrease in Δn to obtain uniformly aligned twist alignment. When compound (4-E) to compound (4-L) each having a substituent having two or more carbons on a site lateral to a mesogen skeleton are used, the melting point can be easily adjusted. Then, $n^{41}$ is preferably 3 to 6 and $X^4$ is preferably hydrogen. In addition, a plurality of compounds represented by compound (4) may be combined and used.

Compound (5) being component (F) is not always required, but may be occasionally used for adjusting the melting point or the birefringence (optically anisotropic (Δn)) or the like. Use of compound (5-A) to compound (5-B), compound (5-E) to compound (5-F), compound (5-1) to compound (5-J), compound (5-M) to compound (5-N) or compound (5-Q) to compound (5-R) each having biphenyl structure allows reduction of a decrease in Δn to obtain uniformly aligned twist alignment. A case of significantly adjusting the melting point only needs use of compound (5-C) to compound (5-D), compound (5-G) to compound (5-H), compound (5-K) to compound (5-L) or compound (5-O) to compound (5-P). In case of decreasing the Δn, compound (5-S) to compound (5-W) having cyclohexyl structure may be used preferably.

In compound (5), $n^{51}$ is preferably 3 to 6, $X^{51}$ is preferably hydrogen, $W^{51}$ is preferably hydrogen or fluorine, and $R^{51}$ is preferably straight-chain alkyl having 1 to 10 carbons, straight-chain alkoxy having 1 to 10 carbons or straight-chain alkyl ester having 1 to 10 carbons. In addition, a plurality of compounds represented by compound (5) may be combined and used.

The composition of the invention may contain a liquid crystal compound having no polymerizable group. Specific examples of such a non-polymerizable liquid crystal compound is described in LiqCryst (LCI Publisher GmbH, Hamburg, Germany) being a database of the liquid crystal compounds, or the like. Specific examples of the liquid crystal compound having no polymerizable group are described in JP 2011-148762 A, pp. 66 to 69. The polymerizable liquid crystal composition of the invention has good compatibility with other liquid crystal compounds. Such a polymerizable liquid crystal composition may further contain an additive such as a dichroic dye and a fluorescent dye. Composite materials with the liquid crystal compound having no polymerizable group can be obtained by polymerizing the above polymerizable liquid crystal composition.

To the composition according to the invention, an optically active compound other than compound (2) may be added. Specific example of the optically active compounds are described in paragraph 0161 to paragraph 0170 in JP 2011-148762 A. The composition of the invention may be used as a raw material of a polymer described below, and also as a liquid crystal being a constituent of the liquid crystal display device.

An optically anisotropic substance having helical structure (twist structure) is obtained by applying the polymerizable liquid crystal composition according to the invention onto the substrate (preferably, subjected to the alignment treatment) and polymerizing the composition. The helical structure is immobilized by polymerizing the polymerizable liquid crystal composition. Characteristics of the optically anisotropic substance having twist alignment to be obtained depend on a helical pitch of the thus obtained helical structure. A length of the helical pitch can be adjusted by a kind and an amount of addition of the optically active compound. The number of the optically active compounds to be added may be one, but a plurality of the optically active compounds may be used for the purpose of offsetting temperature dependence of the helical pitch. In addition, the polymerizable liquid crystal composition may contain any other polymerizable compound in addition to the optically active compound.

Selective reflection of visible light being the characteristics of the optically anisotropic substance having twist alignment as described above refers to action of the helical structure onto incident light to reflect circularly polarized light or elliptically polarized light. Selective reflection characteristics can be expressed by an equation: $\lambda = n \cdot \text{Pitch}$ (in which λ is a center wavelength of selective reflection, n is an average refractive index and Pitch means a helical pitch), and therefore the center wavelength (λ) and a wavelength width (Δλ) can be appropriately adjusted by changing values of n or Pitch. An improvement in color purity only needs a decrease in the wavelength width (Δλ) may be decreased, and a case of desiring reflection in a broad band only needs an increase in the wavelength width (Δλ). Further, the selective reflection is also significantly susceptible to a thickness of the polymer. In order to maintain the color purity, care should be paid so as to avoid an excessive decrease in the thickness. In order to maintain the uniform twist alignment, care should be paid so as to avoid an excessive increase in the thickness. Accordingly, moderate thickness adjustment is required, and thickness from approximately 1 micrometer to approximately 10 micrometers is preferred, and a thickness from approximately 0.5 micrometer to approximately 25 micrometers is further preferred.

When the helical pitch is shortened in comparison with the pitch of visible light, the negative C plate described in W. H. de Jeu, Physical Properties of Liquid Crystalline Materials (Gordon and Breach, New York (1980)) can be prepared. In order to shorten the helical pitch, an object can be achieved by using an optically active compound having large helical twisting power (HTP) and increasing an amount of addition thereof. Specifically, the negative C plate can be prepared by adjusting λ to approximately 350 nanometers or less, and preferably, approximately 200 nanometers or less. The negative C plate serves, among the liquid crystal display devices, as an optical compensation film suitable, particularly preferably, for a display device of a vertical alignment (VA) mode, such as a VA mode display, a multi-domain vertical alignment (MVA) display or a patterned vertical alignment (PVA) display, and an optically compensated bend cell or optically compensated birefringence) (OCB) mode display device.

When the helical pitch is lengthened in comparison with the pitch of visible light, the optically anisotropic substance having twist alignment can be used for the selective reflection film in which a reflection wavelength region is set to near-infrared (wavelength: approximately 800 nm to approximately 2,500 nm) as described in JP 2004-333671 A or JP 2001-51937 A. Lengthening of the helical pitch only needs use of an optically active compound having small helical twisting power or reduction of an amount of addition of the optically active compound.

If the optically active compound described above can induce the helical structure and can be suitably mixed with the polymerizable liquid crystal composition serving as a base, any of the optically active compound may be used. Moreover, the optically active compound may be polymerizable or non-polymerizable, and an optimum compound can be added thereto according to a purpose. The polymerizable compound is further preferred when heat resistance and solvent resistance are taken into consideration.

A suitable thickness (film thickness) of the optically anisotropic substance having twist alignment is different depending on a phase difference according to a target device or birefringence (value of optical anisotropy) of the optically anisotropic substance having twist alignment. Therefore, the range thereof is different for each purpose, but as a guide, a preferred range is approximately 0.05 to approximately 100 micrometers. A further preferred range is approximately 0.1 to approximately 50 micrometers, and an even further preferred range is approximately 0.5 to approximately 20 micrometers. A preferred haze value of the optically anisotropic substance having twist alignment is approximately 1.5% or less, and a preferred transmittance is approximately 80% or more. A further preferred haze value is approximately 1.0% or less, and a further preferred transmittance is approximately 95% or more. The transmittance preferably meets the conditions in a visible light region.

The optically anisotropic substance having twist alignment is effective as the optical compensation device applied to the liquid crystal display device (particularly, active matrix and passive matrix liquid crystal display devices). Specific examples of modes of the liquid crystal display devices suitable for using the optically anisotropic substance having twist alignment in the form of the optical compensation film include an in-plane switching (IPS) mode, an optically compensated birefringence (OCB) mode, a reflective optically compensated birefringence (R-OCB) mode, a hybrid aligned pneumatic (HAN) mode, a mode using a rr cell display, a twisted nematic (TN) mode, a supertwisted nematic (STN) mode, an electrically controlled birefringence (ECB) mode, a deformation of aligned phase (DAP) mode, a color super homeotropic (CSH) mode, a vertically aligned nematic/vertically aligned cholesteric (VANNAC) mode, a vertical alignment (VA) mode and a vertical alignment (VA) mode including an MVA mode and a PVA mode. In addition, optimum values of parameters such as the helical pitch in the twist alignment and the thickness thereof required for the optically anisotropic substance having twist alignment strongly depend on a kind and an optical parameter of the liquid crystal display device to be compensated and an optical parameter thereof, and therefore are different depending on a type of the device.

The optically anisotropic substance having twist alignment can be used also in the form of an optical device integrated with a polarizing plate or the like, and is arranged on an outside of a liquid crystal cell in the above case. On the other hand, the optically anisotropic substance having twist alignment in the form of the optical compensation device has no or little elution of an impurity into the liquid crystal filled into the cell, and therefore can be arranged inside the liquid crystal cell. For example, if a method disclosed in JP 2004-240102 A is applied, a function of a color filter can be further improved by forming the polymerizable liquid crystal layer according to the invention on the color filter.

Alternatively, the optically anisotropic substance can also be used in the form of a broad wavelength band reflecting polarizing plate as described in EP 0606940 A, WO 97/35219 A, EP 0982605 A or the like. Alternatively, the optically anisotropic substance can also be used in the form of a color filter for security marking or a liquid crystal pigment for ornament or security as described in WO 2003/85642 A, WO 2002/86609 A, JP 2003-161835 A or the like.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be described in detail by way of Examples below, but the invention is not limited to the Examples. Evaluation methods in Examples are presented below.

Polymerization Conditions

Irradiation of light having an intensity of 90 mW/cm$^2$ (365 nm) was made in air at room temperature for 5 seconds using 2 kW ultra-high pressure mercury lamp.

Evaluation of Twist Alignment (1) Preparation of a Glass Substrate with a Rubbing-Treated Alignment Film Onto a 1.1 mm-thick glass substrate, polyamic acid for a low pretilt angle (horizontal alignment mode) (Lixon Aligner: PIA-5370, made by JNC Corporation) was spin coated, a solvent was dried on a hot plate at 80° C., and the resultant material was baked at 230° C. for 30 minutes. Then, rubbing treatment was applied using a rayon fabric.

(2) Confirmation of Uniformity of Twist Alignment

A substrate with a cured film of a polymerizable liquid crystal compound was interposed between two polarizing plates arranged in a crossed Nicol state, and presence or absence of light leakage (fine light transmission) through the cured film in a dark field state was observed. The light leakage is observed when a defect is produced in twist alignment (planer alignment). When no light leakage was observed, the alignment was judged to be uniform.

Measurement Using an Ellipsometer: Confirmation of Alignment Form

OPTIPRO (ellipsometer) made by Shintech, Inc. was used, and a substrate with a cured film of a polymerizable liquid crystal compound was irradiated with light having a wavelength of 550 nanometers. Retardation was measured while an incidence angle of the light was decreased from 90 degrees relative to a substrate plane and an alignment form was confirmed. A direction of tilting irradiation was coincided with a direction of rubbing (long axis direction of liquid crystal molecules). When retardation from a perpendicular direction was minimum, alignment of the liquid crystal molecules was judged to be twist. In an optically anisotropic substance having twist alignment (negative C plate), a direction of an optical axis becomes perpendicular to a direction of a support substrate.

Retardation is expressed in terms of a product: $\Delta n \times d$, in which a symbol $\Delta n$ is birefringence (optical anisotropy) and symbol d is a thickness (film thickness) of a polymer film.

Measurement of Film Thickness

A layer of a cured film in a glass substrate with the cured film of a polymerizable liquid crystal compound was shaved off and a profile was measured using a high-resolution surface profiler (Alpha-Step IQ, made by KLA-Tencor Corporation).

Evaluation of Chemical Resistance

A substrate with a cured film of a polymerizable liquid crystal compound was immersed into a mixture of N-methyl-2-pyrrolidone (NMP) and ethylene glycol monobutyl ether (BC) in an equal amount at 50° C. for 5 minutes, and a variation of a thickness of the cured film of the polymerizable liquid crystal compound before and after immersion was evaluated.

Measurement of Spectra of a Solution

Absorption maximum wavelengths of a polymerizable liquid crystal composition and an initiator used in Examples and Comparative Examples were expressed using values measured using tetrahydrofuran (THF) as a solvent by a spectrophotometer (UV-1700, made by Shimadzu Corporation).

Measurement of Spectra of a Selective Reflection Film

A selective reflection wavelength of a liquid crystal cured film in Examples and Comparative Examples was evaluated using a glass substrate with a cured film of a polymerizable liquid crystal compound by a spectrophotometer (UV-1700, made by Shimadzu Corporation).

Compounds used in Examples and Comparative Examples are shown below.

Formula 67

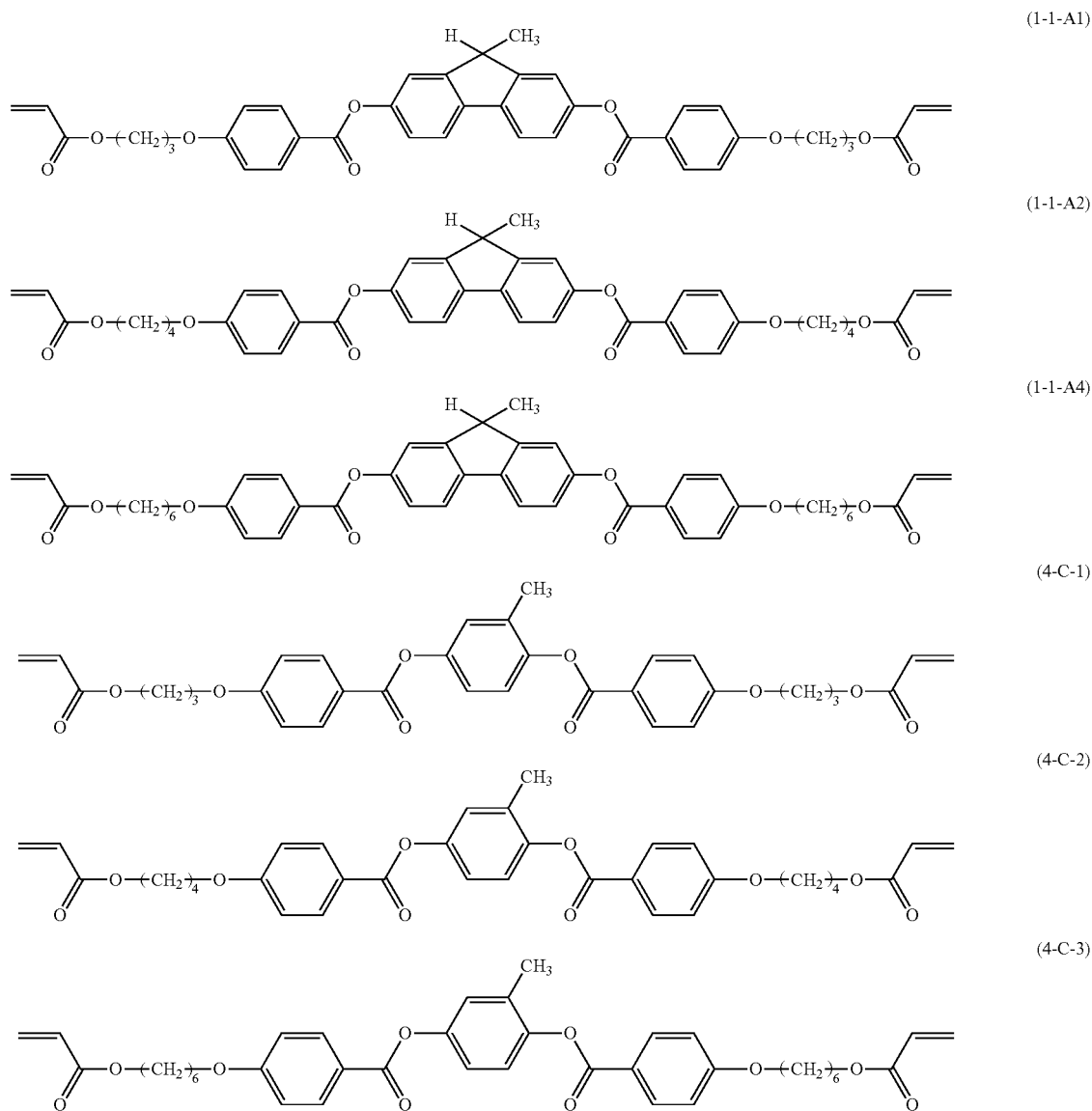

Formula 68

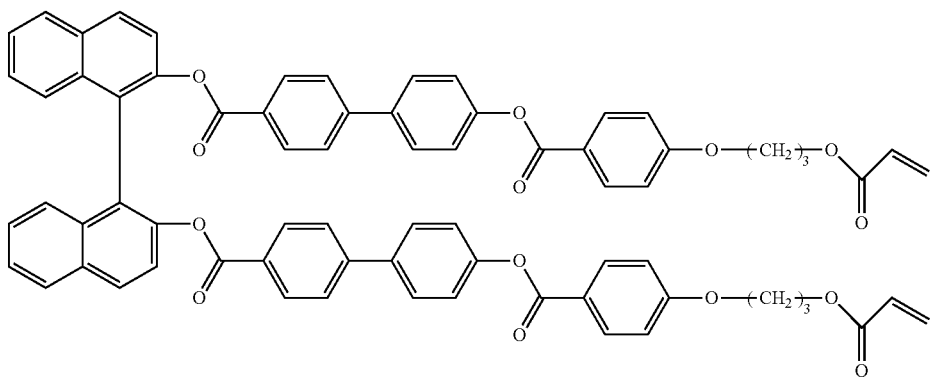

(2-2-A-1)

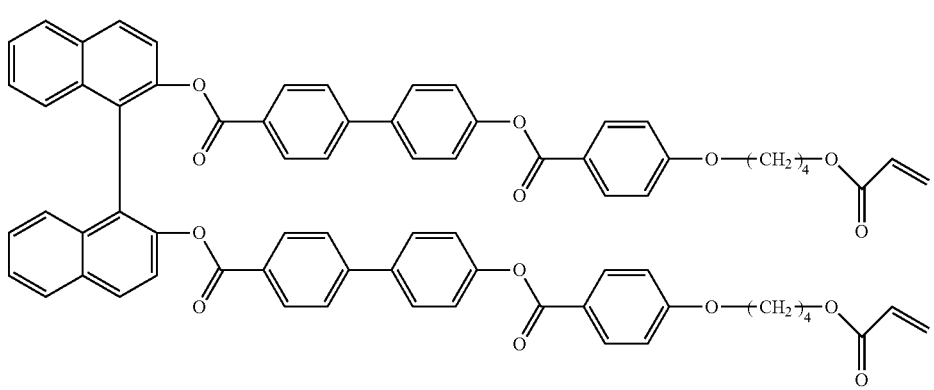

(2-2-A-2)

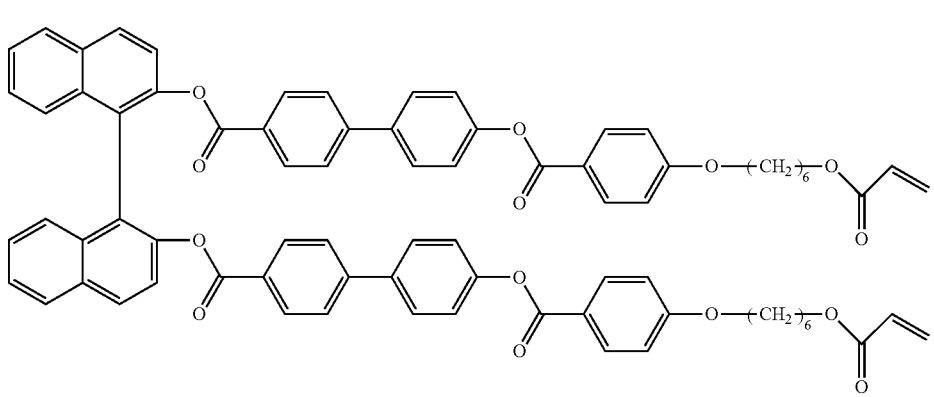

(2-2-A-3)

Compound (1-1-A1), compound (1-1-A2) and compound (1-1-A4) were prepared by a method described in JP 2003-238491 A.

Compounds (4-C-1) to (4-C-3) were prepared in accordance with a method described in Makromol. Chem., 190, 2255-2268 (1989).

Optically active compounds (2-2-A1) to (2-2-A-3) were prepared by a method in combination with methods described in JP 2005-263778 A, U.S. Pat. No. 5,886,242 B and GB 2298202 A. In the present Example, as a binaphthalene moiety, an R isomer was used.

Example 1

Preparation of Polymerizable Liquid Crystal Composition (1)

At a weight ratio of 45:45:10 for compound (1-1-A1): compound (1-1-A2):compound (2-2-A2), the compounds were mixed. The composition was defined as MIX1. To the MIX1, in terms of a weight ratio, 0.05 of a polymerization initiator having oxime ester NCI-930 (made by ADEKA Corporation) and 0.001 of TEGOFLOW (registered trademark) 370 as a vinyl-based surfactant were added. Cyclopentanone was added to the composition to adjust polymerizable liquid crystal composition (1) in which a concentration of MIX1 was 35% by weight.

Onto a glass substrate (Matsunami Slide Glass: S-1112), polyamic acid for a low pretilt angle (horizontal alignment mode) (Lixon Aligner: PIA-5580, made by JNC Corporation) was applied, and the resultant applied material was dried at 80° C. for 3 minutes, and then baked at 230° C. for 30 minutes. Rubbing treatment was applied using a rubbing fabric made from rayon (rubbing-treated alignment film). Next, polymerizable liquid crystal composition (1) was applied onto the glass substrate with the rubbing-treated alignment film by spin coating. The substrate was heated at 80° C. for 3 minutes and cooled at room temperature for 3 minutes. A coating film from which a solvent was removed was polymerized by ultraviolet light in air to give a liquid crystal cured film (optically anisotropic substance). When the optically anisotropic substance obtained was interposed between two polarizing plates arranged in a crossed Nicol state and the substrate was placed into a dark field state, no light leakage was confirmed, and thus alignment was judged to be uniform. Measurement of retardation of the substrate with the liquid crystal film showed the results as shown in FIG. 1. Retardation from a perpendicular direction was minimum, and therefore alignment was judged to be twist (negative C plate). Film thickness was 3.2 micrometers. When chemical resistance of the optically anisotropic substance obtained was evaluated, a change in film thickness was comparatively as small as 7%, and an almost no change in retardation was observed.

Next, when absorption spectra of the MIX1 and the photopolymerization initiator as described above were measured, an absorption maximum wavelength of the MIX1 was 276 nanometers and an absorption maximum wavelength of the photopolymerization initiator was 330 nanometers. A difference between the absorption maximum wavelengths was 54 nanometers.

Comparative Example 1

Polymerizable liquid crystal composition (2) was prepared to form a liquid crystal cured film in a manner similar to the procedures in Example 1 except that a polymerization initiator having no oxime ester Irgacure 907 (made by BASF Japan Ltd.) was added, in place of the polymerization initiator NCI-930, at a weight ratio of 0.05 to the MIX1 described in Example 1. Twist alignment having no alignment defect was obtained in a manner similar to Example 1. Film thickness was 3.2 micrometers and retardation also had a trend similar to the retardation in Example 1. When chemical resistance of the optically anisotropic substance obtained was evaluated, a change in film thickness was as large as 25%, and a decrease in retardation was also significantly observed. Next, when absorption spectra of the MIX1 and the photopolymerization initiator as described above were measured, an absorption maximum wavelength of the MIX1 was 276 nanometers and an absorption maximum wavelength of the photopolymerization initiator was 283 nanometers. A difference between the absorption maximum wavelengths was 7 nanometers.

From the results described above, an optically anisotropic substance having twist alignment that is excellent in mechanical strength is found to be obtained by adjusting to 50 nanometers or more the difference between the absorption maximum wavelength of the mixture of the achiral polymerizable liquid crystal compound and the optically active compound having the binaphthol moiety and the absorption maximum wavelength of the photopolymerization initiator having the oxime ester moiety.

Example 2

At a weight ratio of 45:45:10 for compound (1-1-A2):compound (4-C-2):compound (2-2-A2), the compounds were mixed. The composition was defined as MIX2. Polymerizable liquid crystal composition (3) was prepared to form a liquid crystal cured film in a manner similar to the procedures in Example 1 except that the MIX2 was used. Twist alignment having no alignment defect was obtained in a manner similar to Example 1. Film thickness was 3.1 micrometers and retardation had a trend similar to the retardation in Example 1. When chemical resistance of the optically anisotropic substance obtained was evaluated, a change in film thickness was comparatively as small as 6%, and almost no reduction of retardation was observed. Next, when absorption spectra of the MIX2 and the photopolymerization initiator were measured, an absorption maximum wavelength of the MIX2 was 274 nanometers and an absorption maximum wavelength of the photopolymerization initiator was 330 nanometers. A difference between the absorption maximum wavelengths was 56 nanometers.

Comparative Example 2

Polymerizable liquid crystal composition (4) was prepared to form a liquid crystal cured film in a manner similar to the procedures in Example 1 except that a polymerization initiator having no oxime ester Irgacure 907 (made by BASF Japan Ltd.) was added, in place of the polymerization initiator NCI-930, at a weight ratio of 0.05 to the MIX2 described in Example 2. Twist alignment having no alignment defect was obtained in a manner similar to Example 2. Film thickness was 3.1 micrometers and retardation also had a trend similar to the retardation in Example 1. When chemical resistance of the optically anisotropic substance obtained was evaluated, a change in film thickness was as large as 23%, and reduction of retardation was also significantly observed. Next, when absorption spectra of the MIX2 and the photopolymerization initiator as described above were measured, an absorption maximum wavelength of the MIX2 was 274 nanometers and an absorption maximum wavelength of the photopolymerization initiator was 283 nanometers. A difference between the absorption maximum wavelengths was 9 nanometers.

Comparative Example 3

Polymerizable liquid crystal composition (5) was prepared to form a liquid crystal cured film in a manner similar to the procedures in Example 1 except that a polymerization initiator having no oxime ester Irgacure 379EG (made by BASF Japan Ltd.) was added, in place of the polymerization initiator NCI-930, at a weight ratio of 0.05 to the MIX1 described in Example 1. Twist alignment having no alignment defect was obtained in a manner similar to Example 1. Film thickness was 3.2 micrometers and retardation also had a trend similar to the retardation in Example 1. When chemical resistance of the optically anisotropic substance obtained was evaluated, a change in film thickness was as large as 30%, and reduction of retardation was also significantly observed. Next, when absorption spectra of the MIX1 and the photopolymerization initiator as described above were measured, an absorption maximum wavelength of the MIX1 was 276 nanometers and an absorption maximum wavelength of the photopolymerization initiator was 318 nanometers. A difference between the absorption maximum wavelengths was 42 nanometers.

Comparative Example 4

Liquid crystal composition (6) was prepared to form a liquid crystal cured film in a manner similar to the procedures in Example 1 except that a polymerization initiator having no oxime ester Darocur TPO (made by BASF Japan Ltd.) was added, in place of the polymerization initiator NCI-930, at a weight ratio of 0.05 to the MIX1 described in Example 1. Twist alignment having no alignment defect was obtained in a manner similar to Example 1. Film thickness was 3.2 micrometers and retardation had a trend similar to the retardation in Example 1. When chemical resistance of the optically anisotropic substance obtained was evaluated, a change in film thickness was as large as 35%, and reduction of retardation was also significantly observed. Next, when absorption spectra of the MIX1 and the photopolymerization initiator were measured, an absorption maximum wavelength of the MIX1 was 276 nanometers and an absorption maximum wavelength of the photopolymerization initiator was 385 nanometers. A difference between the absorption maximum wavelengths was 109 nanometers.

Example 3

At a weight ratio of 48:48:4 for compound (1-1-A1): compound (1-1-A2):compound (2-2-A2), the compounds were mixed. The composition was defined as MIX3. Polymerizable liquid crystal composition (7) was prepared to form a liquid crystal cured film in a manner similar to the procedures in Example 1 except the MIX3 was used. The cured film obtained had a green selective reflection color having no alignment defect. A center of a selective reflection wavelength was 530 nanometers, and the film had a selective reflection region of approximately 75 nanometers. When chemical resistance of the selective reflection film obtained was evaluated, a change in film thickness was comparatively as small as 4%. A center of the selective reflection wavelength was 530 nanometers and had a selective reflection region of approximately 75 nanometers, and almost no change in selective reflection characteristics was observed.

Next, when absorption spectra of the MIX3 and the photopolymerization initiator were measured, an absorption maximum wavelength of the MIX3 was 276 nanometers and an absorption maximum wavelength of the photopolymerization initiator was 330 nanometers. A difference between the absorption maximum wavelengths was 54 nanometers.

Comparative Example 5

Polymerizable liquid crystal composition (8) was prepared to form a liquid crystal cured film in a manner similar to the procedures in Example 3 except that a polymerization initiator having no oxime ester Irgacure 907 (made by BASF Japan Ltd.) was added, in place of the polymerization initiator NCI-930, at a weight ratio of 0.05 to the MIX3 described in Example 3. The cured film obtained had a green selective reflection color having no alignment defect in a manner similar to Example 3. A center of a selective reflection wavelength was 530 nanometers, and had a selective reflection region of approximately 75 nanometers. When chemical resistance of the selective reflection film obtained was evaluated, a change in film thickness was comparatively as large as 24%. A center of a selective reflection wavelength was 438 nanometers, and shifted on a side of a short wavelength, and changed to a selective reflection region of approximately 60 nanometers, and thus a change in selective reflection characteristics was large.

Next, when absorption spectra of the MIX3 and the photopolymerization initiator were measured, an absorption maximal wavelength of the MIX3 was 276 nanometers and an absorption maximal wavelength of the photopolymerization initiator was 283 nanometers. A difference between the absorption maximal wavelengths was 7 nanometers.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

When a polymerizable liquid crystal composition according to the invention is used, an optically anisotropic substance having twist alignment that is excellent in chemical strength (chemical resistance) and has only a small amount of alignment defects can be obtained. The optically anisotropic substance having twist alignment according to the invention can be utilized, for example, for an optical compensation layer, a reflective polarizing device, a selective reflection film, a brightness enhancement film and a viewing angle compensation film or the like each being a constituent of a liquid crystal display device.

What is claimed is:
1. A polymerizable liquid crystal composition, containing an optically active compound having a binaphthol moiety, an achiral polymerizable liquid crystal compound and a photopolymerization initiator (C) having oxime ester,
wherein an absorption maximum wavelength of a mixture including the achiral polymerizable liquid crystal compound and the optically active compound having the binaphthol moiety is in the range of 220 to 400 nanometers, and the absorption maximum wavelength is different from an absorption maximum wavelength of the photopolymerization initiator having oxime ester by 50 nanometers or more, and
wherein the achiral polymerizable liquid crystal compound is component (A) being at least one compound represented by formula (1-1), and the optically active compound having the binaphthol moiety is component (B) being at least one compound represented by formula (2-2):

Formula 2

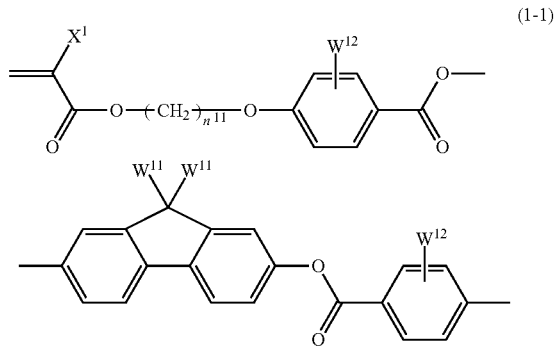

-continued

—O—(CH₂)ₙ₁₁—O—C(=X¹)(=CH₂)—C(=O)— (2-5)

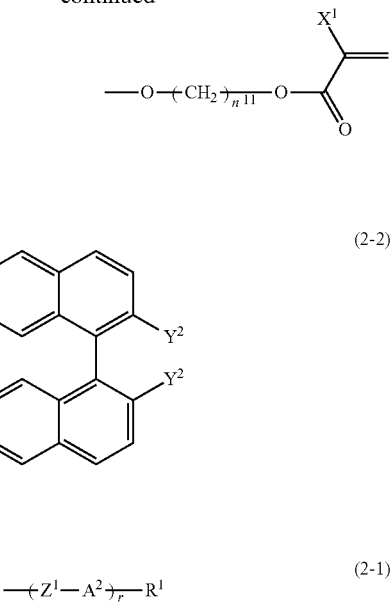

(2-2)

—(Z¹—A²)ᵣ—R¹ (2-1)

wherein, in formula (1-1),
X¹ is independently hydrogen, methyl, fluorine or trifluoromethyl;
W¹¹ is independently hydrogen or methyl;
W¹² is independently hydrogen, halogen, nitro, cyano, alkyl having 1 to 7 carbons or alkoxy having 1 to 7 carbons; and
n¹¹ is independently an integer from 2 to 10;
in formula (2-2),
Y² is independently a group represented by formula (2-1);
in formula (2-1),
R¹ is independently halogen, cyano, alkenyl having 2 to 20 carbons or alkyl having 1 to 20 carbons, at least one of —CH₂— in the group may be replaced by —O—, excluding a case where —O— is adjacent, at least one of hydrogen in the group may be replaced by halogen, and one of hydrogen in the group may be replaced by acryloyloxy, methacryloyloxy or trifluoromethylacryloyloxy;
A² is independently 1,4-cyclohexylene, 1,4-phenylene, 4,4'-biphenylene, naphthalene-2,6-diyl, decahydronaphthalene-2,6-diyl, 1,2,3,4-tetrahydronaphthalene-2,6-diyl, or 1,4-phenylene in which at least one of hydrogen is replaced by halogen;
Z¹ is independently a single bond, —O—, —COO—, —OCO—, —OCF₂— or —(CH₂)ₚ—, and one of —CH₂— in —(CH₂)ₚ— may be replaced by —O—;
p is independently an integer from 1 to 20; and
r is independently an integer from 1 to 3.

2. The polymerizable liquid crystal composition according to claim 1, wherein in formula (1-1),
X¹ is independently hydrogen or methyl;
W¹² is independently hydrogen, halogen, alkyl having 1 to 7 carbons or alkoxy having 1 to 7 carbons;
in formula (2-2),
Y² is independently a group represented by formula (2-1);
in formula (2-1),
R¹ is independently alkenyl having 2 to 20 carbons or alkyl having 1 to 20 carbons, at least one of —CH₂— in the group may be replaced by —O—, excluding a case where —O— is adjacent, at least one of hydrogen in the group may be replaced by halogen, and one of hydrogen in the group may be replaced by acryloyloxy, methacryloyloxy or trifluoromethylacryloyloxy;
Z¹ is independently a single bond, —O—, —COO—, —OCO— or —(CH₂)ₚ—, and one of —CH₂— in —(CH₂)ₚ— may be replaced by —O—; and
p is independently an integer from 1 to 10.

3. The polymerizable liquid crystal composition according to claim 1, wherein in formula (1-1),
X¹ is independently hydrogen or methyl;
W¹² is independently hydrogen, fluorine, alkyl having 1 to 7 carbons or alkoxy having 1 to 7 carbons;
in formula (2-2),
Y² is independently a group represented by formula (2-1);
in formula (2-1),
R¹ is independently alkenyl having 2 to 20 carbons or alkyl having 1 to 20 carbons, at least one of —CH₂— in the group may be replaced by —O—, excluding a case where —O— is adjacent, at least one of hydrogen in the group may be replaced by halogen, and one of hydrogen in the group may be replaced by acryloyloxy, methacryloyloxy or trifluoromethylacryloyloxy;
Z¹ is independently a single bond, —O—, —COO—, —OCO— or —(CH₂)ₚ—, and one of —CH₂— in —(CH₂)ₚ— may be replaced by —O—; and
p is independently an integer from 1 to 3.

4. The polymerizable liquid crystal composition according to claim 1, further containing at least one compound represented by formula (3-1) and formula (3-2) as component (D):

Formula 3

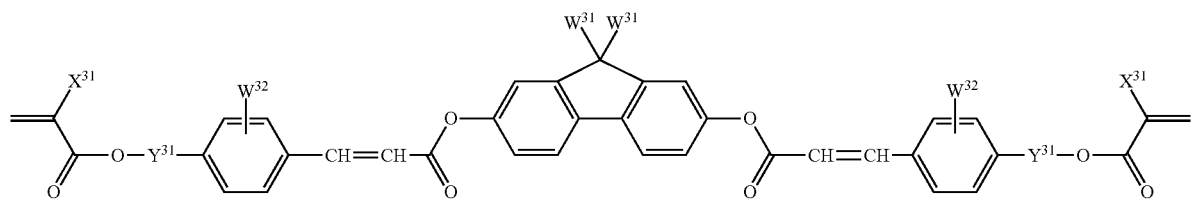

(3-1)

(3-2)

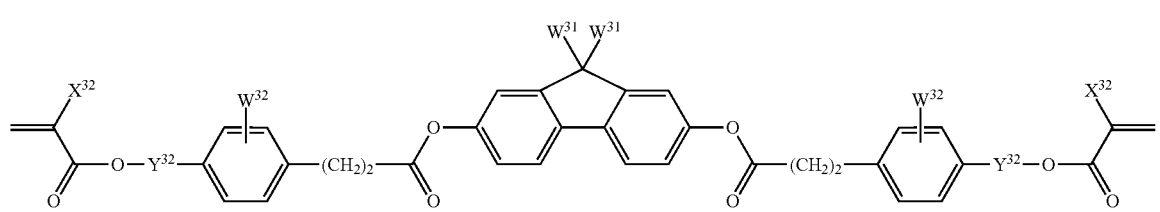

wherein, in formula (3-1),

X$^{31}$ is independently hydrogen, methyl or trifluoromethyl;

Y$^{31}$ is independently alkylene having 1 to 20 carbons, and in the alkylene, at least one of hydrogen may be replaced by fluorine or chlorine, and at least one of —CH$_2$— may be replaced by —O—, —S—, —COO—, —OCO—, —OCOO—, —CH=CH— or —C≡C—;

W$^{31}$ is independently hydrogen, fluorine, chlorine, methyl or ethyl, and at least one of hydrogen in the methyl and the ethyl may be replaced by halogen;

W$^{32}$ is independently hydrogen, halogen, nitro, cyano, alkyl having 1 to 7 carbons or alkoxy having 1 to 7 carbons;

in formula (3-2),

W$^{31}$ is independently hydrogen, fluorine, chlorine, methyl or ethyl, and at least one of hydrogen in the methyl and the ethyl may be replaced by halogen;

W$^{32}$ is independently hydrogen, halogen, nitro, cyano, alkyl having 1 to 7 carbons or alkoxy having 1 to 7 carbons;

X$^{32}$ is independently hydrogen, methyl or trifluoromethyl; and

Y$^{32}$ is independently alkylene having 1 to 20 carbons, and in the alkylene, at least one of hydrogen may be replaced by fluorine or chlorine, and at least one of —CH$_2$— may be replaced by —O—, —S—, —COO—, —OCO—, —OCOO—, —CH=CH— or —C≡C—.

5. The polymerizable liquid crystal composition according to claim 1, further containing at least one compound represented by formula (4) as component (E):

Formula 4

(4)

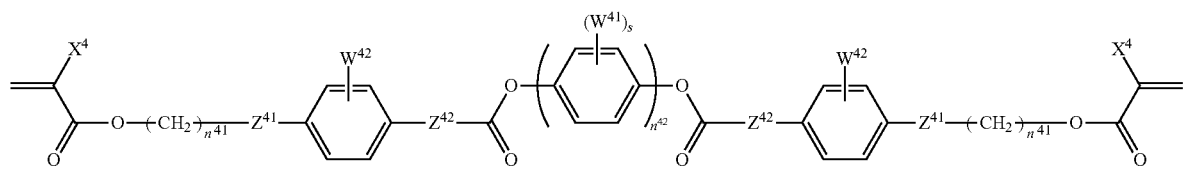

wherein, in formula (4),

X$^4$ is independently hydrogen, methyl, fluorine or trifluoromethyl;

W$^{42}$ is independently hydrogen, halogen, nitro, cyano, alkyl having 1 to 7 carbons or alkoxy having 1 to 7 carbons, and in the alkyl and the alkoxy, at least one of hydrogen may be replaced by fluorine;

W$^{41}$ is independently halogen, nitro, cyano, phenyl, benzyl, alkyl having 1 to 7 carbons, alkoxy having 1 to 7 carbons, alkoxycarbonyl (—COOR$^a$; R$^a$ is straight-chain alkyl having 1 to 7 carbons) or alkylcarbonyl (—COR$^b$; R$^b$ is straight-chain alkyl having 1 to 16 carbons), and in the alkyl and the alkoxy, at least one of hydrogen may be replaced by fluorine;

s is an integer from 0 to 4;

n$^{41}$ is independently an integer from 2 to 10;

n$^{42}$ is an integer from 1 to 3;

Z$^{41}$ is independently a single bond, —O—, —CO—, —CH=CH—, —COO—, —COO—, —OCO— CH=CH—COO— or —OCOO—; and Z$^{42}$ is independently a single bond, —CH$_2$CH$_2$— or —CH=CH—.

6. The polymerizable liquid crystal composition according to claim 1, further containing at least one compound represented by formula (5) as component (F):

Formula 5

(5)

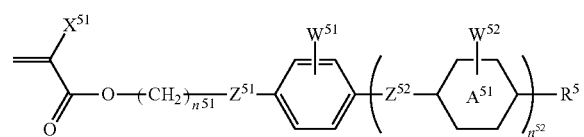

wherein, in formula (5),

X$^{51}$ is hydrogen, methyl or trifluoromethyl;

R$^5$ is cyano, trifluoromethoxy, alkyl having 1 to 20 carbons, alkyl ester having 1 to 20 carbons (—CO-OR$^c$, —OCOR$^c$ or —CH=CH—COORS; R$^c$ is straight-chain alkyl having 1 to 20 carbons) or alkoxy having 1 to 20 carbons, and in the alkyl and the alkoxy, at least one of hydrogen may be replaced by fluorine;

ring A$^{51}$ is 1,4-phenylene or 1,4-cyclohexylene;

W$^{51}$ and W$^{52}$ are independently hydrogen, halogen, nitro, cyano, alkyl having 1 to 7 carbons or alkoxy having 1 to 7 carbons, and in the alkyl and the alkoxy, at least one of hydrogen may be replaced by fluorine;

$Z^{51}$ is a single bond, —O—, —COO—, —OCO— or —OCOO—, $Z^{52}$ is independently a single bond, —COO—, —OCO—, —CH=CH—COO—, —OCO—CH=CH—, —CH$_2$CH$_2$—COO—, —OCO—CH$_2$CH$_2$— or —C≡C—;

$n^{51}$ is an integer from 2 to 10; and $n^{52}$ is an integer from 1 to 2.

7. The polymerizable liquid crystal composition according to claim 1, wherein photopolymerization initiator having oxime ester (C) is at least one compound represented by formula (6-1):

Formula 6

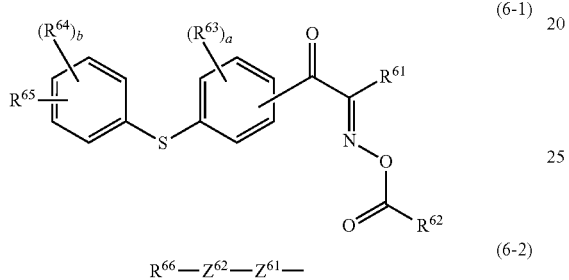

(6-1)

$R^{66}$—$Z^{62}$—$Z^{61}$—

(6-2)

wherein, in formula (6-1), $R^{61}$ represents cyano, alkyl having 1 to 20 carbons, aryl having 3 to 60 carbons or arylalkyl having 7 to 30 carbons, hydrogen in a substituent represented by $R^{61}$ may be further replaced by $OR^{621}$, $COR^{621}$, $SR^{621}$, halogen or $COOR^{621}$, and $R^{621}$ represents hydrogen or alkyl having 1 to 20 carbons;

$R^{62}$ represents $R^{611}$, $R^{611}$ represents alkyl having 1 to 20 carbons, aryl having 3 to 60 carbons or arylalkyl having 7 to 30 carbons, hydrogen in a substituent represented by $R^{611}$ may be further replaced by halogen, and an alkyl part in a substituent represented by $R^{61}$, $R^{611}$ and $R^{621}$ may be discontinued 1 to 5 times by —O—, —S—, —COO—, —OCO— or —NR$^{624}$—, $R^{624}$ represents hydrogen, alkyl having 1 to 20 carbons, aryl having 3 to 60 carbons or arylalkyl having 7 to 30 carbons, and an alkyl part in a substituent represented by $R^{611}$ and $R^{621}$ may have a branched side chain and may be cyclopentyl or cyclohexyl;

$R^{63}$ and $R^{64}$ each independently represent $R^{611}$, $OR^{611}$, cyano, a hydroxyl group or halogen;

a and b each independently represent an integer from 0 to 4;

$R^{65}$ represents hydrogen, a hydroxyl group, carboxyl or a group represented by formula (6-2);

in formula (6-2), $Z^{61}$ represents —O—, —S—, —OCO— or —COO—;

$Z^{62}$ represents alkylene having 1 to 20 carbons in which replacement by 1 to 3 of $R^{66}$ may be made, arylene having 6 to 30 carbons in which replacement by 1 to 3 of $R^{66}$ may be made or arylenealkylene having 7 to 30 carbons in which replacement by 1 to 3 of $R^{66}$ may be made, and an alkylene part of $Z^{62}$ may be discontinued 1 to 5 times by —O—, —S—, —COO— or —OCO—, and the alkylene part of $Z^{62}$ may have a branched side chain, and may be cyclohexylene; and $R^{66}$ represents a hydroxyl group or carboxyl.

8. The polymerizable liquid crystal composition according to claim 1, further containing a nonionic surfactant.

9. The polymerizable liquid crystal composition according to claim 8, wherein the nonionic surfactant includes a vinyl-based, fluorine-based, silicone-based or hydrocarbon-based nonionic surfactant.

10. An optically anisotropic substance having the polymerizable liquid crystal composition according to claim 1.

11. A liquid crystal display device, having the optically anisotropic substance according to claim 10.

12. A selective reflection film, having the optically anisotropic substance according to claim 10.

* * * * *